United States Patent
Liu et al.

(10) Patent No.: US 12,185,326 B2
(45) Date of Patent: Dec. 31, 2024

(54) BASE STATION APPARATUS, TERMINAL APPARATUS, AND COMMUNICATION METHOD

(71) Applicant: SHARP KABUSHIKI KAISHA, Sakai (JP)

(72) Inventors: Liqing Liu, Sakai (JP); Shohei Yamada, Sakai (JP); Masayuki Hoshino, Sakai (JP); Hiroki Takahashi, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 364 days.

(21) Appl. No.: 17/442,997

(22) PCT Filed: Feb. 28, 2020

(86) PCT No.: PCT/JP2020/008215
§ 371 (c)(1),
(2) Date: Sep. 24, 2021

(87) PCT Pub. No.: WO2020/195531
PCT Pub. Date: Oct. 1, 2020

(65) Prior Publication Data
US 2022/0191912 A1 Jun. 16, 2022

(30) Foreign Application Priority Data
Mar. 27, 2019 (JP) .................................. 2019-060243

(51) Int. Cl.
*H04W 4/00* (2018.01)
*H04W 72/23* (2023.01)

(52) U.S. Cl.
CPC .................................. *H04W 72/23* (2023.01)

(58) Field of Classification Search
CPC ..... H04L 5/0094; H04L 5/0044; H04L 5/001; H04L 5/0053; H04L 5/0048; H04L 5/003;
(Continued)

(56) References Cited

U.S. PATENT DOCUMENTS

2020/0267749 A1* 8/2020 Al-Imari ................ H04W 16/14
2021/0378007 A1* 12/2021 You ........................ H04W 76/28
(Continued)

OTHER PUBLICATIONS

CATT, "Scheduling and processing timeline enhancements for URLLC", R1-1902005, 3GPP TSG RAN WG1 Meeting #96, Athens, Greece, Feb. 25-Mar. 1, 2019.
(Continued)

*Primary Examiner* — Edan Orgad
*Assistant Examiner* — Hidayat Dabiri
(74) *Attorney, Agent, or Firm* — ScienBiziP, P.C.

(57) ABSTRACT

A terminal apparatus and a base station apparatus efficiently communicate with each other. A terminal apparatus receives a first DCI and determines transmission of a first PUSCH. The first PUSCH is scheduled by the first DCI, a value of a first PUSCH procedure preparation time for the first PUSCH is a first value in a case that a first condition is not satisfied, and the value of the first PUSCH procedure preparation time is a value acquired by adding a second value to the first value in a case that the first condition is satisfied. The terminal apparatus determines the transmission of the first PUSCH in a case that a number of symbols between the first DCI and the first PUSCH is equal to or greater than a number of symbols corresponding to the value of the first PUSCH procedure preparation time.

9 Claims, 22 Drawing Sheets

(58) Field of Classification Search
CPC ............. H04W 76/20; H04W 72/1273; H04W 72/0466; H04W 72/0446; H04W 72/23
See application file for complete search history.

(56) References Cited

U.S. PATENT DOCUMENTS

| | | | |
|---|---|---|---|
| 2022/0007428 A1* | 1/2022 | Lei .................... | H04L 5/0051 |
| 2022/0046722 A1* | 2/2022 | Kim .................... | H04L 5/0048 |
| 2022/0095371 A1* | 3/2022 | Oh .................... | H04W 74/0833 |
| 2022/0377715 A1* | 11/2022 | Papasakellariou .. | H04W 52/325 |
| 2023/0137428 A1* | 5/2023 | Gao .................... | H04L 5/001 |
| | | | 370/329 |
| 2023/0354312 A1* | 11/2023 | Nimbalker ............ | H04L 5/0053 |

OTHER PUBLICATIONS

3rd Generation Partnership Project, Technical Specification Group Radio Access Network, NR, Physical layer procedures for data, 3GPP TS 38.214 V15.4.0 (Dec. 2018).

NTT Docomo, Revision of SI: Study on New Radio Access Technology, 3GPP TSG RAN Meeting #72, RP-161214, Busan, Korea, Jun. 13-16, 2016.

\* cited by examiner

PDSCH
(A) PDSCH mapping type A
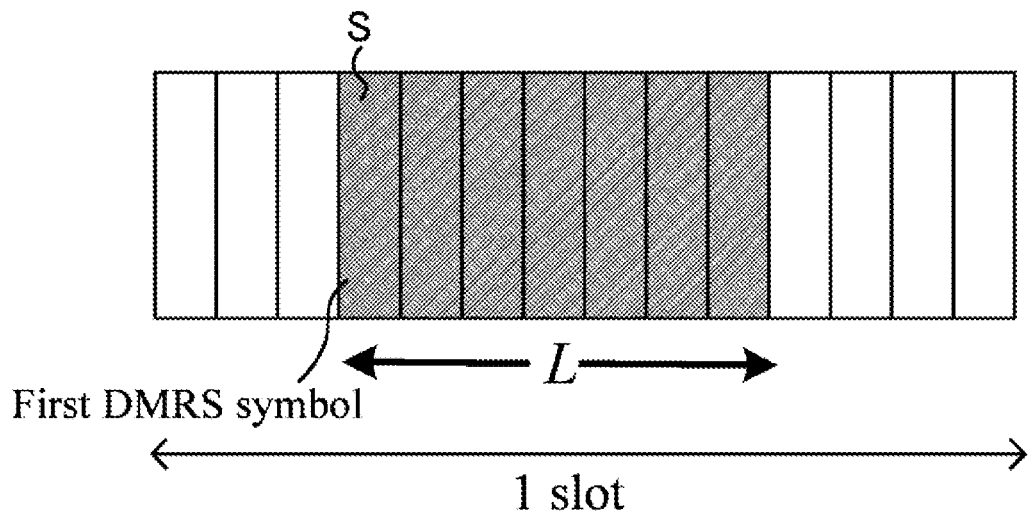
(B) PDSCH mapping type B
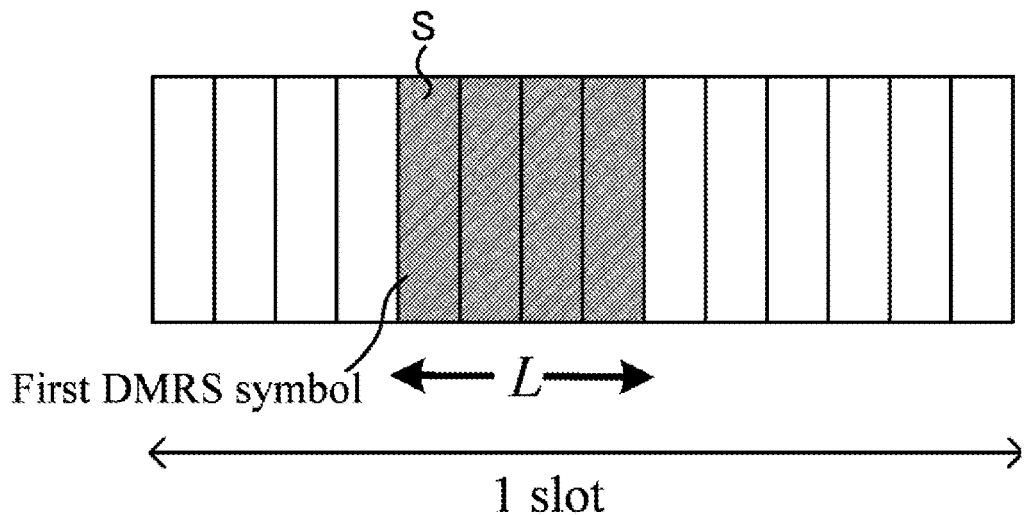
FIG. 7

Applicable PDSCH time domain resource allocation

| RNTI | PDCCH search space | SS/PBCH block and CORESET multiplexing pattern | *pdsch-ConfigCommon* includes *pdsch-TimeDomainAllocationList* | *pdsch-Config* includes *pdsch-TimeDomainAllocationList* | PDSCH time domain resource allocation to apply |
|---|---|---|---|---|---|
| SI-RNTI | Type0 common | 1 | - | - | Default A for normal CP |
| | | 2 | - | - | Default B |
| | | 3 | - | - | Default C |
| SI-RNTI | Type0A common | 1 | No | - | Default A |
| | | 2 | No | - | Default B |
| | | 3 | No | - | Default C |
| | | 1,2,3 | Yes | - | *pdsch-TimeDomainAllocationList* provided in *pdsch-ConfigCommon* |
| RA-RNTI, TC-RNTI | Type1 common | 1, 2, 3 | No | - | Default A |
| | | 1, 2, 3 | Yes | - | *pdsch-TimeDomainAllocationList* provided in *pdsch-ConfigCommon* |
| P-RNTI | Type2 common | 1 | No | - | Default A |
| | | 2 | No | - | Default B |
| | | 3 | No | - | Default C |
| | | 1,2,3 | Yes | - | *pdsch-TimeDomainAllocationList* provided in *pdsch-ConfigCommon* |
| C-RNTI, MCS-C-RNTI, CS-RNTI | Any common search space associated with CORESET#0 | 1, 2, 3 | No | - | Default A |
| | | 1, 2, 3 | Yes | - | *pdsch-TimeDomainAllocationList* provided in *pdsch-ConfigCommon* |
| C-RNTI, MCS-C-RNTI, CS-RNTI | Any common search space not associated with CORESET#0, UE specific search space | 1,2,3 | No | No | Default A |
| | | 1,2,3 | Yes | No | *pdsch-TimeDomainAllocationList* provided in *pdsch-ConfigCommon* |
| | | 1,2,3 | No/Yes | Yes | *pdsch-TimeDomainAllocationList* provided in *pdsch-Config* |

FIG. 10

| DCI | PDCCH search space | pdsch-ConfigCommon includes pdsch-TimeDomainAllocationList | pdsch-Config includes pdsch-TimeDomainAllocationList | pdsch-ConfigCommon includes pdsch-TimeDomainAllocationList2 | pdsch-Config includes pdsch-TimeDomainAllocationList2 | PDSCH time domain resource allocation to apply |
|---|---|---|---|---|---|---|
| 1st DCI | Any common search space not associated with CORESET#0 | No | No | Yes/No | Yes/No | Default A |
|  |  | Yes | No | Yes/No | Yes/No | pdsch-TimeDomainAllocationList provided in pdsch-ConfigCommon |
|  | UE specific search space | Yes/No | Yes | Yes/No | Yes/No | pdsch-TimeDomainAllocationList provided in pdsch-Config |
| 2nd DCI | Any common search space not associated with CORESET#0 | Yes/No | Yes/No | No | No | Default D |
|  |  | Yes/No | Yes/No | Yes | No | pdsch-TimeDomainAllocationList2 provided in pdsch-ConfigCommon |
|  | UE specific search space | Yes/No | Yes/No | Yes/No | Yes | pdsch-TimeDomainAllocationList2 provided in pdsch-Config |

FIG. 11

| DCI | PDCCH search space | *pdsch-ConfigCommon* includes *pdsch-TimeDomainAllocationList* | *pdsch-Config* includes *pdsch-TimeDomainAllocationList* | *pdsch-Config* includes *pdsch-TimeDomainAllocationList2* | PDSCH time domain resource allocation to apply |
|---|---|---|---|---|---|
| 1st DCI | Any common search space not associated with CORESET#0, | No | No | Yes/No | Default A |
| | | Yes | No | Yes/No | *pdsch-TimeDomainAllocationList* provided in *pdsch-ConfigCommon* |
| | UE specific search space | Yes/No | Yes | Yes/No | *pdsch-TimeDomainAllocationList* provided in *pdsch-Config* |
| 2nd DCI | Any common search space not associated with CORESET#0, | No | Yes/No | No | Default A |
| | | Yes | Yes/No | No | *pdsch-TimeDomainAllocationList* provided in *pdsch-ConfigCommon* |
| | UE specific search space | Yes/No | Yes/No | Yes | *pdsch-TimeDomainAllocationList2* provided in *pdsch-Config* |

FIG. 12

| Row index | Default PDSCH time domain resource allocation A for normal CP | | | | |
|---|---|---|---|---|---|
| | dmrs-TypeA-Position | PDSCH mapping type | $K_0$ | $S$ | $L$ |
| 1 | 2 | Type A | 0 | 2 | 12 |
| | 3 | Type A | 0 | 3 | 11 |
| 2 | 2 | Type A | 0 | 2 | 10 |
| | 3 | Type A | 0 | 3 | 9 |
| 3 | 2 | Type A | 0 | 2 | 9 |
| | 3 | Type A | 0 | 3 | 8 |
| 4 | 2 | Type A | 0 | 2 | 7 |
| | 3 | Type A | 0 | 3 | 6 |
| 5 | 2 | Type A | 0 | 2 | 5 |
| | 3 | Type A | 0 | 3 | 4 |
| 6 | 2 | Type B | 0 | 9 | 4 |
| | 3 | Type B | 0 | 10 | 4 |
| 7 | 2 | Type B | 0 | 4 | 4 |
| | 3 | Type B | 0 | 6 | 4 |
| 8 | 2,3 | Type B | 0 | 5 | 7 |
| 9 | 2,3 | Type B | 0 | 5 | 2 |
| 10 | 2,3 | Type B | 0 | 9 | 2 |
| 11 | 2,3 | Type A | 0 | 12 | 2 |
| 12 | 2,3 | Type A | 0 | 1 | 13 |
| 13 | 2,3 | Type A | 0 | 1 | 6 |
| 14 | 2,3 | Type A | 0 | 2 | 4 |
| 15 | 2,3 | Type B | 0 | 4 | 7 |
| 16 | 2,3 | Type B | 0 | 8 | 4 |

FIG. 13

Default PDSCH time domain resource allocation B

| Row index | dmrs-TypeA-Position | PDSCH mapping type | $K_0$ | $S$ | $L$ |
|---|---|---|---|---|---|
| 1 | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 0 | 10 | 2 |
| 6 | 2,3 | Type B | 1 | 2 | 2 |
| 7 | 2,3 | Type B | 1 | 4 | 2 |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 | 2,3 | Type B | 0 | 10 | 4 |
| 13 | 2 | Type A | 0 | 2 | 7 |
| 14 | 3 | Type A | 0 | 3 | 12 |
| 15 | 2,3 | Type B | 1 | 2 | 11 |
| 16 | | Reserved | | | 4 |

FIG. 14

Default PDSCH time domain resource allocation C

| Row index | dmrs-TypeA-Position | PDSCH mapping type | $K_0$ | $S$ | $L$ |
|---|---|---|---|---|---|
| 1 | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 0 | 10 | 2 |
| 6 | | | Reserved | | |
| 7 | | | Reserved | | |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 | 2,3 | Type B | 0 | 10 | 4 |
| 13 | 2 | Type A | 0 | 2 | 7 |
| 14 | 3 | Type A | 0 | 3 | 12 |
| 15 | 2,3 | Type A | 0 | 0 | 6 |
| 16 | 2,3 | Type A | 0 | 2 | 6 |

FIG. 15

The starting symbol $S$ relative to the start of the slot, and the number of consecutive symbols $L$ counting from the symbol $S$ allocated for the PDSCH are determined from the start and length indicator $SLIV$:

if $(L-1) \leq 7$ then $$SLIV = 14 \cdot (L-1) + S$$

else $$SLIV = 14 \cdot (14-L+1) + (14-1-S)$$

where $0 < L \leq 14-S$

FIG. 16

Applicable PUSCH time domain resource allocation

| RNTI | PDCCH search space | pusch-ConfigCommon includes pusch-TimeDomainAllocationList | pusch-Config includes pusch-TimeDomainAllocationList | PUSCH time domain resource allocation to apply |
|---|---|---|---|---|
| PUSCH scheduled by MAC RAR as described in subclause 8.2 of [6, TS 38.213] | | No | - | PUSCH Default A |
| | | Yes | - | pusch-TimeDomainAllocationList provided in pusch-ConfigCommon |
| C-RNTI, MCS-C-RNTI, TC-RNTI, CS-RNTI | Any common search space associated with CORESET 0 | No | | PUSCH Default A |
| | | Yes | | pusch-TimeDomainAllocationList provided in pusch-ConfigCommon |
| C-RNTI, MCS-C-RNTI, TC-RNTI, CS-RNTI | Any common search space not associated with CORESET 0, | No | No | PUSCH Default A |
| | | Yes | No | pusch-TimeDomainAllocationList provided in pusch-ConfigCommon |
| | UE specific search space | No/Yes | Yes | pusch-TimeDomainAllocationList provided in pusch-Config |

FIG. 17

Default PUSCH time domain resource allocation A for normal CP (PUSCH default A)

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j+1 | 0 | 14 |
| 9 | Type A | j+1 | 0 | 12 |
| 10 | Type A | j+1 | 0 | 10 |
| 11 | Type A | j+2 | 0 | 14 |
| 12 | Type A | j+2 | 0 | 12 |
| 13 | Type A | j+2 | 0 | 10 |
| 14 | Type B | j | 8 | 6 |
| 15 | Type A | j+3 | 0 | 14 |
| 16 | Type A | j+3 | 0 | 10 |

FIG. 18

| DCI | PDCCH search space | pusch-ConfigCommon includes pusch-TimeDomainAllocationList | pusch-Config includes pusch-TimeDomainAllocationList | pusch-ConfigCommon includes pusch-TimeDomainAllocationList2 | pusch-Config includes pusch-TimeDomainAllocationList2 | PUSCH time domain resource allocation to apply |
|---|---|---|---|---|---|---|
| 3rd DCI | Any common search space not associated with CORESET#0, | No | No | Yes/No | Yes/No | PUSCH Default A |
|  |  | Yes | No | Yes/No | Yes/No | pusch-TimeDomainAllocationList provided in pusch-ConfigCommon |
|  | UE specific search space | Yes/No | Yes | Yes/No | Yes/No | pusch-TimeDomainAllocationList provided in pusch-Config |
| 4th DCI | Any common search space not associated with CORESET#0, | Yes/No | Yes/No | No | No | PUSCH Default B |
|  |  | Yes/No | Yes/No | Yes | No | pusch-TimeDomainAllocationList2 provided in pusch-ConfigCommon |
|  | UE specific search space | Yes/No | Yes/No | Yes/No | Yes | pusch-TimeDomainAllocationList2 provided in pusch-Config |

FIG. 19

| DCI | PDCCH search space | pusch-ConfigCommon includes pusch-TimeDomainAllocationList | pusch-Config includes pusch-TimeDomainAllocationList | pusch-Config includes pusch-TimeDomainAllocationList2 | PUSCH time domain resource allocation to apply |
|---|---|---|---|---|---|
| 3rd DCI | Any common search space not associated with CORESET#0, UE specific search space | No | No | Yes/No | PUSCH Default A |
|  |  | Yes | No | Yes/No | pusch-TimeDomainAllocationList provided in pusch-ConfigCommon |
|  |  | Yes/No | Yes | Yes/No | pusch-TimeDomainAllocationList provided in pusch-Config |
| 4th DCI | Any common search space not associated with CORESET#0, UE specific search space | No | Yes/No | No | PUSCH Default A |
|  |  | Yes | Yes/No | No | pusch-TimeDomainAllocationList provided in pusch-ConfigCommon |
|  |  | Yes/No | Yes/No | Yes | pusch-TimeDomainAllocationList2 provided in pusch-Config |

FIG. 20

BASE STATION APPARATUS, TERMINAL APPARATUS, AND COMMUNICATION METHOD

TECHNICAL FIELD

The present invention relates to a base station apparatus, a terminal apparatus, and a communication method. This application claims priority based on JP 2019-60243 filed on Mar. 27, 2019, the contents of which are incorporated herein by reference.

BACKGROUND ART

Technical studies and standardization of Long Term Evolution (LTE)-Advanced Pro and New Radio (NR) technology, as a radio access scheme and a radio network technology for fifth generation cellular systems, are currently conducted by the Third Generation Partnership Project (3GPP) (NPL 1).

The fifth generation cellular system includes three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) which allows a large number of machine type devices to be connected, such as Internet of Things (IoT).

CITATION LIST

Non Patent Literature

NPL 1: RP-161214, NTT DOCOMO Inc., "Revision of SI: Study on New Radio Access Technology", June 2016

SUMMARY OF INVENTION

Technical Problem

An object of one aspect of the present invention is to provide a terminal apparatus, a base station apparatus, a communication method, and an integrated circuit that enable efficient communication in the radio communication system as described above.

Solution to Problem (1) To accomplish the object described above, aspects of the present invention are contrived to provide the following measures. In other words, according to an aspect of the present invention, there is provided a terminal apparatus including: a reception unit configured to receive a first downlink control information (DCI); and a determination unit configured to determine transmission of a first physical uplink shared channel (PUSCH), wherein: the first PUSCH is scheduled by the first DCI, a value of a first PUSCH procedure preparation time for the first PUSCH is a first value in a case that a first condition is not satisfied, the value of the first PUSCH procedure preparation time is a value acquired by adding a second value to the first value in a case that the first condition is satisfied, and the determination unit determines the transmission of the first PUSCH in a case that a number of symbols between the first DCI and the first PUSCH is equal to or greater than a number of symbols corresponding to the value of the first PUSCH procedure preparation time.

(2) In addition, according to an aspect of the present invention, there is provided a base station apparatus including: a transmission unit configured to transmit a first downlink control information (DCI); and a determination unit configured to determine reception of a first physical uplink shared channel (PUSCH), wherein: the first PUSCH is scheduled by the first DCI, a value of a first PUSCH procedure preparation time for the first PUSCH is a first value in a case that a first condition is not satisfied, the value of the first PUSCH procedure preparation time is a value acquired by adding a second value to the first value in a case that the first condition is satisfied, and the determination unit determines the reception of the first PUSCH in a case that a number of symbols between the first DCI and the first PUSCH is equal to or greater than a number of symbols corresponding to the value of the first PUSCH procedure preparation time.

(3) A communication method according to an aspect of the present invention is a communication method for a terminal apparatus in a radio communication system, the communication method including: receiving a first downlink control information (DCI); and transmitting a first physical uplink shared channel (PUSCH), wherein: the first PUSCH is scheduled by the first DCI, a value of a first PUSCH procedure preparation time for the first PUSCH is a first value in a case that a first condition is not satisfied, the value of the first PUSCH procedure preparation time is a value acquired by adding a second value to the first value in a case that the first condition is satisfied, and the transmission of the first PUSCH is determined in a case that a number of symbols between the first DCI and the first PUSCH is equal to or greater than a number of symbols corresponding to the value of the first PUSCH procedure preparation time.

Advantageous Effects of Invention

According to an aspect of the present invention, a base station apparatus and a terminal apparatus can efficiently communicate with each other.

BRIEF DESCRIPTION OF DRAWINGS

FIG. 7 is a diagram illustrating an example of a PDSCH mapping type according to an embodiment of the present invention.

FIG. 10 is a diagram defining resource allocation table applied to a PDSCH time domain resource allocation according to an embodiment of the present invention.

FIG. 11 is an example of a table illustrating a method for determining a resource allocation table to be applied to a PDSCH according to an embodiment of the present invention.

FIG. 12 is another example of a table illustrating a method for determining a resource allocation table to be applied to a PDSCH according to an embodiment of the present invention.

FIG. 13 is a diagram illustrating an example of a default table A according to an embodiment of the present invention.

FIG. 14 is a diagram illustrating an example of a default table B according to an embodiment of the present invention.

FIG. 15 is a diagram illustrating an example of a default table C according to an embodiment of the present invention.

FIG. 16 is a diagram illustrating an example of calculation of a SLIV according to an embodiment of the present invention.

FIG. 17 is a diagram defining a resource allocation table that is applied to PUSCH time domain resource allocation according an embodiment of the present invention FIG. 18 is a diagram illustrating an example of a PUSCH default table A for a Normal Cyclic Prefix according to an embodiment of the present invention.

FIG. 19 is an example of a table illustrating a method for determining a resource allocation table to be applied to a PUSCH according to an embodiment of the present invention.

FIG. 20 is another example of a table illustrating a method for determining a resource allocation table to be applied to a PUSCH according to an embodiment of the present invention.

DESCRIPTION OF EMBODIMENTS

Embodiments of the present invention will be described below.

Figure 1:
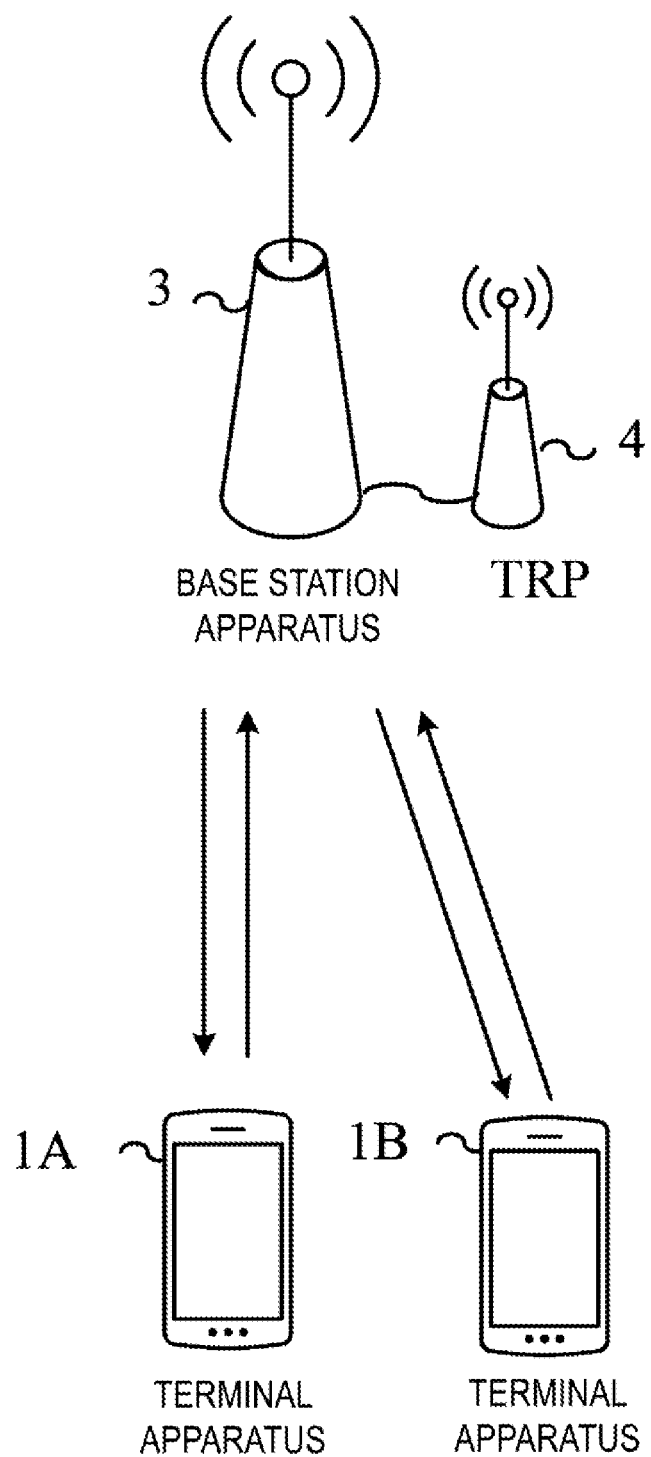
FIG. 1 is a diagram illustrating a concept of a radio communication system according to an embodiment of the present invention.

FIG. 1 is a diagram illustrating a concept of a radio communication system according to an embodiment of the present invention. In FIG. 1, the radio communication system includes a terminal apparatus 1A, a terminal apparatus 1B, and a base station apparatus 3. Hereinafter, the terminal apparatus 1A and the terminal apparatus 1B are also referred to as a terminal apparatus 1.

The terminal apparatus 1 is also called a user terminal, a mobile station device, a communication terminal, a mobile device, a terminal, User Equipment (UE), and a Mobile Station (MS). The base station apparatus 3 is also referred to as a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or gNB. The base station apparatus 3 may include a core network apparatus. Furthermore, the base station apparatus 3 may include one or more transmission reception points 4. At least some of the functions/processing of the base station apparatus 3 described below may be functions/processing at each of the transmission reception points 4 included in the base station apparatus 3. The base station apparatus 3 may have a communicable range (communication area), controlled by the base station apparatus 3, that includes one or more cells to serve the terminal apparatus 1. Furthermore, the base station apparatus 3 may have a communicable range (communication area), controlled by one or more transmission reception points 4, that includes one or more cells to serve the terminal apparatus 1. Furthermore, the base station apparatus 3 may divide one cell into multiple beamed areas and serve the terminal apparatus 1 in each of the beamed areas. Here, a beamed area may be identified based on a beam index used for beamforming or a precoding index.

A radio communication link from the base station apparatus 3 to the terminal apparatus 1 is referred to as a downlink. A radio communication link from the terminal apparatus 1 to the base station apparatus 3 is referred to as an uplink.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, Universal-Filtered Multi-Carrier (UFMC), Filtered OFDM (F-OFDM), Windowed OFDM multiplied by a window function, or Filter-Bank Multi-Carrier (FBMC) may be used.

Note that the present embodiment will be described by using OFDM symbol with the assumption that a transmission scheme is OFDM, and use of any other transmission scheme is also included in the present invention.

Furthermore, in FIG. 1, in the radio communication between the terminal apparatus 1 and the base station apparatus 3, the CP may not be used, or the above-described transmission scheme with zero padding may be used instead of the CP. Moreover, the CP or zero padding may be added both forward and backward.

An aspect of the present embodiment may be operated in carrier aggregation or dual connectivity with the Radio Access Technologies (RAT) such as LTE and LTE-A/LTE-A Pro. In this case, the aspect may be used for some or all of the cells or cell groups, or the carriers or carrier groups (e.g., Primary Cells (PCells), Secondary Cells (SCells), Primary Secondary Cells (PSCells), Master Cell Groups (MCGs), or Secondary Cell Groups (SCGs)). Moreover, the aspect may be independently operated and used in a stand-alone manner. In the dual connectivity operation, a Special Cell (SpCell) is referred to as the PCell of the MCG or the PSCell of the SCG depending on whether a Medium Access Control (MAC) entity is associated with the MCG or the SCG. In an operation other than the dual connectivity operation, a Special Cell (SpCell) is referred to as the PCell. The Special Cell (SpCell) supports PUCCH transmission and a contention based random access.

In the present embodiment, one or more serving cells may be configured for the terminal apparatus 1. The multiple configured serving cells may include one primary cell and one or more secondary cells. The primary cell may be a serving cell on which an initial connection establishment procedure has been performed, a serving cell on which a connection re-establishment procedure has been initiated, or a cell indicated as a primary cell during a handover procedure. One or more secondary cells may be configured at a point of time when or after a Radio Resource Control (RRC) connection is established. Note that the multiple configured serving cells may include one primary secondary cell. The primary secondary cell may be a secondary cell capable of transmitting control information on the uplink among one or more secondary cells configured for the terminal apparatus 1. Furthermore, two types of subset of serving cells, which are a master cell group and a secondary cell group, may be configured for the terminal apparatus 1. The master cell group may include one primary cell and zero or more secondary cells. The secondary cell group may include one primary secondary cell and zero or more secondary cells.

Time Division Duplex (TDD) and/or Frequency Division Duplex (FDD) may be applied to the radio communication system according to the present embodiment. The Time Division Duplex (TDD) scheme or the Frequency Division Duplex (FDD) scheme may be applied to all of the multiple cells. Cells to which the TDD scheme is applied and cells to which the FDD scheme is applied may be aggregated. The TDD scheme may be also referred to as an unpaired spectrum operation. The FDD scheme may be also referred to as a paired spectrum operation.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals according to the present embodiment will be described.

In FIG. 1, the following physical channels are used for the radio communication between the terminal apparatus 1 and the base station apparatus 3.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared CHannel (PUSCH)
Physical Random Access CHannel (PRACH)

The PBCH is used to broadcast essential information block ((Master Information Block (MIB), Essential Information Block (EIB), and Broadcast Channel (BCH)) which includes essential system information needed by the terminal apparatus 1.

The PBCH may be used to broadcast a time index within the period of the block (also referred to as an SS/PBCH block) of the synchronization signal. Here, the time index is information indicating the indices of the synchronization signal and the PBCH within the cell. For example, in a case that the SS/PBCH block is transmitted using the assumption of three transmission beams (Quasi Co-Location (QCL) for transmission filter configuration and reception spatial parameters), the order of time within a predetermined period or within a configured period may be indicated. Furthermore, the terminal apparatus may recognize a difference in time index as a difference in the transmission beam.

The PDCCH is used to transmit (or deliver) Downlink Control Information (DCI) in downlink radio communication (radio communication from the base station apparatus 3 to the terminal apparatus 1). Here, one or more pieces of DCI (which may be referred to as DCI formats) are defined for transmission of the downlink control information. In other words, a field for the downlink control information is defined as DCI and is mapped to information bits. The PDCCH is transmitted in PDCCH candidates. The terminal apparatus 1 monitors a set of PDCCH candidates in a serving cell. Monitoring means attempting to decode a PDCCH in accordance with a certain DCI format.

For example, the following DCI formats may be defined.
DCI format 0_0
DCI format 0_1
DCI format 0_2
DCI format 1_0
DCI format 1_1
DCI format 1_2
DCI format 2_0
DCI format 2_1
DCI format 2_2
DCI format 2_3

The DCI format 0_0 may be used for scheduling of the PUSCH in a certain serving cell. DCI format 0_0 may include information indicating PUSCH scheduling information (frequency domain resource allocation and time domain resource allocation). In the DCI format 0_0, Cyclic Redundancy Check (CRC) scrambled with any one of a Cell-RNTI (C-RNTI), Configured Scheduling (CS)-RNTI, MCS-C-RNTI, and/or a Temporary C-RNTI (TC-RNTI) among Radio Network Temporary Identifiers (RNTI) that are identifiers may be added. The DCI format 0_0 may be monitored in a common search space or a UE-specific search space.

The DCI format 0_1 may be used for scheduling of the PUSCH in a certain serving cell. DCI format 0_1 may include information indicating PUSCH scheduling information (frequency domain resource allocation and time domain resource allocation), information indicating a BandWidth Part (BWP), a Channel State Information (CSI) request, a Sounding Reference Signal (SRS) request, and/or information on an antenna port. In the DCI format 0_1, a CRC scrambled with any one of the C-RNTI, the CS-RNTI, the Semi Persistent (SP)-CSI-RNTI, and/or the MCS-C-RNTI among RNTIs may be added. The DCI format 0_1 may be monitored in a UE-specific search space.

The DCI format 0_2 may be used for scheduling of the PUSCH in a certain serving cell. DCI format 0_2 may include information indicating PUSCH scheduling information (frequency domain resource allocation and time domain resource allocation), information indicating a BWP, a CSI request, an SRS request, and/or information on an antenna port. In the DCI format 0_2, a CRC scrambled with any one of the C-RNTI, the CSI-RNTI, the SP-CSI-RNTI, and/or the MCS-C-RNTI among RNTIs may be added. The DCI format 0_2 may be monitored in the UE-specific search space. The DCI format 0_2 may be referred to as a DCI format 0_1A or the like.

The DCI format 1_0 may be used for scheduling of the PDSCH in a certain serving cell. DCI format 1_0 may include information indicating PDSCH scheduling information (frequency domain resource allocation and time domain resource allocation). In the DCI format 1_0, a CRC scrambled with any one of a C-RNTI, a CS-RNTI, an MCS-C-RNTI, a Paging RNTI (P-RNTI), a System Information (SI)-RNTI a Random Access (RA)-RNTI, and/or a TC-RNTI among identifiers may be added. The DCI format 1_0 may be monitored in a common search space or a UE-specific search space.

The DCI format 1_1 may be used for scheduling of the PDSCH in a certain serving cell. DCI format 1_1 may include information indicating PDSCH scheduling information (frequency domain resource allocation and time domain resource allocation), information indicating a bandwidth part (BWP), a Transmission Configuration Indication (TCI), and/or information on an antenna port. In the DCI format 1_1, a CRC scrambled with any one of the C-RNTI, the CS-RNTI, and/or the MCS-C-RNTI among RNTIs may be added. The DCI format 1_1 may be monitored in the UE-specific search space.

The DCI format 1_2 may be used for scheduling of the PDSCH in a certain serving cell. DCI format 1_2 may include information indicating PDSCH scheduling information (frequency domain resource allocation and time domain resource allocation), information indicating a BWP, a TCI, and/or information on an antenna port. In the DCI format 1_2, a CRC scrambled with any one of the C-RNTI, the CS-RNTI, and/or the MCS-C-RNTI among RNTIs may be added. The DCI format 1_2 may be monitored in the UE-specific search space. The DCI format 1_2 may be referred to as a DCI format 1_1A or the like.

DCI format 2_0 is used to notify the slot format of one or more slots. In the slot format, each OFDM symbol in the slot is defined so as to be classified to any of the downlink, the flexible, or the uplink. For example, in a case that slot format is 28, DDDDDDDDDDDDFU is applied to OFDM symbols of 14 symbols in the slot for which the slot format 28 is indicated. Here, D is a downlink symbol, F is a flexible symbol, and U is an uplink symbol. Note that the slot will be described below.

DCI format 2_1 is used to notify the terminal apparatus 1 of a physical resource block and the OFDM symbol which may be assumed not to be transmitted. Note that this information may be referred to as a preemption indication (intermittent transmission indication).

DCI format 2_2 is used for transmission of the PUSCH and a Transmit Power Control (TPC) command for the PUSCH.

DCI format 2_3 is used to transmit a group of TPC commands for sounding reference signal (SRS) transmission by one or more terminal apparatuses 1. The SRS request may be transmitted with the TPC command. The SRS request and the TPC command may be defined in DCI format 2_3 for the PUSCH and the uplink without PUCCH or the uplink in which the SRS transmit power control is not associated with the transmit power control for the PUSCH.

The DCI for the downlink is also referred to as downlink grant or downlink assignment. Here, the DCI for the uplink is also referred to as uplink grant or Uplink assignment. The DCI may also be referred to as a DCI format.

A CRC parity bit added to the DCI format transmitted in one PDCCH is scrambled with the SI-RNTI, the P-RNTI, the C-RNTI, the CS-RNTI, the RA-RNTI, or the TC-RNTI. The SI-RNTI may be an identifier used to broadcast system information. The P-RNTI may be an identifier used for paging and notification of system information changes. The C-RNTI, the MCS-C-RNTI, and the CS-RNTI are identifiers that are used for identifying a terminal apparatus within a cell. The TC-RNTI is an identifier that is used for identifying a terminal apparatus 1 that has transmitted a random access preamble during a contention based random access procedure.

The C-RNTI is used to control the PDSCH or the PUSCH in one or multiple slots. The CS-RNTI is used for periodically allocating resources of the PDSCH or the PUSCH. The MCS-C-RNTI is used for indicating the use of a predetermined MCS table for grant-based transmission. The TC-RNTI is used for controlling PDSCH transmission or PUSCH transmission in one or multiple slots. The TC-RNTI is used for scheduling re-transmission of the random access message 3 and transmission of the random access message 4. The RA-RNTI is determined in accordance with frequency and time positional information on the physical random access channel on which the random access preamble has been transmitted.

Different values may be used for the C-RNTI and/or the other RNTIs in correspondence with a type of traffic of the PDSCH or the PUSCH. The C-RNTI and the other RNTI may use different values in correspondence with a service type (eMBB, URLLC, and/or mMTC) of data transmitted in the PDSCH or PUSCH. The base station apparatus 3 may use an RNTI having a different value in correspondence with a service type of data to be transmitted. The terminal apparatus 1 may identify a service type of data transmitted in the relating PDSCH or PUSCH using the value of the RNTI applied to (used for scrambling of) the received DCI.

The PUCCH is used to transmit Uplink Control Information (UCI) in uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK). The HARQ-ACK may indicate a HARQ-ACK for downlink data (Transport block, Medium Access Control Protocol Data Unit (MAC PDU), or Downlink-Shared Channel (DL-SCH)). The HARQ-ACK is also referred to as ACK/NACK, HARQ feedback, HARQ-ACK feedback, a HARQ response, a HARQ-ACK bit, a HARQ-ACK information bit, a HARQ-ACK response, a HARQ information, HARQ-ACK information, HARQ control information, and HARQ-ACK control information. In a case that downlink data has been successfully decoded, an ACK for the downlink data is generated. In a case that the downlink data has not been successfully decoded, a NACK for the downlink data is generated. Discontinuous transmission (DTX) may represent that downlink data has not been detected. The discontinuous (DTX) transmission may represent that data for which the HARQ-ACK response is to be transmitted has not been detected.

The PDSCH is used to transmit downlink data (Downlink Shared CHannel (DL-SCH)) from Medium Access Control (MAC) layer. Furthermore, in a case of the downlink, the PDSCH is used to transmit System Information (SI), a Random Access Response (RAR), and the like.

The PUSCH may be used for transmission of uplink data (Uplink Shared CHannel (UL-SCH) or the HARQ-ACK and/or the CSI together with the uplink data from the MAC layer. Furthermore, the PUSCH may be used to transmit the CSI only or the HARQ-ACK and CSI only. In other words, the PUSCH may be used to transmit the UCI only.

Here, the base station apparatus 3 and the terminal apparatus 1 exchange (transmit and/or receive) signals with each other in higher layers. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. The base station apparatus 3 and the terminal apparatus 1 may transmit and/or receive a Medium Access Control (MAC) control element in a Medium Access Control (MAC) layer. The RRC layer of the terminal apparatus 1 acquires system information notified from the base station apparatus 3. Here, the RRC signaling, the system information, and/or the MAC control element will be also referred to as signals of a higher layer (higher layer signaling) or parameters of a higher layer. Since the higher layer described herein refers to a higher layer with respect to a physical layer, the higher layer may include one or more of a MAC layer, an RRC layer, an RLC layer, a PDCP layer, a Non Access Stratum (NAS) layer, and the like. For example, in processing of the MAC layer, the higher layer may include one or more of an RRC layer, an RLC layer, a PDCP layer, a NAS layer, and the like. Hereinafter, the meaning "A is given by a higher layer" or "A is given using a higher layer" may mean that a higher layer (mainly an RRC layer, a MAC layer, or the like) of the terminal apparatus 1 receives A from the base station apparatus 3, and the received A is given from a higher layer of the terminal apparatus 1 to the physical layer of the terminal apparatus 1. Configuring parameters of a higher layer in the terminal apparatus 1 may represent that the parameters of the higher layer are provided for the terminal apparatus.

The PDSCH or the PUSCH may be used to transmit the RRC signaling and the MAC control element. Here, the RRC signaling transmitted from the base station apparatus 3 may be signaling common to the multiple terminal apparatuses 1 in the cell in PDSCH. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1. The PUSCH may be used to transmit a UE Capability in the uplink.

In FIG. 1, the following downlink physical signals are used for downlink radio communication. Here, the downlink physical signals are not used to transmit information output from the higher layers but are used by the physical layer.

Synchronization Signal (SS)
Reference Signal (RS)

The synchronization signal may include a Primary Synchronization Signal (PSS) and a Secondary Synchronization Signal (SSS). A cell ID may be detected by using the PSS and SSS.

The synchronization signal is used for the terminal apparatus 1 to establish synchronization in a frequency domain and a time domain in the downlink. Here, the synchronization signal may be used for the terminal apparatus 1 to select precoding or a beam in precoding or beamforming performed by the base station apparatus 3. Note that the beam may be referred to as a transmit or receive filter configuration, or a spatial domain transmit filter or a spatial domain receive filter.

A reference signal is used for the terminal apparatus 1 to perform channel compensation on a physical channel. Here, the reference signal is used for the terminal apparatus 1 to calculate the downlink CSI. Furthermore, the reference signal may be used for a numerology such as a radio parameter or subcarrier spacing, or used for fine synchronization that allows FFT window synchronization to be achieved.

According to the present embodiment, at least one of the following downlink reference signals are used.

Demodulation Reference Signal (DMRS)
Channel State Information Reference Signal (CSI-RS)
Phrase Tracking Reference Signal (PTRS)
Tracking Reference Signal (TRS)

The DMRS is used to demodulate a modulated signal. Note that two types of reference signals may be defined as the DMRS: a reference signal for demodulating the PBCH and a reference signal for demodulating the PDSCH or that both reference signals may be referred to as the DMRS. The CSI-RS is used for measurement of Channel State Information (CSI) and beam management, and the method for transmitting a periodic, semi-persistent, or aperiodic CSI reference signal is applied. As the CSI-RS, a Non-Zero Power (NZP) CSI-RS and a Zero Power (ZP) CSI-RS in which the transmit power (or the receive power) is zero may be defined. Here, the ZP CSI-RS may be defined as a CSI-RS resource in which the transmit power is zero or not transmitted. The PTRS is used to track a phase in the time axis to ensure a frequency offset due to phase noise. The TRS is used to ensure Doppler shift during high-speed travel. Note that the TRS may be used as one configuration of the CSI-RS. For example, a radio resource may be configured with one port of the CSI-RS as the TRS.

In the present embodiment, one or more of the following uplink reference signals are used.

Demodulation Reference Signal (DMRS)
Phrase Tracking Reference Signal (PTRS)
Sounding Reference Signal (SRS)

The DMRS is used to demodulate a modulated signal. Note that two types of reference signals may be defined as the DMRS: a reference signal for demodulating the PUCCH and a reference signal for demodulating the PUSCH or that both reference signals may be referred to as the DMRS. The SRS is used for measurement of channel state information (CSI), channel sounding, and beam management of the uplink. The PTRS is used to track the phase in the time axis to ensure the frequency offset due to the phase noise.

The downlink physical channels and/or the downlink physical signals are collectively referred to as a downlink signal. The uplink physical channels and/or the uplink physical signals are collectively referred to as an uplink signal. The downlink physical channels and/or the uplink physical channels are collectively referred to as a physical channel. The downlink physical signals and/or the uplink physical signals are collectively referred to as a physical signal.

The BCH, the UL-SCH, and the DL-SCH are transport channels. A channel used in the Medium Access Control (MAC) layer is referred to as a transport channel. A unit of the transport channel used in the MAC layer is also referred to as a Transport Block (TB) and/or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

Figure 2:
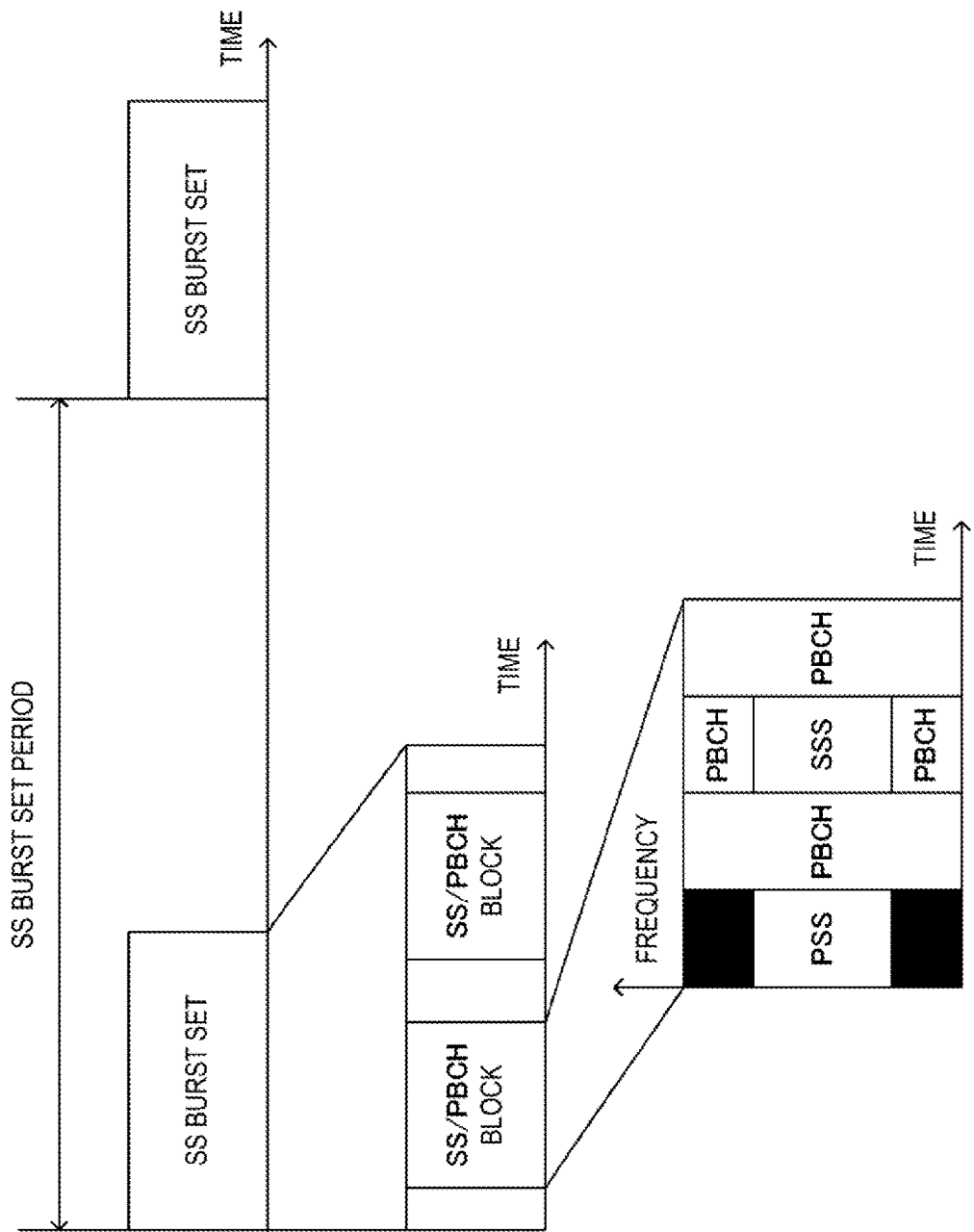
FIG. 2 is a diagram illustrating an example of a Synchronization Signal (SS)/Physical Broadcast CHannel (PBCH) block and an SS burst set according to an embodiment of the present invention.

FIG. 2 is a diagram illustrating an example of the SS/PBCH block (also referred to as a synchronization signal block, an SS block, and an SSB) and an SS burst set (also referred to as a synchronization signal burst set) according to an embodiment of the present invention. FIG. 2 illustrates an example in which two SS/PBCH blocks are included within an SS burst set that is periodically transmitted, and the SS/PBCH block is composed of continuous 4 OFDM symbols.

The SS/PBCH block is a unit block including at least the synchronization signal (PSS, SSS) and/or the PBCH. Transmission of the signal/channel included in the SS/PBCH block is expressed as transmission of the SS/PBCH block. In a case that the base station apparatus 3 transmits the synchronization signal and/or the PBCH using one or more SS/PBCH blocks in the SS burst set, a downlink transmission beam independent for each SS/PBCH block may be used.

In FIG. 2, the PSS, the SSS, and the PBCH are time/frequency multiplexed in one SS/PBCH block. Note that the order of multiplexing the PSS, the SSS, and/or the PBCH in the time domain may be different from that in the example illustrated in FIG. 2.

The SS burst set may be transmitted periodically. For example, a period used for initial access and a period configured for a connected (Connected or RRC_Connected) terminal apparatus may be defined. Furthermore, the period configured for the connected (Connected or RRC_Connected) terminal apparatus may be configured in the RRC layer. Additionally, the period configured for the connected (Connected or RRC_Connected) terminal may be a period of a radio resource in the time domain during which transmission is potentially to be performed, and in practice, whether the transmission is to be performed during the period may be determined by the base station apparatus 3. Furthermore, the period used for the initial access may be predefined in specifications or the like.

The SS burst set may be determined based on a System Frame Number (SFN). Furthermore, a start position (boundary) of the SS burst set may be determined based on the SFN and the period.

The SSB index (also may be referred to as an SSB/PBCH block index) may be allocated to the SS/PBCH block depending on the temporal position in the SS burst set. The terminal apparatus 1 calculates the SSB index based on the information of the PBCH and/or the information of the reference signal included in the detected SS/PBCH block.

The same SSB index is allocated to the SS/PBCH blocks with the same relative time in each SS burst set in the multiple SS burst sets. The SS/PBCH blocks with the same relative time in each SS burst set in the multiple SS burst sets may be assumed to be the QCL (or the same downlink transmission beam is applied). In addition, the antenna ports in the SS/PBCH blocks with the same relative time in each SS burst set in the multiple SS burst sets may be assumed to be QCL with respect to the average delay, the Doppler shift, and the spatial correlation.

Within the period of a certain SS burst set, the SS/PBCH blocks to which the same SSB index has been allocated may be assumed to be QCL with respect to the average delay, the average gain, the Doppler spread, the Doppler shift, and the spatial correlation. A configuration corresponding to one or more SS/PBCH blocks (or may be the reference signal), which is QCL, may be referred to as a QCL configuration.

The number of SS/PBCH blocks (may be referred to as the number of SS blocks or the SSB number) may be defined as, for example, the number (block number) of SS/PBCH blocks in the SS burst, the SS burst set, or the period of the SS/PBCH block. Moreover, the number of SS/PBCH blocks may indicate the number of beam groups for cell selection in the SS burst, the SS burst set, or the period of the SS/PBCH block. Here, the beam group may be defined as the number of different SS/PBCH blocks or the number of different beams included in the SS burst, the SS burst set, or the period of the SS/PBCH block.

Hereinafter, the reference signal described in the present embodiment includes a downlink reference signal, a synchronization signal, an SS/PBCH block, a downlink DM-RS, a CSI-RS, an uplink reference signal, an SRS, and/or an uplink DM-RS. For example, the downlink reference signal, the synchronization signal, and/or the SS/PBCH block may be referred to as a reference signal. The reference signal used in the downlink includes a downlink reference signal, a synchronization signal, an SS/PBCH block, a downlink DM-RS, a CSI-RS, and the like. The reference signal used in the uplink includes an uplink reference signal, an SRS, and/or an uplink DM-RS.

The reference signal may also be used for Radio Resource Measurement (RRM). The reference signal may also be used for beam management.

Beam management may be a procedure of the base station apparatus 3 and/or the terminal apparatus 1 for matching directivity of an analog and/or digital beam in a transmission apparatus (the base station apparatus 3 in the downlink and the terminal apparatus 1 in the uplink) with directivity of an analog and/or digital beam in a reception apparatus (the terminal apparatus 1 in the downlink and the base station apparatus 3 in the uplink) to acquire a beam gain.

Note that the following procedure may be included as a procedure for constituting, configuring, or establishing a beam pair link.

Beam selection
Beam refinement
Beam recovery

For example, the beam selection may be a procedure for selecting a beam in communication between the base station apparatus 3 and the terminal apparatus 1. Furthermore, the beam refinement may be a procedure for selecting a beam having a higher gain or changing a beam to an optimum beam between the base station apparatus 3 and the terminal apparatus 1 according to the movement of the terminal apparatus 1. The beam recovery may be a procedure for re-selecting the beam in a case that the quality of a communication link is degraded due to blockage caused by a blocking object, a passing human being, or the like in communication between the base station apparatus 3 and the terminal apparatus 1.

Beam management may include beam selection and/or beam refinement. Beam recovery may include the following procedures.

Detection of beam failure
Discovery of New Beam
Transmission of beam recovery request
Monitoring of response to beam recovery request For example, a Reference Signal Received Power (RSRP) of the SSS included in the CSI-RS or the SS/PBCH block may be used in selection of the transmission beam of the base station apparatus 3 in the terminal apparatus 1, or the CSI may be used. A CSI-RS Resource Index (CRI) may be used as a report to the base station apparatus 3, or an index indicated in the sequence of the PBCH and/or the demodulation reference signal (DMRS) used for demodulation of the PBCH included in the SS/PBCH block may be used.

The base station apparatus 3 indicates the time index of the CRI or the SS/PBCH in an indication of the beam to the terminal apparatus 1, and the terminal apparatus 1 receives the indicated CRI or SS/PBCH time index. At this time, the terminal apparatus 1 may perform reception with the spatial filter configured based on the indicated time index of the CRI or the SS/PBCH. The terminal apparatus 1 may perform reception using the assumption of the Quasi Co-Location (QCL). A certain signal (an antenna port, a synchronization signal, a reference signal, or the like) which is "QCL" with respect to another signal (an antenna port, a synchronization signal, a reference signal, or the like) or "use of the QCL assumption" can be interpreted as an association of the certain signal with another signal.

In a case that a Long Term Property of a channel on which one symbol in one antenna port is carried may be estimated from a channel on which one symbol in the other antenna port is carried, the two antenna ports are said to be QCL. The long term property of the channel includes at least one of a delay spread, a Doppler spread, a Doppler shift, an average gain, or an average delay. For example, in a case that an antenna port 1 and an antenna port 2 are QCL with respect to the average delay, this means that a reception timing for the antenna port 2 may be estimated from a reception timing for the antenna port 1.

The QCL may also be expanded to beam management. For this purpose, spatially expanded QCL may be newly defined. For example, the Long term property of a channel in spatial domain QCL assumption may be an Angle of Arrival (AoA), a Zenith angle of Arrival (ZoA), or the like and/or an angle spread, for example, Angle Spread of Arrival (ASA) or a Zenith angle Spread of Arrival (ZSA), a transmission angle (AoD, ZoD, or the like) or an angle spread of the transmission angle, for example, an Angle Spread of Departure (ASD) or a Zenith angle Spread of Departure (ZSD), or Spatial Correlation, or a reception spatial parameter in a radio link or channel.

For example, in a case that the antenna port 1 and the antenna port 2 are assumed to be QCL with respect to the reception spatial parameter, it means that a reception beam that receives a signal from the antenna port 2 may be inferred from a reception beam (receive spatial filter) that receives a signal from the antenna port 1.

A combination of the long term properties which may be considered to be QCL may be defined as a QCL type. For example, the following types may be defined.

Type A: Doppler shift, Doppler spread, Average delay, Delay spread
Type B: Doppler shift, Doppler spread
Type C: Average delay, Doppler shift
Type D: Reception spatial parameter The above-mentioned QCL type may configure and/or indicate, as a Transmission Configuration Indication (TCI), the QCL assumption with respect to one or two reference signals and the PDCCH or the PDSCH DMRS in the RRC and/or the MAC layer and/or the DCI. For example, in a case that the index #2 of the SS/PBCH block and the QCL type A+the QCL type B are configured and/or indicated as one state of the TCI at the time of receiving the PDCCH by the terminal apparatus 1, the terminal apparatus 1 may assume, at the time of receiving the PDCCH DMRS, the Doppler shift, the Doppler spread, the average delay, the delay spread, and the reception spatial parameter in reception of the SS/PBCH block index #2 as the channel long term properties, and may receive the DMRS of the PDCCH to perform synchronization or channel estimation. At this time, the reference signal (in the above-mentioned example, the SS/PBCH block) indicated by the TCI may be referred to as a source reference signal, and a reference signal (in the above-mentioned example, the PDCCH DMRS) affected by the long term properties inferred from the channel long term properties in reception of the source reference signal may be referred to as a target reference signal. In the TCI, one or multiple TCI states and a combination of a source reference signal and a QCL type for each of the states are configured in the RRC, and the terminal apparatus 1 may be indicated for the TCI using the MAC layer or the DCI.

According to this method, operation of the base station apparatus 3 and the terminal apparatus 1 equivalent to beam management may be defined based on the spatial domain QCL assumption and the radio resources (the time and/or the frequency) as beam management and beam indication/report.

Hereinafter, the subframe will be described. The subframe in the present embodiment may also be referred to as a resource unit, a radio frame, a time period, or a time interval.

Figure 3:
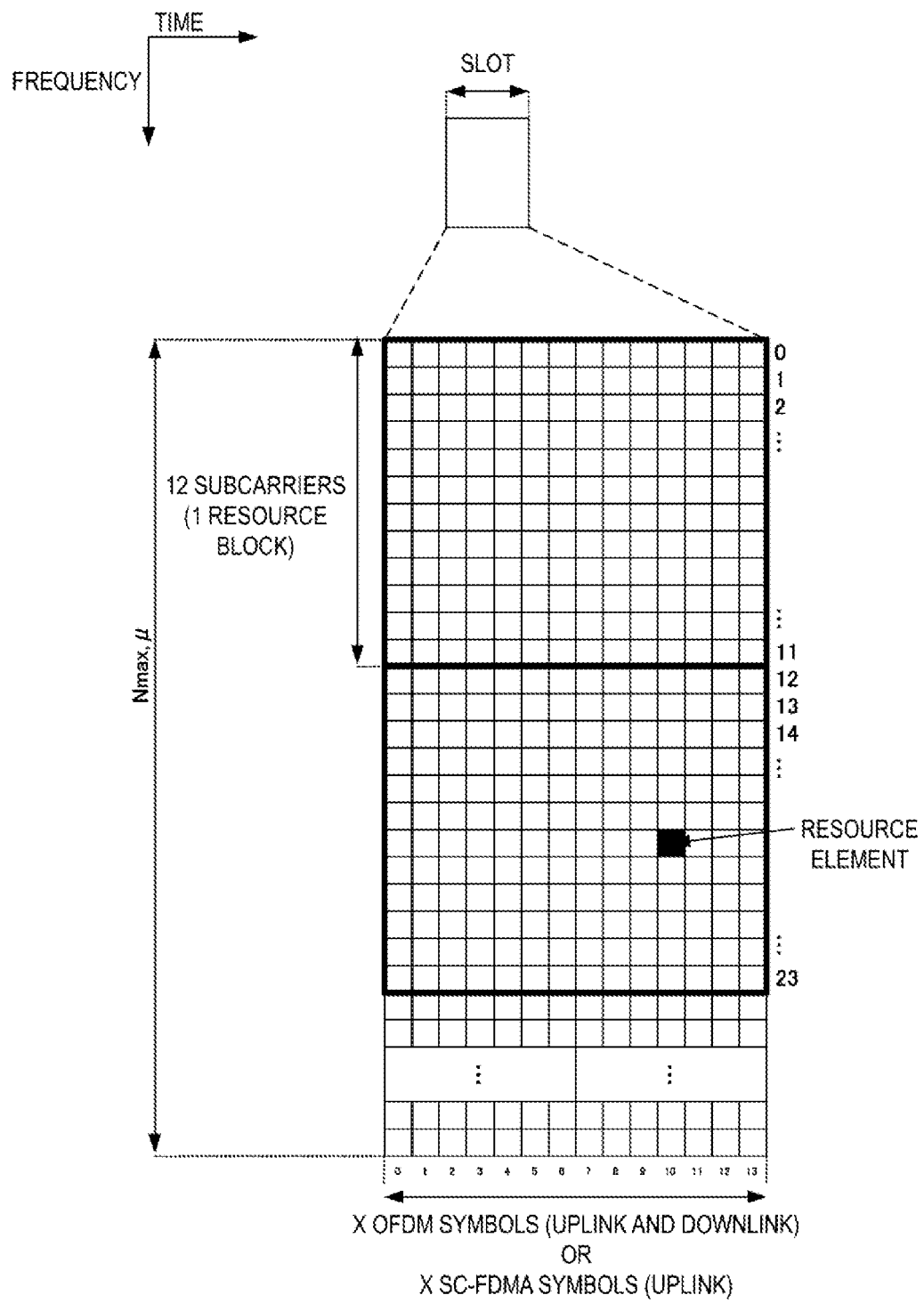
FIG. 3 is a diagram illustrating an example of schematic configurations of uplink and downlink slots according to an embodiment of the present invention.

FIG. 3 is a diagram illustrating an example of a schematic configuration of schematic configurations of uplink and downlink slots according to an embodiment of the present invention. Each of the radio frames is 10 ms in length. Furthermore, each of the radio frames includes 10 subframes and W slots. For example, one slot includes X OFDM symbols. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X=7 or X=14, and X=7 ad X=14 correspond to 0.5 ms and 1 ms, respectively. In addition, in a case that the subcarrier spacing is 60 kHz, X=7 or X=14, and X=7 and X=14 correspond to 0.125 ms and 0.25 ms, respectively. For example, in the case of X=14, W=10 is used for the subcarrier spacing being 15 kHz, and W=40 is used for the subcarrier spacing being 60 kHz. FIG. 3 illustrates a case of X=7 as an example. Note that a case of X=14 can be similarly configured by expanding the case of X=7. Furthermore, the uplink slot is defined similarly, and the downlink slot and the uplink slot may be defined separately. The cell bandwidth of FIG. 3 may be also defined as a part of band (BandWidth Part (BWP)). Moreover, the slot may be also defined as a Transmission Time Interval (TTI). The slot may not be defined as the TTI. The TTI may be a transport block transmission period.

The signal or the physical channel transmitted in each of the slots may be represented by a resource grid. Each resource grid is defined by multiple subcarriers and multiple OFDM symbols for each numerology (subcarrier spacing and a cyclic prefix length) and each carrier. The number of subcarriers constituting one slot depends on each of the downlink and uplink bandwidths of a cell. Each element in the resource grid is referred to as a resource element. The resource element may be identified by using a subcarrier number and an OFDM symbol number.

A resource grid is used to represent mapping of a certain physical downlink channel (such as the PDSCH) or an uplink channel (such as the PUSCH) to a resource element. For example, in a case that the subcarrier spacing is 15 kHz and the number X of OFDM symbols included in the subframe is 14 and the NCPs are used, one physical resource block is defined by 14 continuous OFDM symbols in the time domain and by 12*Nmax continuous subcarriers in the frequency domain. The Nmax is the maximum number of resource blocks determined by a subcarrier spacing configuration μ described below. That is, the resource grid includes (14*12*Nmax, μ) resource elements. In the case of Extended CPs (ECPs), the ECPs are supported only in a subcarrier spacing of 60 kHz, and therefore, one physical resource block is, for example, defined by 12 (the number of OFDM symbols included in one slot)*4 (the number of slots included in one subframe)=48 continuous OFDM symbols in the time domain and by 12*Nmax, μ continuous subcarriers in the frequency domain. That is, the resource grid includes (48*12*Nmax, μ) resource elements.

As resource blocks, a reference resource block, a common resource block, a physical resource block, and a virtual resource block are defined. One resource block is defined as 12 continuous subcarriers in the frequency domain. The reference resource block is common to all the subcarriers and may configure a resource block, for example, at the subcarrier spacing of 15 kHz and may be numbered in an ascending order. A subcarrier index 0 at a reference resource block index 0 may be referred to as a reference point A (point A) (may be simply referred to as a "reference point"). The common resource block is a resource block numbered from 0 in an ascending order in each subcarrier spacing configuration μ from the reference point A. The resource grid described above is defined by this common resource block. The physical resource block is a resource block numbered from 0 included in the below-described bandwidth part (BWP) in an ascending order, and the physical resource block is a resource block numbered from 0 included in the bandwidth part (BWP) in an ascending order. A certain physical uplink channel is first mapped to a virtual resource block. Thereafter, the virtual resource block is mapped to a physical resource block. Hereinafter, the resource block may be either a virtual resource block or a physical resource block or may be either a common resource block or a reference resource block.

Next, the subcarrier spacing configuration μ will be described. As described above, one or multiple OFDM numerologies are supported in the NR. For a certain BWP, the subcarrier spacing configuration μ (here, μ=0, 1, . . . , 5) and the cyclic prefix length are given to the BWP of a downlink in a higher layer and are given to the BWP of an uplink in a higher layer. In a case that μ is given, the subcarrier spacing Δf is given by $\Delta f = 2^\mu * 15$ (kHz).

In the subcarrier spacing configuration μ, the slot is counted in an ascending order from 0 to $N^{subframe, \mu}_{slot}-1$ in the subframe, and is counted in an ascending order from 0 to $N^{frame, \mu}_{slot}-1$ in the frame. $N^{slot}_{symb}$ continuous OFDM symbols are in the slot based on the slot configuration and the cyclic prefix. $N^{slot}_{symb}$ is 14. The start of the slot $n^{\mu}_{s}$ in the subframe is aligned in time with the start of the $n^{\mu}_{s} \cdot N^{slot}_{symb}$-th OFDM symbol in the same subframe.

Figure 4:
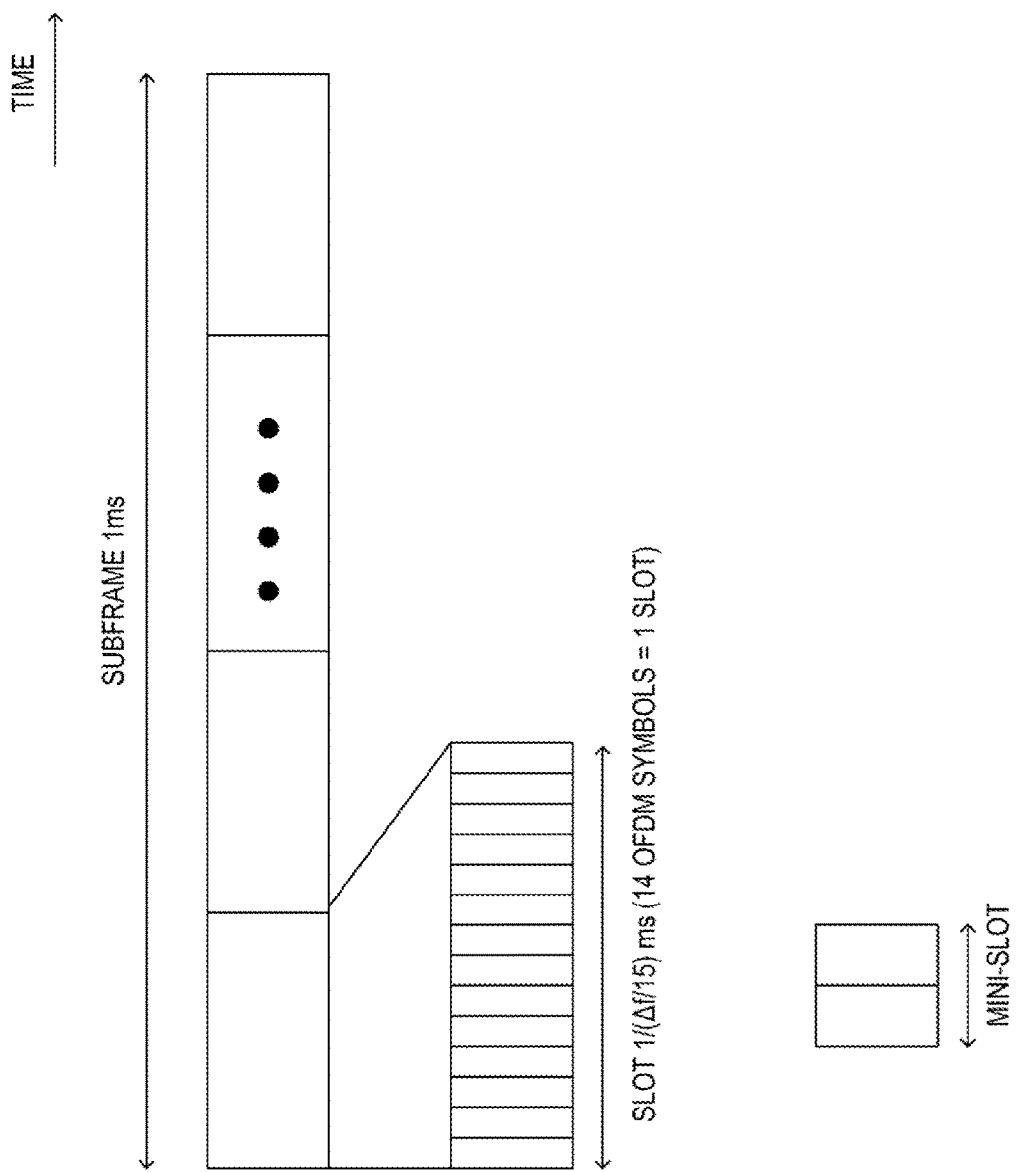
FIG. 4 is a diagram illustrating a relationship among a subframe, a slot, and a mini-slot in a time domain according to an embodiment of the present invention.

The subframe, the slot, and a mini-slot will now be described. FIG. 4 is a diagram illustrating a relationship among a subframe, a slot, and a mini-slot in a time domain according to an embodiment of the present invention. As illustrated in this figure, three types of time units are defined. The subframe is 1 ms regardless of the subcarrier spacing. The number of OFDM symbols included in the slot is 7 or 14, and the slot length depends on the subcarrier spacing. Here, in a case that the subcarrier spacing is 15 kHz, 14 OFDM symbols are included in one subframe. The downlink slot may be referred to as a PDSCH mapping type A. The uplink slot may be referred to as a PUSCH mapping type A.

The mini-slot (it may be also referred to as a subslot) is a time unit including OFDM symbols that are less in number than the OFDM symbols included in one slot. FIG. 4 illustrates, by way of example, a case in which the mini-slot includes 2 OFDM symbols. The OFDM symbols in the mini-slot may match the timing for the OFDM symbols constituting the slot. Note that the smallest unit of scheduling may be a slot or a mini-slot. Moreover, allocation of a mini-slot may be referred to as non-slot based scheduling. Scheduling of a mini-slot may be expressed as scheduling of a resource in which the relative time positions of the start positions of the reference signal and the data are fixed. The downlink mini-slot may be referred to as a PDSCH mapping type B. The uplink mini-slot may be referred to as a PUSCH mapping type B.

Figure 5:
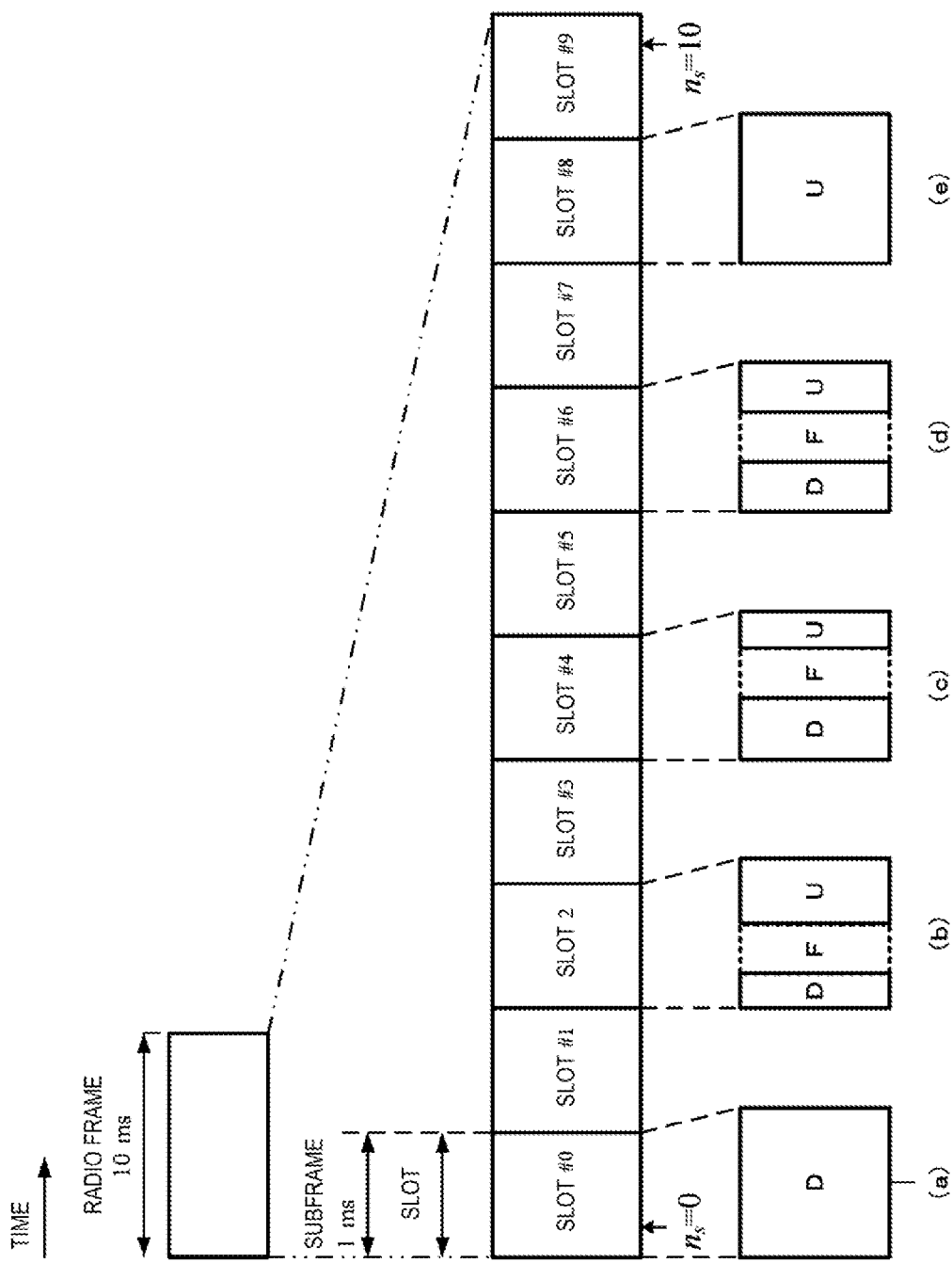
FIG. 5 is a diagram illustrating an example of the slot or the subframe according to an embodiment of the present invention.

FIG. 5 is a diagram illustrating an example of the slot or the subframe according to an embodiment of the present invention. Here, a case that the slot length is 1 ms at a subcarrier spacing of 15 kHz is illustrated as an example. In this figure, D represents the downlink, and U represents the uplink. As illustrated in this figure, during a certain time period (for example, a minimum time period to be allocated to one UE in the system), one or some of a downlink symbol, flexible symbol, and an uplink symbol may be included. Note that a ratio of these may be determined in advance as slot formats. The ratio may be defined by the number of downlink OFDM symbols included in the slot or the start position and the end position in the slot. The ratio may be defined by the number of uplink OFDM symbols or DFT-S-OFDM symbols included in the slot or the start position and the end position in the slot. Note that scheduling of the slot may be expressed as scheduling of a resource in which the relative time positions of the reference signal and the slot boundary are fixed.

The terminal apparatus 1 may receive a downlink signal or a downlink channel in a downlink symbol or a flexible symbol. The terminal apparatus 1 may transmit an uplink signal or a downlink channel in an uplink symbol or a flexible symbol.

FIG. 5(a) is an example where the entirety of a certain time period (may be referred to as, e.g., the minimum unit or the time unit of the time resource that can be allocated to one UE, and may be referred to as a time unit in which the multiple minimum units of the time resource are bundled) is used for downlink transmission, and FIG. 5(b) illustrates that uplink scheduling is performed via, e.g., the PDCCH in a first time resource and an uplink signal is transmitted through a flexible symbol including the processing delay of the PDCCH, the switching time from the downlink to the uplink, and generation of a transmit signal. FIG. 5(c) is used for transmission of the PDCCH and/or the downlink PDSCH in the first time resource, and is used for transmission of the PUSCH or the PUCCH via a gap for the processing delay, the switching time from the downlink to the uplink, and generation of the transmit signal. Here, for example, the uplink signal may be used to transmit the HARQ-ACK and/or CSI, namely, the UCI. FIG. 5(d) is used for transmission of the PDCCH and/or the PDSCH in the first time resource, and is used for transmission of the uplink PUSCH and/or the PUCCH via the gap for the processing delay, the switching time from the downlink to the uplink, and generation of the transmit signal. Here, for example, the uplink signal may be used to transmit the uplink data, namely, the UL-SCH. FIG. 5(e) is an example where the entirety is used for uplink transmission (the PUSCH or the PUCCH).

The above-described downlink part and uplink part may include multiple OFDM symbols as is the case of LTE.

Figure 6:
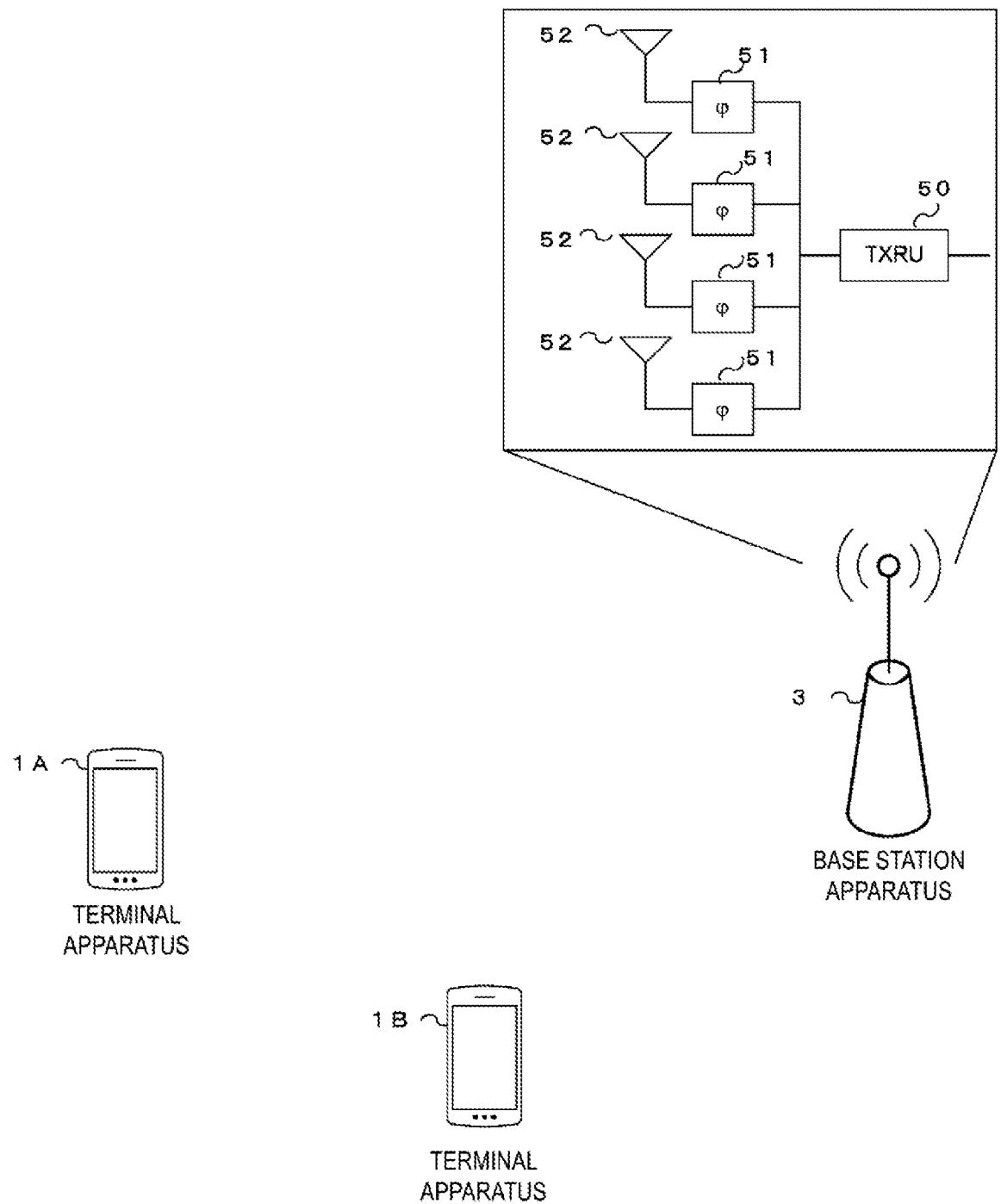
FIG. 6 is a diagram illustrating an example of beamforming according to an embodiment of the present invention.

FIG. 6 is a diagram illustrating an example of beamforming according to an embodiment of the present invention. Multiple antenna elements are connected to one Transceiver unit (TXRU) 50. The phase is controlled by using a phase shifter 51 for each antenna element and a transmission is performed from an antenna element 52, thus allowing a beam for a transmit signal to be directed in any direction. Typically, the TXRU may be defined as an antenna port, and only the antenna port may be defined for the terminal apparatus 1. Control of the phase shifter 51 allows setting of directivity in any direction, and therefore, the base station apparatus 3 can communicate with the terminal apparatus 1 by using a high gain beam.

Hereinafter, the Bandwidth part (BWP) will be described. The BWP is also referred to as a carrier BWP. The BWP may be configured for each of the downlink and the uplink. The BWP is defined as a set of continuous physical resources selected from a continuous subset of common resource blocks. Up to four BWPs for which one downlink carrier BWP (DL BWP) is activated at a certain time may be configured for the terminal apparatus 1. Up to four BWPs for which one uplink carrier BWP (UL BWP) is activated at a certain time may be configured for the terminal apparatus 1. In the case of carrier aggregation, the BWP may be configured in the serving cell. At this time, configuration of one BWP in a certain serving cell may be expressed as no BWP being configured. Furthermore, configuration of two or more BWPs may be expressed as configuration of the BWP.

MAC Entity Operation

In an activated serving cell, there is always one active (activated) BWP. BWP switching for a certain serving cell is used to activate an inactive (deactivated) BWP and deactivate an active (activated) BWP. BWP switching for a certain serving cell is controlled by the PDCCH indicating downlink allocation or uplink grant. BWP switching for a certain serving cell may be further controlled by the MAC entity at the time of start of a random access procedure using a BWP inactivity timer or RRC signaling. In addition of the SpCell (a PCell or a PSCell) or activation of the SCell, one BWP is initially active without receiving the PDCCH indicating downlink allocation or uplink grant. The DL BWP (first active DL BWP) and the UL BWP (first active UL BWP) that are initially active may be specified by an RRC message transmitted from the base station apparatus 3 to the terminal apparatus 1. An active BWP for a certain serving cell is specified by the RRC or the PDCCH transmitted from the base station apparatus 3 to the terminal apparatus 1. The DL BWP (first active DL BWP) and the UL BWP (first active UL BWP) that are initially active may be included in the message 4. In an Unpaired spectrum (a TDD band or the like), a DL BWP and an UL BWP are paired, and BWP switching is common to the UL and the DL. In an active BWP for each activated serving cell for which the BWP is configured, the MAC entity of the terminal apparatus 1 applies normal processing. The normal processing includes transmission of the UL-SCH, transmission of the RACH, monitoring of the PDCCH, transmission of the PUCCH, transmission of the SRS, and reception of the DL-SCH. In an inactive BWP for each activated serving cell for which the BWP is configured, the MAC entity of the terminal apparatus 1 does not transmit the UL-SCH, does not transmit the RACH, does not monitor the PDCCH, does not transmit the PUCCH, and does not transmit the SRS, and does not receive the DL-SCH. In a case that a certain serving cell is deactivated, the active BWP may not be present (e.g., the active BWP is deactivated).

RRC Operation

A BWP information element (IE) included in the RRC message (broadcast system information or information transmitted in a dedicated RRC message) is used to configure the BWP. The RRC message transmitted from the base station apparatus 3 is received by the terminal apparatus 1. For each serving cell, a network (the base station apparatus 3 or the like) configures, for the terminal apparatus 1, at least an initial BWP including a downlink BWP and one (e.g., in case of configuring the uplink for the serving cell) or two (e.g., the case of using a supplementary uplink) uplink BWPs. Furthermore, the network may configure an additional uplink BWP and downlink BWP for a certain serving cell. The BWP configuration is divided into an uplink parameter and a downlink parameter. Furthermore, the BWP configuration is also divided into a common parameter and a dedicated parameter. The common parameter (a BWP uplink common IE, a BWP downlink common IE, or the like) is a cell-specific parameter. The common parameter of the initial BWP of the primary cell is also provided with system information. For all of other serving cells, the network provides the common parameter with a dedicated signal. The BWP is identified by a BWP ID. The BWP ID of initial BWP is 0. The BWP IDs of the other BWPs take values of 1 to 4.

In a case that the higher layer parameter initialDownlinkBWP is not configured (provided) for the terminal apparatus 1, the initial DL BWP (the initially active DL BWP, the initial active DL BWP) may be defined using positions and the number of continuous PRBs, the subcarrier spacing, and the cyclic prefix for receiving a PDCCH in a control resource set (CORESET) for a Type 0 PDCCH common search space. The positions of the continuous PRBs begins with a minimum index PRB and end with a maximum index PRB between PRBs of the control resource set used for the type 0 PDCCH common search space. In a case that the higher layer parameter initialDownlinkBWP is configured (provided) for the terminal apparatus 1, the initial DL BWP may be indicated by the higher layer parameter initialDownlinkBWP. The parameter initialDownlinkBWP of a higher layer may be included in the SIB1 (systemInformationBlockType1, ServingCellConfigCommonSIB) or ServingCellConfigCommon. The information element ServingCellConfigCommonSIB is used for configuring a cell-specific parameter of the serving cell for the terminal apparatus 1 within the SIB1.

In other words, in a case that the higher layer parameter initialDownlinkBWP is not configured (provided) for the terminal apparatus 1, the size of the initial DL BWP may be the number of resource blocks of the control resource set (CORESET #0) used for the type 0 PDCCH common search space. In a case that the higher layer parameter initialDownlinkBWP is configured (provided) for the terminal apparatus 1, the size of the initial DL BWP may be given using locationAndBandwidth included in the higher layer parameter initialDownlinkBWP. The higher layer parameter locationAndBandwidth may indicate a position and a bandwidth of the frequency domain of the initial DL BWP.

As described above, multiple DL BWPs may be configured for the terminal apparatus 1. In the DL BWP configured for the terminal apparatus 1, a default DL BWP can be configured by a higher layer parameter defaultDownlinkBWP-Id. In a case that the higher layer parameter defaultDownlinkBWP-Id is not provided for the terminal apparatus 1, the default DL BWP is an initial DL BWP.

The initial UL BWP may be provided for the terminal apparatus 1 using SIB1 (systemInformationBlockType1) or initialUplinkBWP. The information element initialUplinkBWP is used to configure the initial UL BWP. For an operation in an SpCell or a secondary cell, the initial active UL BWP (the initially active UL BWP) may be configured (provided) by the higher layer parameter initialUplinkBWP in the terminal apparatus 1. In a case that a supplemental uplink carrier (supplementary UL carrier) is configured for the terminal apparatus 1, an initial UL BWP in a complementary uplink carrier may be configured by the initialUplinkBWP included in the higher layer parameter supplementaryUplink in the terminal apparatus 1.

Hereinafter, a control resource set (CORESET) according to the present embodiment will be described.

The control resource set (CORESET, Control resource set) is time and frequency resources for searching for downlink control information. An identifier of the CORESET (ControlResourceSetId, CORESET-ID) and information that identifies a frequency resource of the CORESET are included in the configuration information of the CORESET. The information element ControlResourceSetId (the identifier of the CORESET) is used for identifying a control resource set in a certain serving cell. The identifier of the CORESET is used between BWPs in a certain serving cell. The identifier of the CORESET is unique among BWPs in a serving cell. The number of CORESETs in each BWP is limited to 3 including the initial CORESET. In a certain serving cell, the value of the identifier of the CORESET takes a value in the range of 0 to 11.

A control resource set identified by an identifier 0 (ControlResourceSetId 0) of the CORESET is referred to as CORESET #0. The CORESET #0 may be configured by pdcch-ConfigSIB1 included in the MIB or PDCCH-Config-Common included in ServingCellConfigCommon. In other words, the configuration information of CORESET #0 may be pdcch-ConfigSIB1 included in the MIB or PDCCH-ConfigCommon included in ServingCellConfigCommon. The configuration information of CORESET #0 may be configured by controlResourceSetZero included in PDCCH-ConfigSIB1 or PDCCH-ConfigCommon. In other words, the information element controlResourceSetZero is used for indicating CORESET #0 (common CORESET) of the initial DL BWP. The CORESET indicated by pdcch-ConfigSIB1 is CORESET #0. The information element pdcch-ConfigSIB1 in the MIB or the dedicated configuration is used for configuring the initial DL BWP. In the configuration information pdcch-ConfigSIB1 of the CORESET for CORESET #0, although the identifier of the CORESET and information that explicitly identifies frequency resources (for example, the number of continuous resource blocks) and time resources (the number of consecutive symbols) of the CORESET are not included, the frequency resources (for example, the number of continuous resource blocks) and the time resources (the number of consecutive symbols) of the CORESET for CORESET #0 can be explicitly identified using information included in the pdcch-ConfigSIB1. The information element PDCCH-ConfigCommon is used for configuring a cell-specific PDCCH parameter provided by the SIB. In addition, the PDCCH-ConfigCommon may also be provided at the time of handover and addition of a PSCell and/or an SCell. The configuration information of CORESET #0 is included in the configuration of the initial BWP. In other words, the configuration information of CORESET #0 may not be included in the configuration of a BWP other than the initial BWP. controlResourceSetZero corresponds to four bits (for example, four MSBs, or the four most significant bits) of pdcch-ConfigSIB1. The CORESET #0 is a control resource set for the type 0 PDCCH Common Search Space.

The configuration information of additional common control resource set (additional common CORESET) may be configured by commonControlResourceSet included in PDCCH-ConfigCommon. The configuration information of the additional common CORESET may also be used for specifying an additional common CORESET for system information and/or a paging procedure. The configuration information of the additional common CORESET may be used for specifying an additional common CORESET used in a random access procedure. The configuration information of the additional common CORESET may be included in the configuration of each BWP. The identifier of the CORESET represented in commonControlResourceSet takes a value other than 0.

The common CORESET may be a CORESET (for example, an additional common CORESET) that is used in the random access procedure. Furthermore, in the present embodiment, the CORESET configured in the configuration information of CORESET #0 and/or the additional common CORESET may be included in the common CORESET. In other words, the common CORESET may include CORESET #0 and/or the additional common CORESET. CORESET #0 may be referred to as common CORESET #0. Also for a BWP other than the BWP in which the common CORESET is configured, the terminal apparatus 1 may refer to (acquire) the configuration information of the common CORESET.

The configuration information of one or multiple CORESETs may be configured by PDCCH-Config. The information element PDCCH-Config is used for configuring UE-specific PDCCH parameters (for example, a CORSET, a search space, and the like) for a certain BWP. The PDCCH-Config may be included in the configuration of each BWP.

In other words, in the present embodiment, the configuration information of the common CORESET indicated by the MIB is pdcch-ConfigSIB1, the configuration information of the common CORESET indicated by PDCCH-Config-Common is controlResourceSetZero; and the configuration information of the common CORESET (an additional common CORESET) indicated by PDCCH-ConfigCommon is commonControlResourceSet. The configuration information of one or multiple CORESETs (UE specifically configured Control Resource Sets, UE-specific CORESET) indicated by PDCCH-Config is controlResourceSetToAddModList.

The search space is defined for searching for PDCCH candidates. searchSpaceType included in the configuration information of the search space indicates whether the search space is a Common Search Space (CSS) or a UE-specific Search Space (USS). The UE-specific search space is derived from at least a value of a C-RNTI set by the terminal apparatus 1. In other words, the UE-specific search space is derived individually for each terminal apparatus 1. The common search space is a common search space among multiple terminal apparatuses 1 and is composed of a Control Channel Element (CCE) of an index set in advance. The CCE includes multiple resource elements. Information of a DCI format monitored in the search space is included in the configuration information of the search space.

An identifier of the CORESET identified by the configuration information of the CORESET is included in the configuration information of the search space. A CORESET identified by the identifier of the CORESET included in the configuration information of the search space is associated with the search space. In other words, the CORESET associated with the search space is a CORESET that is identified by the identifier of the CORESET included in the search space. A DCI format indicated by the configuration information of the search space is monitored by the associated CORESET. Each search space is associated with one CORESET. For example, the configuration information of the search space for the random access procedure may be configured by ra-SearchSpace. In other words, a DCI format to which a CRC scrambled using RA-RNTI or TC-RNTI in the CORESET associated with the ra-SearchSpace is added is monitored.

The terminal apparatus 1 monitors candidate sets of PDCCHs in one or multiple CORESETs allocated in each active serving cell configured to monitor the PDCCH. The candidate sets of PDCCHs correspond to one or multiple search space sets. Monitoring means decoding a candidate for each PDCCH in accordance with one or multiple DCI formats that are monitored. The candidate sets of PDCCHs monitored by the terminal apparatus 1 are defined by a PDCCH search space set. One search space set is a common search space set or a UE-specific search space set. In the above description, the search space set is referred to as a search space, the common search space set is referred to as a common search space, and a UE-specific search space set is referred to as a UE-specific search space. The terminal apparatus 1 monitors the PDCCH candidates in one or multiple search space sets described below.

Type 0 PDCCH Common Search Space Set (a Type 0-PDCCH common search space set, a Type 0 common search space): This search space set is configured using pdcch-ConfigSIB1 indicated by MIB that is a parameter of a higher layer, a search space SIB1 (searchSpaceSIB1) indicated by PDCCH-ConfigCommon, or a search space zero (searchSpaceZero) included in PDCCH-ConfigCommon. This search space is used for monitoring the DCI format of a CRC scrambled with the SI-RNRI in a primary cell.

Type 0 APDCCH Common Search Space Set (a Type 0A-PDCCH common search space set, a Type 0A common search space): This search space set is configured by a search space (searchSpaceOtherSystemInformation) indicated by PDCCH-ConfigCommon that is a parameter of a higher layer. This search space is used for monitoring the DCI format of a CRC scrambled with the SI-RNRI in a primary cell.

Type 1 PDCCH Common Search Space Set (a Type1-PDCCH common search space set, a Type 1 common search space): This search space set is configured by a search space (ra-SearchSpace) used for a random access procedure indicated by PDCCH-ConfigCommon that is a higher layer parameter. This search space is used for monitoring the DCI format of a CRC scrambled with the RA-RNRI or TC-RNTI in a primary cell. Type 1 PDCCH Common Search Space Set is a search space set for a random access procedure.

Type 2 PDCCH Common Search Space Set (a Type2-PDCCH common search space set, a Type 2 common search space): This search space set is configured by a search space (pagingSearchSpace) used for a paging procedure indicated by PDCCH-ConfigCommon that is a higher layer parameter. This search space is used for monitoring the DCI format of a CRC scrambled with the P-RNTI in a primary cell.

Type 3 PDCCH Common Search Space Set (a Type3-PDCCH common search space set, a Type 3 common search space): This search space set is configured by a search space (SearchSpace) of which a search space type indicated by PDCCH-Config that is a higher layer parameter is common. This search space is used for monitoring the DCI format of a CRC scrambled with INT-RNTI, SFI-RNTI, TPC-PUSCH-RNTI, TPC-PUCCH-RNTI, or TPC-SRS-RNTI. The primary cell is used for monitoring the DCI format of a CRC scrambled with a C-RNTI, CS-RNTI(s), or MCS-C-RNTI.

UE-specific Search Space Set (a UE-specific search space set): This search space set is configured by a UE-specific search space (SearchSpace) of which a search space type indicated by PDCCH-Config that is a higher layer parameter is a UE-specific search space (SearchSpace). This search space is used for monitoring the DCI format of a CRC scrambled with C-RNTI, CS-RNTI(s), or MCS-C-RNTI.

In a case that the terminal apparatus 1 provides one or multiple search space sets using corresponding higher layer parameters (searchSpaceZero, searchSpaceSIB1, searchSpaceOtherSystemInformation, pagingSearchSpace, ra-SearchSpace, and the like), and the terminal apparatus 1 provides the C-RNTI or the CS-RNTI, the terminal apparatus 1 may monitor PDCCH candidates for the DCI format 0_0 and the DCI format 1_0 having the C-RNTI or the CS-RNTI in the one or multiple search space sets.

The configuration information of the BWP is divided into configuration information of the DL BWP and configuration information of the UL BWP. An information element bwp-Id (an identifier of the BWP) is included in the configuration information of the BWP. The identifier of the BWP included in the configuration information of the DL BWP is used for identifying (referring to) a DL BWP in a certain serving cell. The identifier of the BWP included in the configuration information of the UL BWP is used for identifying (referring to) the UL BWP in a certain serving cell. The identifier of the BWP is assigned to each of the DL BWP and UL BWP. For example, an identifier of the BWP corresponding to the DL BWP may be referred to as a DL BWP index. The identifier of the BWP corresponding to the UL BWP may be referred to as a UL BWP index. The initial DL BWP is referred to using an identifier 0 of the DL BWP. The initial UL BWP is referred to using an identifier 0 of the UL BWP. Each of the other DL BWPs or the other UL BWPs can be referred to using identifiers 1 to maxNrofBWPs of the BWP. In other words, the identifier of the BWP set to 0 (bwp-Id=0) is associated with the initial BWP and cannot be used for the other BWPs. maxNrofBWPs is a maximum number of BWPs per serving cell and is 4. The value of identifiers of the other BWPs take values of 1 to 4. The other higher layer configuration information is associated with a particular BWP using the identifier of the BWP. In a case that the DL BWP and the UL BWP have the same BWP identifier, it may mean that the DL BWP and UL BWP are paired.

One primary cell and up to 15 secondary cells may be configured for the terminal apparatus 1.

Hereinafter, a procedure for receiving a PDSCH will be described.

The terminal apparatus 1 may decode (receive) a corresponding PDSCH by detecting the PDCCH including the DCI format 1_0, the DCI format 1_1, or the DCI format 1_2. The corresponding PDSCH is scheduled (indicated) by the DCI format (DCI). The start position (start symbol) of the scheduled PDSCH will be referred to as S. The start symbol S of the PDSCH may be the first symbol that is transmitted by the PDSCH (mapped) in a certain slot. The start symbol S corresponds to the beginning of the slot. For example, in a case that the value of S is 0, the terminal apparatus 1 may receive the PDSCH from the first symbol in a certain slot. For example, in a case that the value of S is 2, the terminal apparatus 1 may receive the PDSCH from the third symbol of the slot. The number of consecutive symbols of the scheduled PDSCH will be referred to as L. The number of consecutive symbols L is counted from the start symbol S. The determination of S and L allocated to the PDSCH will be described below.

The types of PDSCH mapping include a PDSCH mapping type A and a PDSCH mapping type B. In the PDSCH mapping type A, S takes a value in the range of 0 to 3. L takes a value in the range of 3 to 14. However, the sum of S and L takes a value in the range of 3 to 14. In the PDSCH mapping type B, S takes a value in the range of 0 to 12. L takes one value from {2, 4, 7}. However, the sum of S and L takes a value in the range of 2 to 14.

The position of the DMRS symbol for the PDSCH depends on the type of PDSCH mapping. The position of the first DMRS symbol (first DM-RS symbol) for the PDSCH depends on the type of PDSCH mapping. In the PDSCH mapping type A, the position of the first DMRS symbol may be indicated by a parameter dmrs-TypeA-Position of a higher layer. In other words, the parameter dmrs-TypeA-Position of the higher layer is used to indicate the position of the first DMRS for the PDSCH or the PUSCH. dmrs-TypeA-Position may be set to either 'pos2' or 'pos3'. For example, in a case that dmrs-TypeA-Position is set to 'pos2', the position of the first DMRS symbol for the PDSCH may be the third symbol in the slot. For example, in a case that dmrs-TypeA-Position is set to 'pos3', the position of the first DMRS symbol for the PDSCH may be the fourth symbol in the slot. Here, S takes a value "3" only in a case that dmrs-TypeA-Position is set to 'pos3'. In other words, in a case that dmrs-TypeA-Position is set to "pos2", S takes a value in the range of 0 to 2. In the PDSCH mapping type B, the position of the first DMRS symbol corresponds to the first symbol of the allocated PDSCH.

FIG. 7 is a diagram illustrating an example of a PDSCH mapping type according to an embodiment of the present invention. FIG. 7(A) is a diagram illustrating an example of the PDSCH mapping type A. In FIG. 7(A), S of the allocated PDSCH is 3. L of the allocated PDSCH is 7. In FIG. 7(A), the position of the first DMRS symbol for the PDSCH is the fourth symbol in the slot. In other words, dmrs-TypeA-Position is set to 'pos3'. FIG. 7(B) is a diagram illustrating an example of the PDSCH mapping type A. In FIG. 7(B), S of the allocated PDSCH is 4. L of the allocated PDSCH is 4. In FIG. 7(B), the position of the first DMRS symbol for the PDSCH corresponds to the first symbol to which the PDSCH is allocated.

Hereinafter, a method for identifying PDSCH time domain resource allocation will be described.

The base station apparatus 3 may schedule such that the terminal apparatus 1 is caused to receive the PDSCH using the DCI. The terminal apparatus 1 may receive the PDSCH by detecting the DCI addressed to the terminal apparatus 1 itself. The terminal apparatus 1 determines, in a case of identifying the PDSCH time domain resource allocation, a resource allocation table that is initially applied to the PDSCH. The resource allocation table includes one or multiple PDSCH time domain resource allocation configurations. The terminal apparatus 1 may select one PDSCH time domain resource allocation configuration in the determined resource allocation table based on the value indicated in the 'Time domain resource assignment' field included in the DCI for scheduling the PDSCH. In other words, the base station apparatus 3 determines resource allocation of the PDSCH for the terminal apparatus 1, generates a 'Time domain resource assignment' field of a value based on the determined resource allocation, and transmits the DCI including the Time domain resource assignment' field to the terminal apparatus 1. The terminal apparatus 1 identifies resource allocation of the PDSCH in the time direction based on the value of the 'Time domain resource assignment' field.

Figure 8:
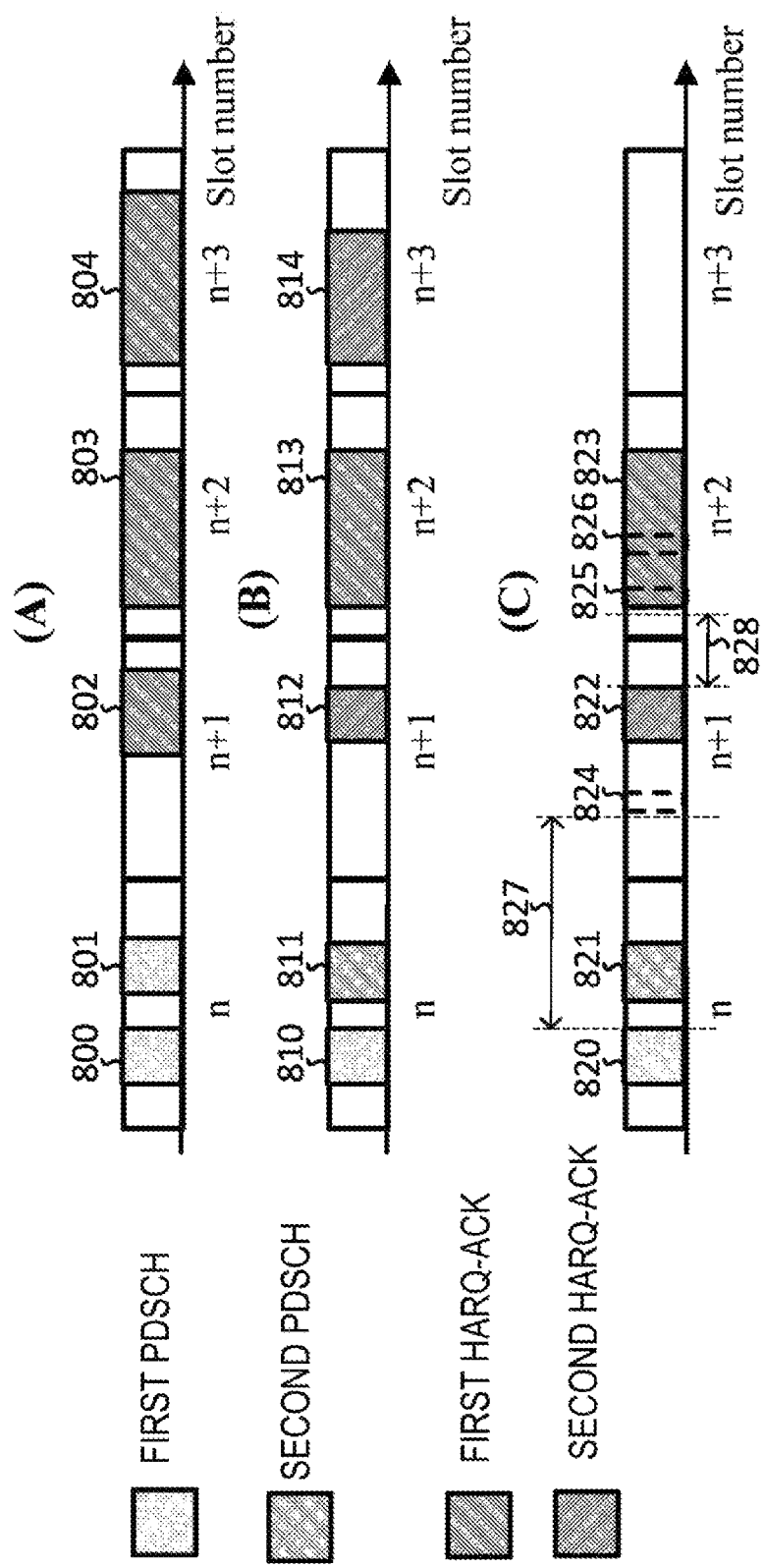
FIG. 8 is a diagram illustrating an example of PDSCH reception scheduled by a PDCCH accompanying a DCI according to an embodiment of the present invention and transmission of a corresponding HARQ-ACK.
Figure 9:
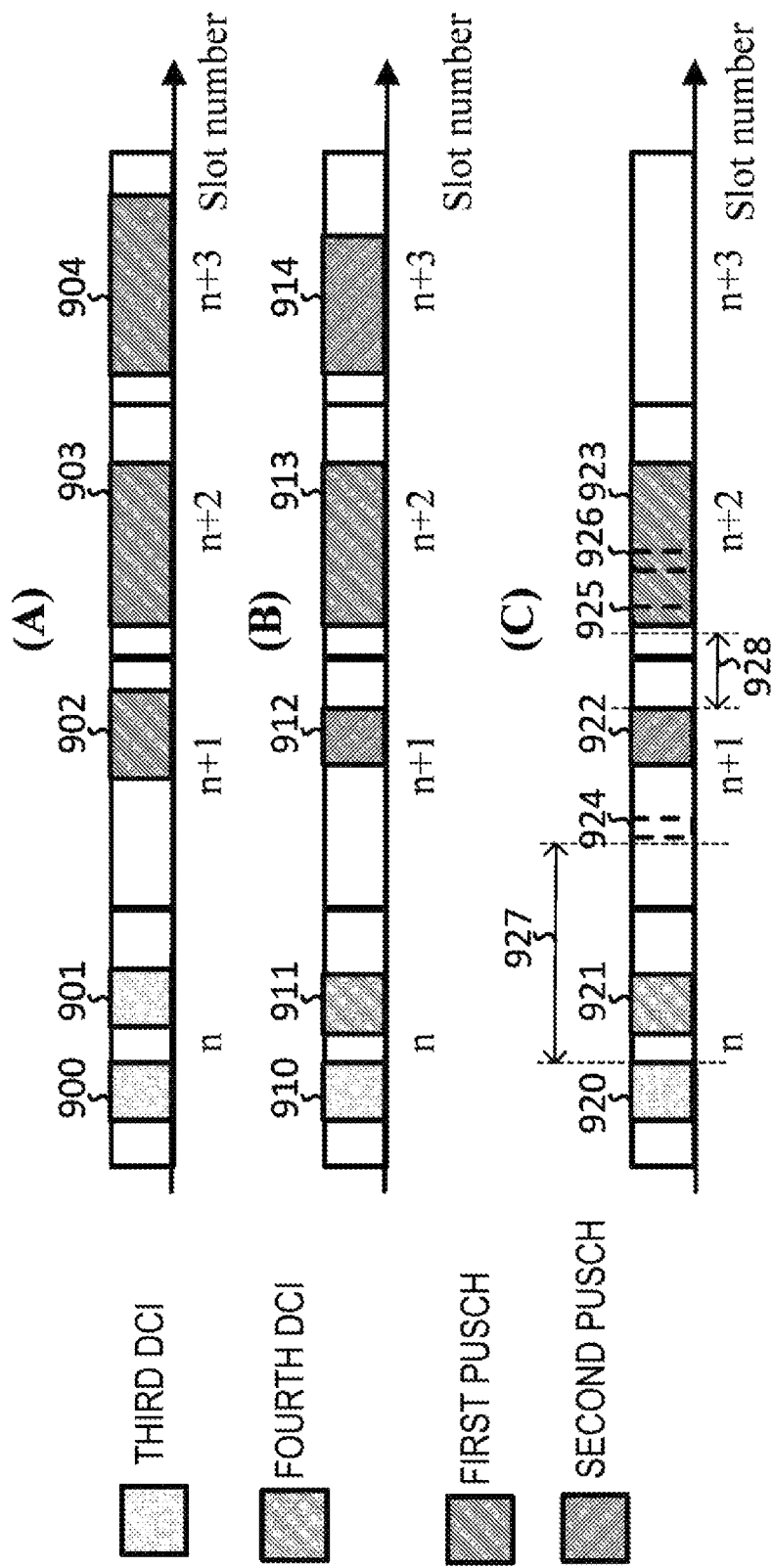
FIG. 9 is a diagram illustrating an example of transmission of a PUSCH scheduled by a PDCCH accompanying a DCI according to an embodiment of the present invention.

FIG. 8 is a diagram illustrating an example of PDSCH reception scheduled by a PDCCH accompanying a DCI according to an embodiment of the present invention and transmission of a corresponding HARQ-ACK. FIG. 9 is a diagram illustrating an example of transmission of a PUSCH scheduled by a PDCCH accompanying a DCI according to an embodiment of the present invention. Details of FIG. 8 and FIG. 9 will be described later. FIG. 10 is a diagram defining a resource allocation table applied to a PDSCH time domain resource allocation according to an embodiment of the present invention. The terminal apparatus 1 may determine a resource allocation table to be applied to the PDSCH time domain resource allocation based on the table illustrated in FIG. 10. The resource allocation table includes one or multiple configurations of PDSCH time domain resource allocation. In the present embodiment, resource allocation tables are classified into (I) a resource allocation table defined in advance and (II) a resource allocation table configured from an RRC signal of a higher layer. The resource allocation table defined in advance, for example, is defined as a default PDSCH time domain resource allocation A, a default PDSCH time domain resource allocation B, and a default PDSCH time domain resource allocation C. In addition, a default PDSCH time domain resource allocation D different from the default PDSCH time domain resource allocation A may be defined. Hereinafter, the default PDSCH time domain resource allocation A will be referred to as a default table A, the default PDSCH time domain resource allocation B will be referred to as a default table B, the default PDSCH time domain resource allocation C will be referred to as a default table C, and the default PDSCH time domain resource allocation D will be referred to as a default table D.

FIG. 11 is an example of a table illustrating a method for determining a resource allocation table to be applied to a PDSCH according to an embodiment of the present invention. FIG. 12 is another example of a table illustrating a method for determining a resource allocation table to be applied to a PDSCH according to an embodiment of the present invention. Details of FIG. 11 and FIG. 12 will be described later. FIG. 13 is a diagram illustrating an example of a default table A according to an embodiment of the present invention. FIG. 14 is a diagram illustrating an example of a default table B according to an embodiment of the present invention. FIG. 15 is a diagram illustrating an example of a default table C according to an embodiment of the present invention. In the example of FIG. 13, the number of rows of the default table A is 16, and each of the rows indicates a configuration of the PDSCH time domain resource allocation. In FIG. 13, each row defines a PDSCH mapping type, a slot offset $K_0$ between a PDCCH including the DCI and the PDSCH, a start symbol S of the PDSCH in the slot, and the number of consecutive allocated symbols L.

The resource allocation table configured by an RRC signal of a higher layer is given by a signal pdsch-TimeDomainAllocationList of the higher layer. pdsch-TimeDomainAllocationList includes one or multiple information elements PDSCH-TimeDomainResourceAllocation. PDSCH-TimeDomainResourceAllocation indicates a configuration of PDSCH time domain resource allocation. PDSCH-TimeDomainResourceAllocation may be used to configure a relationship between a PDCCH including the DCI and the PDSCH in the time domain. In other words, pdsch-TimeDomainAllocationList is a list including one or multiple information elements. One PDSCH-TimeDomainResourceAllocation may be also referred to as one entry (or one row). For example, pdsch-TimeDomainAllocationList includes up to 16 entries, and any one entry may be used by a 4-bit field included in the DCI. However, the number of entries included in pdsch-TimeDomainAllocationList may be a different number, and the number of bits of a field included in the relating DCI may be a different value. In each entry of pdsch-TimeDomainAllocationList, $K_0$, mappingType, and/or startSymbolAndLength may be indicated. $K_0$ indicates a slot offset between a PDCCH including the DCI and the PDSCH. In a case that $K_0$ is not indicated by PDSCH-TimeDomainResourceAllocation, the terminal apparatus 1 may assume that the value of $K_0$ is a predetermined value (for example, 0). mappingType indicates whether the mapping type of the corresponding PDSCH is the PDSCH mapping type A or the PDSCH mapping type B. StartSymbolAndLength is an index for providing an effective combination of the start symbol S of the corresponding PDSCH and the number of consecutive allocated symbols L. startSymbolAndLength may be also referred to as an indicator of a start position and a length (a start and length indicator (SLIV). In a case that the SLIV is applied, different from a case where a default table is used, a start symbol S of the corresponding PDSCH and the number of consecutive symbols L are given based on the SLIV. The base station apparatus 3 may set the value of the SLIV such that the time domain resource allocation of the PDSCH does not exceed a slot boundary. The slot offset $K_0$ and the SLIV will be described below.

The signal pdsch-TimeDomainAllocationList of the higher layer may be included in the cell-specific RRC parameter pdsch-ConfigCommon and/or the terminal apparatus 1 (UE)-specific RRC parameter pdsch-Config. pdsch-ConfigCommon is used to configure cell specific parameters for the PDSCH for a certain BWP. pdsch-Config is used to configure the terminal apparatus 1 (UE)-specific parameter for the PDSCH for a certain BWP.

The terminal apparatus 1 may apply different resource allocation tables to the PDSCH time domain resource allocation between the case of receiving the first PDSCH and the case of receiving the second PDSCH. The base station apparatus 3 may apply different resource allocation tables to the PDSCH time domain resource allocation between the case of transmitting the first PDSCH and the case of transmitting the second PDSCH.

The first PDSCH and the second PDSCH may be PDSCHs that transmit data of different services. For example, the first PDSCH may be a PDSCH that transmits data of eMBB, and the second PDSCH may be a PDSCH that transmits data of URLLC. The first PDSCH may be a PDSCH that is scheduled by the first DCI. The second PDSCH may be a PDSCH that is scheduled by the second DCI. The first DCI and the second DCI may be DCIs that schedule data of different services. For example, the first DCI may be a DCI that schedules the PDSCH for transmitting data of the eMBB, and the second DCI may be a DCI that schedules the PDSCH for transmitting data of the URLLC.

The first DCI and the second DCI may be DCIs to which CRCs scrambled with different RNTIs are added. For example, the first DCI may be a DCI to which a CRC scrambled with the C-RNTI, which is in the range of a first value, is added, and the second DCI may be a DCI to which a CRC scrambled with the C-RNTI, which is in the range of a second value different from the range of the first value, is added. For example, the first DCI may be a DCI to which a CRC scrambled with an arbitrary type of RNTI, which is in the range of a third value, is added, and the second DCI may be a DCI to which a CRC scrambled with an arbitrary type of RNTI, which is in the range of a fourth value different from the range of the third value, is added. For example, the first DCI may be a DCI to which a CRC scrambled with the C-RNTI, the MCS-C-RNTI, the CS-RNTI, the SI-RNTI, the RA-RNTI, the TC-RNTI, and/or the P-RNTI is added, and the second DCI may be a DCI to which a CRC scrambled with the UC-RNTI is added. Here, the UC-RNTI may be a RNTI that uses a value different from values that can be used for the C-RNTI, the MCS-C-RNTI, the CS-RNTI, the SI-RNTI, the RA-RNTI, the TC-RNTI, and the P-RNTI. Here, the UC-RNTI may be an RNTI that is used for controlling the PDSCH or the PUSCH of data of a predetermined service in one or multiple slots.

The first DCI and the second DCI may be DCIs using different DCI formats. For example, the first DCI may be a DCI that uses the DCI format 1_1, and the second DCI may be a DCI that uses the DCI format 1_2.

The first DCI and the second DCI may be DCIs that use DCI formats with different sizes. For example, the first DCI may be a DCI that uses a DCI format with a first size, and the second DCI may be a DCI that uses a DCI format with a second size different from the first size.

In each of the first DCI and the second DCI, a service applied to data of a corresponding PDSCH may be indicated in a predetermined field in the DCI format. For example, in the field in the DCI format of the first DCI, it may be identified that the corresponding PDSCH transmits data of the eMBB. For example, in the field in the DCI format of the second DCI, it may be identified that a corresponding PDSCH transmits data of the URLLC.

The first DCI and the second DCI may be DCIs transmitted in different search spaces and/or different CORESETs.

The first DCI and the second DCI may be DCIs for scheduling PDSCHs of different codebooks.

The resource allocation table configured by an RRC signal of a higher layer may be given by a signal of the higher layer (it may be an information element or an RRC parameter) different from the signal pdsch-TimeDomainAllocationList of the higher layer. For example, the resource allocation table may be given by a signal pdsch-TimeDomainAllocationList2 of the higher layer. The base station apparatus 3 may notify pdsch-TimeDomainAllocationList and/or pdsch-TimeDomainAllocationList2 in a signal of a higher layer. The terminal apparatus 1 may receive pdsch-TimeDomainAllocationList and/or pdsch-TimeDomainAllocationList2 in a signal of a higher layer.

Similar to pdsch-TimeDomainAllocationList, pdsch-TimeDomainAllocationList2 includes up to 16 entries, and any one of entries may be used by a 4-bit field included in the DCI. In each entry included in pdsch-TimeDomainAllocationList2, $K_0$, mappingType, and/or startSymbolAndLength may be indicated. Values that can be used for $K_0$, mappingType, and/or startSymbolAndLength in each entry of pdsch-TimeDomainAllocationList2 may be different from values that can be used for pdsch-TimeDomainAllocationList. For example, the value of $K_0$ that can be used for pdsch-TimeDomainAllocationList is in the range of 0 to 32, and the value of $K_0$ that can be used for pdsch-TimeDomainAllocationList2 may be in the range of 0 to 4. For example, mappinngType that can be used for pdsch-TimeDomainAllocationList may be mapping type A and mapping type B, and mappinngType that can be used for pdsch-TimeDomainAllocationList2 may be only the mapping type B. For example, mappinngType may not be indicated in pdsch-TimeDomainAllocationList2.

In a case that pdsch-TimeDomainAllocationList is included in the signal pdsch-Config of the higher layer, and the PDSCH is scheduled in the first DCI, the terminal apparatus 1 may apply pdsch-TimeDomainAllocationList included in pdsch-Config to the resource allocation table of the PDSCH. In a case that pdsch-TimeDomainAllocation- List2 is included in the signal pdsch-Config of the higher layer, and the PDSCH is scheduled in the second DCI, the terminal apparatus 1 may apply pdsch-TimeDomainAllocationList2 included in pdsch-Config to the resource allocation table of the PDSCH.

In a case that pdsch-TimeDomainAllocationList is not included in the signal pdsch-Config of the higher layer and pdsch-ConfigCommon, and the PDSCH is scheduled in the first DCI, the terminal apparatus 1 may apply the default table A to the resource allocation table of the PDSCH. In a case that pdsch-TimeDomainAllocationList2 is not included in the signal pdsch-Config of the higher layer and pdsch-ConfigCommon, and the PDSCH is scheduled in the second DCI, the terminal apparatus 1 may apply the default table D to the resource allocation table of the PDSCH. In a case that pdsch-TimeDomainAllocationList and/or pdsch-TimeDomainAllocationList2 are not configured in the signal of the higher layer, the terminal apparatus 1 may use different default tables for the first DCI and the second DCI. In a case that pdsch-TimeDomainAllocationList and/or pdsch-TimeDomainAllocationList2 are not configured in the signal of the higher layer, the terminal apparatus 1 may use the same default table for the first DCI and the second DCI.

FIG. 16 is a diagram illustrating an example of calculation of a SLIV according to an embodiment of the present invention.

In FIG. 16, 14 is the number of symbols included in one slot. FIG. 16 illustrates an example of calculation of a SLIV in the case of a Normal Cyclic Prefix (NCP). The value of the SLIV is calculated based on the number of symbols included in the slot, the start symbol S, and the number of consecutive symbols L. Here, the value of L is equal to or greater than 1 and does not exceed (14−S). In the case of calculating the SLIV using the ECP, instead of values 7 and 14 indicated in FIG. 16, values 6 and 12 are used.

Hereinafter, the slot offset $K_0$ will be described below.

As described above, in the subcarrier spacing configuration μ, the slot is counted in an ascending order from 0 to $N^{\{subframe, \mu\}}\_\{slot\}-1$ in the subframe, and is counted in an ascending order from 0 to $N^{\{frame, \mu\}}\_\{slot\}-1$ in the frame. $K_0$ is the number of slots based on subcarrier spacing of the PDSCH. $K_0$ may take a value in the range of 0 to 32. In a certain subframe or frame, slot numbers are counted in ascending order from 0. A slot number n of a subcarrier spacing configuration 15 kHz corresponds to slot numbers 2n and 2n+1 of a subcarrier spacing configuration 30 kHz.

In a case that the terminal apparatus 1 detects the DCI for scheduling the PDSCH, a slot allocated to the PDSCH is given by $floor(n*2\mu^{PDSCH}/2\mu^{PDCCH})+K_0$. Here, the function floor (A) outputs a maximum integer that does not exceed A. n is a slot in which the PDCCH for scheduling the PDSCH is detected. $\mu^{PDSCH}$ is a subcarrier spacing configuration for the PDSCH. $\mu^{PDCCH}$ is a subcarrier spacing configuration for the PDCCH.

As illustrated in FIG. 10, the terminal apparatus 1 may determine a resource allocation table to be applied to the PDSCH time domain resource allocation based on multiple elements. The terminal apparatus 1 may determine a resource allocation table to be applied to the PDSCH scheduled by the DCI based at least on some or all of the following Element (A) to Element (F).

Element (A): Type of RNTI that scrambles a CRC added to a DCI

Element (B): Type of search space in which a DCI is detected

Element (C): Whether a CORESET associated with the search space is CORESET #0

Element (D): Whether pdsch-ConfigCommon includes pdsch-TimeDomainAllocationList

Element (E): Whether pdsch-Config includes pdsch-TimeDomainAllocationList

Element (F): SS/PBCH and CORESET multiplex pattern

In the element (A), the type of the RNTI that scrambles the CRC to be added to the DCI is any one of the SI-RNTI, the RA-RNTI, the TC-RNTI, the P-RNTI, the C-RNTI, the MCS-C-RNTI, or the CS-RNTI.

In element (B), the type of search space in which the DCI is detected is a common search space or a UE-specific search space. The common search space includes a type 0 common search space, a type 1 common search space, and a type 2 common search space.

As Example A, the terminal apparatus 1 may detect a DCI in an arbitrary common search space associated with CORESET #0. In the detected DCI, a CRC scrambled with any one of C-RNTI, MCS-C-RNTI, or CS-RNTI is added. The terminal apparatus 1 may determine a resource allocation table to be applied to the PDSCH scheduled by the DCI. In a case that pdsch-ConfigCommon includes pdsch-TimeDomainAllocationList for the terminal apparatus 1, the terminal apparatus 1 may determine a resource allocation table configured from an RRC signal of a higher layer. The resource allocation table is given by pdsch-TimeDomainAllocationList included in pdsch-ConfigCommon. In addition, in a case that pdsch-ConfigCommon does not include pdsch-TimeDomainAllocationList for the terminal apparatus 1, the terminal apparatus 1 may determine the default table A. In other words, the terminal apparatus 1 may use the default table A indicating a configuration of PDSCH time domain resource allocation to be applied to the determination of PDSCH time domain resource allocation.

As Example B, the terminal apparatus 1 may detect a DCI in any common search space not associated with CORESET #0. In the detected DCI, a CRC scrambled with any one of C-RNTI, MCS-C-RNTI, and CS-RNTI is added. The terminal apparatus 1 may determine a resource allocation table to be applied to the PDSCH scheduled by the DCI. In a case that the pdsch-Config includes pdsch-TimeDomainAllocationList for the terminal apparatus 1, the terminal apparatus 1 may determine a resource allocation table to be applied to the PDSCH time domain resource allocation to be a resource allocation table given from pdsch-TimeDomainAllocationList provided by pdsch-Config. In other words, in a case that the pdsch-Config includes pdsch-TimeDomainAllocationList, the terminal apparatus 1 may use pdsch-TimeDomainAllocationList provided by the pdsch-Config to be applied to the determination of PDSCH time domain resource allocation regardless of whether the pdsch-ConfigCommon includes pdsch-TimeDomainAllocationList. In addition, in a case that the pdsch-Config does not include pdsch-TimeDomainAllocationList, and the pdsch-ConfigCommon includes pdsch-TimeDomainAllocationList, the terminal apparatus 1 may determine a resource allocation table to be applied to the PDSCH time domain resource allocation to be the resource allocation table given by pdsch-TimeDomainAllocationList provided by the pdsch-ConfigCommon. In other words, the terminal apparatus 1 uses pdsch-TimeDomainAllocationList provided by pdsch-ConfigCommon to be applied to the determination of the PDSCH time domain resource allocation. In addition, in a case that the pdsch-Config does not include pdsch-TimeDomainAllocationList, and the pdsch-ConfigCommon does not include pdsch-TimeDomainAllocationList, the terminal apparatus 1 may determine a resource allocation table applied to PDSCH time domain resource allocation to be the default table A.

As example C, the terminal apparatus 1 may detect a DCI in the UE-specific search space. In the detected DCI, a CRC scrambled with any one of the C-RNTI, the MCS-C-RNTI, and the CS-RNTI is added. The terminal apparatus 1 may determine a resource allocation table to be applied to a PDSCH scheduled by the DCI. In a case that the pdsch-Config includes pdsch-TimeDomainAllocationList for the terminal apparatus 1, the terminal apparatus 1 may determine a resource allocation table to be applied to PDSCH time domain resource allocation to be a resource allocation table given from the pdsch-TimeDomainAllocationList provided by the pdsch-Config. In other words, in a case that the pdsch-Config includes pdsch-TimeDomainAllocationList, the terminal apparatus 1 may use pdsch-TimeDomainAllocationList provided by the pdsch-Config to be applied to the determination of PDSCH time domain resource allocation regardless of whether the pdsch-ConfigCommon includes pdsch-TimeDomainAllocationList. In addition, in a case that the pdsch-Config does not include pdsch-TimeDomainAllocationList, and the pdsch-ConfigCommon includes pdsch-TimeDomainAllocationList, the terminal apparatus 1 may determine a resource allocation table to be applied to PDSCH time domain resource allocation to be a resource allocation table given from pdsch-TimeDomainAllocationList provided by the pdsch-ConfigCommon. In other words, the terminal apparatus 1 use pdsch-TimeDomainAllocationList provided by the pdsch-ConfigCommon to be applied to the determination of PDSCH time domain resource allocation. In addition, in a case that the pdsch-Config does not include pdsch-TimeDomainAllocationList, and the pdsch-ConfigCommon does not include pdsch-TimeDomainAllocationList, the terminal apparatus 1 may determine a resource allocation table to be applied to the PDSCH time domain resource allocation to be the default table A.

In view of Example B and Example C, the method for determining a resource allocation table to be applied to a PDSCH detected in the UE-specific search space is similar to the method for determining a resource allocation table to be applied to a PDSCH detected in an arbitrary common search space not associated with CORESET #0.

Detail of FIG. 11 is described as follows. The terminal apparatus 1 may determine a resource allocation table as illustrated in FIG. 11 for the last row illustrated in FIG. 10 (in a case that a DCI is detected in an arbitrary common search space or a UE-specific search space not associated with CORESET #0, and the RNTI is an RNTI of a predetermined type). The terminal apparatus 1 may determine a resource allocation table to be applied to a PDSCH scheduled by the DCI based at least on some of element (G) to element (I) as below in addition to some of all of the element (A) to the element (F).

Element (G): Whether a DCI is the first DCI (1st DCI) or the second DCI (2nd DCI) described above.
Element (H): Whether pdsch-ConfigCommon includes pdsch-TimeDomainAllocationList2
Element (I): Whether pdsch-Config includes pdsch-TimeDomainAllocationList2

However, the same default table (for example, the default table A) may be used in the case of the first DCI and the case of the second DCI. However, the pdsch-TimeDomainAllocationList2 may be a parameter that is not included in pdsch-ConfigCommon and is included only in the pdsch-Config.

In the table illustrated in FIG. 11, the terminal apparatus 1 and/or the base station apparatus 3 determine a resource allocation table to be applied to the PDSCH among the default table A, the default table D, the pdsch-TimeDomainAllocationList included in the pdsch-ConfigCommon, the pdsch-TimeDomainAllocationList included in pdsch-Config, the pdsch-TimeDomainAllocationList2 included in the pdsch-ConfigCommon, and the pdsch-TimeDomainAllocationList2 included in the pdsch-Config based on Element (A) to Element (I). Detail of FIG. 12 is described as follows. In the table illustrated in FIG. 12, the terminal apparatus 1 and/or the base station apparatus 3 determine a resource allocation table to be applied to the PDSCH based on element (A) to element (G) and element (I) among the default table A, pdsch-TimeDomainAllocationList included in the pdsch-ConfigCommon, the pdsch-TimeDomainAllocationList included in pdsch-Config, the pdsch-TimeDomainAllocationList2 included in the pdsch-Config. In the table example illustrated in FIG. 12, in a case that the DCI is the second DCI, pdsch-TimeDomainAllocationList2 is not included in the pdsch-Config, and pdsch-TimeDomainAllocationList is included in pdsch-ConfigCommon, the resource allocation table to be applied to the PDSCH is the pdsch-TimeDomainAllocationList included in the pdsch-ConfigCommon. However, in a case that the DCI is the second DCI, and the pdsch-TimeDomainAllocationList2 is not included in the pdsch-Config, the resource allocation table to be applied to the PDSCH may be the default table A or the default table D.

Subsequently, the terminal apparatus 1 may select one PDSCH time domain resource allocation configuration in the determined resource allocation table based on a value indicated in the 'Time domain resource assignment' field included in the DCI that schedules the PDSCH. For example, in a case that the resource allocation table to be applied to the PDSCH time domain resource allocation is the default table A, the value m indicated in the 'Time domain resource assignment' field may indicate a row index m+1 of the default table A. At this time, the PDSCH time domain resource allocation is a configuration of time domain resource allocation indicated from the row index m+1. The terminal apparatus 1 assumes the configuration of the time domain resource allocation indicated from the row index m+1 and receives the PDSCH. For example, in a case that the value m indicated in the 'Time domain resource assignment' field is 0, the terminal apparatus 1 identifies resource allocation of the PDSCH scheduled by the DCI in the time direction using the configuration of the PDSCH time domain resource allocation of the row index 1 of the default table A.

In addition, in a case that the resource allocation table applied to the PDSCH time domain resource allocation is a resource allocation table given from pdsch-TimeDomainAllocationList, the value m indicated in the 'Time domain resource assignment' field corresponds to the (m+1)-th element (entry, row) in a list pdsch-TimeDomainAllocationList. For example, in a case that the value m indicated in the 'Time domain resource assignment' field is 0, the terminal apparatus 1 may refer to the first element (entry) in the list pdsch-TimeDomainAllocationList. For example, in a case that the value m indicated in the 'Time domain resource assignment' field is 1, the terminal apparatus 1 may refer to the second element (entry) in the list pdsch-TimeDomainAllocationList.

In addition, in a case that the resource allocation table applied to the PDSCH time domain resource allocation is a resource allocation table given from pdsch-TimeDomainAllocationList2, the value m indicated in the 'Time domain resource assignment' field corresponds to the (m+1)-th element (entry, row) in the list pdsch-TimeDomainAllocation- List2. For example, in a case that the value m indicated in the 'Time domain resource assignment' field is 0, the terminal apparatus 1 may refer to the first element (entry) in the list pdsch-TimeDomainAllocationList2. For example, in a case that the value m indicated in the 'Time domain resource assignment' field is 1, the terminal apparatus 1 may refer to the second element (entry) in the list pdsch-TimeDomain-AllocationList2.

Hereinafter, the number of bits (size) of the 'Time domain resource assignment' field included in the DCI will be described.

The terminal apparatus 1 may decode (receive) a corresponding PDSCH by detection of the PDCCH including the DCI format 1_0, the DCI format 1_1, or the DCI format 1_2. The number of bits of the 'Time domain resource assignment' field included in the DCI format 1_0 may be a fixed number of bits. For example, the number of fixed bits may be four. In other words, the size of the 'Time domain resource assignment' field included in the DCI format 1_0 is four bits. In addition, the size of the 'Time domain resource assignment' field included in the DCI format 1_1 and the DCI format 1_2 may be a variable number of bits. For example, the number of bits of the 'Time domain resource assignment' field included in the DCI format 1_1 and the DCI format 1_2 may be any one of 0, 1, 2, 3, or 4. The number of bits of the 'Time domain resource assignment' field included in the DCI format 1_2 may be a value greater than four.

Hereinafter, determination of the number of bits of the 'Time domain resource assignment' field included in the DCI format 1_1 and the DCI format 1_2 will be described.

The number of bits of the 'Time domain resource assignment field included in the DCI format 1_1 and DCI format 1_2 may be given based at least on (I) whether the pdsch-ConfigCommon includes pdsch-TimeDomainAllocationList (or pdsch-TimeDomainAllocationList2), and/or (II) whether the pdsch-Config includes pdsch-TimeDomainAllocation-List (or pdsch-TimeDomainAllocationList2), and/or (III) the number of rows included in the default table defined in advance. In the present embodiment, in the DCI format 1_1 and the DCI format 1_2, a CRC scrambled with any one of C-RNTI, MCS-C-RNTI, and CS-RNTI is added. The DCI format 1_1 may be detected in the UE-specific search space. In the present embodiment, 'pdsch-Config including pdsch-TimeDomainAllocationList (or pdsch-TimeDomainAllocationList2) may mean that 'pdsch-TimeDomainAllocation-List (or pdsch-TimeDomainAllocationList2) is provided by pdsch-Config'. 'pdsch-ConfigCommon including pdsch-TimeDomainAllocationList (or pdsch-TimeDomainAllocationList2) may mean that 'pdsch-TimeDomainAllocation-List (or pdsch-TimeDomainAllocationList2) is provided by pdsch-ConfigCommon'.

The number of bits of the 'Time domain resource assignment' field may be given as ceiling ($\log_2(I)$). Here, the function ceiling(A) outputs a minimum integer that is not below A. In a case that pdsch-TimeDomainAllocationList (or pdsch-TimeDomainAllocationList2) is configured (provided) for the terminal apparatus 1, the value of I may be the number of entries included in pdsch-TimeDomainAllocationList (or pdsch-TimeDomainAllocationList2). In a case that pdsch-TimeDomainAllocationList (or pdsch-TimeDomainAllocationList2) is not configured (provided) for the terminal apparatus 1, the value of I may be the number of rows of the default table (the default table A (or the default table D)). In other words, in a case that pdsch-TimeDomain-AllocationList (or pdsch-TimeDomainAllocationList2) is configured for the terminal apparatus 1, the number of bits of the 'Time domain resource assignment' field may be given based on the number of entries included in the pdsch-TimeDomainAllocationList (or the pdsch-TimeDomainAllocationList2). In a case that pdsch-TimeDomainAllocationList (or pdsch-TimeDomainAllocationList2) is not configured for the terminal apparatus 1, the number of bits of the 'Time domain resource assignment' field may be given based on the number of rows of a default table (the default table A). More specifically, in a case that the pdsch-Config includes the pdsch-TimeDomainAllocationList (or the pdsch-TimeDomainAllocationList2), the value of I may be the number of entries included in pdsch-TimeDomain-AllocationList (or pdsch-TimeDomainAllocationList2) provided by the pdsch-Config. In addition, in a case that the pdsch-Config does not include pdsch-TimeDomainAllocationList (or pdsch-TimeDomainAllocationList2), and the pdsch-ConfigCommon includes pdsch-TimeDomainAllocationList (or pdsch-TimeDomainAllocationList2), the value of I may be the number of entries included in the pdsch-TimeDomainAllocationList (or the pdsch-TimeDomainAllocationList2) provided by the pdsch-ConfigCommon. In addition, in a case that the pdsch-Config does not include pdsch-TimeDomainAllocationList (or pdsch-TimeDomain-AllocationList2), and the pdsch-ConfigCommon does not include pdsch-TimeDomainAllocationList (or pdsch-Time-DomainAllocationList2), the value of I may be the number of rows included in a default table (for example, the default table A or the default table D).

In other words, in a case that pdsch-TimeDomainAllocationList (or pdsch-TimeDomainAllocationList2) is configured (provided) for the terminal apparatus 1, the number of bits of the 'Time domain resource assignment' field may be given as ceiling ($\log_2(I)$). In a case that pdsch-TimeDomain-AllocationList (or pdsch-TimeDomainAllocationList2) is not configured (provided) for the terminal apparatus 1, the number of bits of the 'Time domain resource assignment' field may be a fixed number of bits. For example, the number of fixed bits may be four. Here, I may be the number of entries included in the pdsch-TimeDomainAllocationList (or the pdsch-TimeDomainAllocationList2). More specifically, in a case that the pdsch-Config includes pdsch-TimeDomainAllocationList (or pdsch-TimeDomainAllocation-List2), the value of I may be the number of entries included in the pdsch-TimeDomainAllocationList (or the pdsch-TimeDomainAllocationList2) provided by the pdsch-Config. In addition, in a case that the pdsch-Config does not include pdsch-TimeDomainAllocationList (or pdsch-Time-DomainAllocationList2), and pdsch-ConfigCommon includes pdsch-TimeDomainAllocationList (or pdsch-Time-DomainAllocationList2), the value of I may be the number of entries included in the pdsch-TimeDomainAllocationList (or the pdsch-TimeDomainAllocationList2) provided by the pdsch-ConfigCommon.

The number of entries included in the pdsch-TimeDomainAllocationList may differ from the number of entries included in the pdsch-TimeDomainAllocationList2. A maximum number of entries included in the pdsch-TimeDomain-AllocationList may be a first value. For example, the first value is 16. The maximum number of entries included in the pdsch-TimeDomainAllocationList2 may be a second value. For example, the first value is a value that is greater than 16.

Detail of FIG. 8 is described as follows. FIG. 8(A) is a diagram illustrating an example of transmission of a HARQ-ACK (a first HARQ-ACK) corresponding to reception of a PDSCH (a first PDSCH) scheduled by the PDCCH accompanying a first DCI. FIG. 8(B) is a diagram illustrating an example of reception of PDSCHs (the first PDSCH and the second PDSCH) scheduled by the PDCCH accompanying the first DCI and the second DCI and transmission of a corresponding HARQ-ACK (a first HARQ-ACK and a second HARQ-ACK).

The terminal apparatus 1 may receive (detect) a corresponding PDSCH by detecting a PDCCH including a DCI. In a case that the terminal apparatus 1 is scheduled to receive a PDSCH in a slot i and transmit a corresponding HARQ-ACK in a slot j for arbitrary two HARQ process numbers in a certain cell (a certain given scheduling cell), the terminal apparatus 1 is not expected to be scheduled to receive a PDSCH in a slot after the slot i and transmit a corresponding HARQ-ACK in a slot before the slot j. Here, the mentioned PDCCH may correspond to the PDCCH accompanying the first DCI. The mentioned PDSCH may correspond to a first PDSCH scheduled by the first DCI. The mentioned HARQ-ACK may be a HARQ-ACK corresponding to the first PDSCH scheduled by the first DCI.

However, the terminal apparatus 1 may perform out-of-order HARQ-ACK transmission. More specifically, the terminal apparatus 1 may be scheduled to start transmission of a HARQ-ACK, which corresponds to a PDSCH ending with a symbol i, with a symbol j. Here, the PDCCH may correspond to the PDCCH accompanying the first DCI. The HARQ-ACK may be a HARQ-ACK (first HARQ-ACK) corresponding to the first PDSCH scheduled by the first DCI. Subsequently, the terminal apparatus 1 may receive a second PDSCH that ends after the symbol i. The transmission of a HARQ-ACK (a second HARQ-ACK) corresponding to the second PDSCH may be started before the start symbol j in the transmission of the first HARQ-ACK. The terminal apparatus 1 may receive a second PDSCH that ends after the symbol i. The transmission of a HARQ-ACK (a second HARQ-ACK) corresponding to the second PDSCH may be started before an end symbol in the transmission of the first HARQ-ACK. In the present embodiment, the transmission of the HARQ-ACK may represent transmission of a PUCCH including a HARQ-ACK (a HARQ-ACK information bit).

In FIG. 8(A), the terminal apparatus 1 may transmit a corresponding HARQ-ACK (803) by detecting (receiving) a PDSCH (800). Here, the PDSCH (800) corresponds to the first PDSCH scheduled by the first DCI. The PDSCH (801) is a PDSCH that ends after the symbol with which the PDSCH (800) ends. Some symbols of the PDSCH (801) may overlap the PDSCH (800) with respect to time. The HARQ-ACK (802) may be a HARQ-ACK that starts before the start (end) of the HARQ-ACK (803). The HARQ-ACK (804) may be a HARQ-ACK that starts after the end of the HARQ-ACK (803). Each of the HARQ-ACK (802), the HARQ-ACK (803), and the HARQ-ACK (804) is a HARQ-ACK corresponding to the first PDSCH scheduled by the first DCI. The HARQ-ACK (803) may correspond to a PDSCH accompanying a first HARQ process number. The HARQ-ACK (802) may correspond to a PDSCH accompanying a HARQ process number corresponding to a value different from the first HARQ process number. The HARQ-ACK (804) may correspond to a PDSCH accompanying a HARQ process number corresponding to a value different from the first HARQ process number. In other words, the terminal apparatus 1 may not be expected to be scheduled to receive the PDSCH (801) and transmit a HARQ-ACK (802) corresponding to the PDSCH (801). The terminal apparatus 1 may be expected to be scheduled to receive the PDSCH (801) and transmit a corresponding HARQ-ACK (804). In other words, in a case that it is scheduled to start transmission of a HARQ-ACK (803) corresponding to the PDSCH (800) for the terminal apparatus 1, the base station apparatus 3 may not perform scheduling such that the HARQ-ACK (802) corresponding to the PDSCH (801) is transmitted to the terminal apparatus 1. In other words, in a case that it is scheduled to start transmission of a HARQ-ACK (803) corresponding to the PDSCH (800) to the terminal apparatus 1, the base station apparatus 3 may perform scheduling such that a HARQ-ACK (804) corresponding to the PDSCH (801) is transmitted to the terminal apparatus 1.

FIG. 8(B) is a diagram illustrating an example of out-of-order HARQ-ACK transmission. In FIG. 8(B), the terminal apparatus 1 may transmit a HARQ-ACK (813) corresponding to the detected PDSCH by detecting the PDSCH (810). Here, the PDSCH (810) corresponds to the first PDSCH scheduled by the first DCI. The PDSCH (811) is a PDSCH that ends after a symbol with which the PDSCH (810) ends. Some of symbols of the PDSCH (811) may overlap the PDSCH (810) with respect to time. The HARQ-ACK (812) may be a HARQ-ACK that is started before the end (start) of the HARQ-ACK (813). The HARQ-ACK (813) may be a HARQ-ACK corresponding to the first PDSCH scheduled by the first DCI. The HARQ-ACK (812) may be a HARQ-ACK corresponding to a second PDSCH scheduled by the second DCI. The HARQ-ACK (813) may correspond to a PDSCH accompanying the first HARQ process number. The HARQ-ACK (812) may correspond to a PDSCH accompanying a HARQ process number corresponding to a value different from the first HARQ process number. In other words, the terminal apparatus 1 may be expected to be scheduled to receive the PDSCH (811) and transmit a corresponding HARQ-ACK (812). In other words, in a case that it is scheduled that the terminal apparatus 1 starts reception of the PDSCH (810) and transmission of a corresponding HARQ-ACK (813), the base station apparatus 3 may be scheduled to receive the PDSCH (811) and transmit a corresponding HARQ-ACK (812) to the terminal apparatus 1. Transmission of the HARQ-ACK (812) that is started before the end of the HARQ-ACK (813), which corresponds to the PDSCH (811) that ends after the symbol with which the PDSCH (810) ends, may be referred to as out-of-order HARQ-ACK transmission.

Hereinafter, a PDSCH processing procedure time will be described.

First, the PDSCH processing procedure time (PDSCH processing time) $T_{proc,1}$ for the PDSCH scheduled by a DCI (scheduling DCI) will be described. The PDSCH processing procedure time (PDSCH processing time) $T_{proc,1}$ may be referred to as a PDSCH processing procedure time for a HARQ-ACK corresponding to the PDSCH. The value of $T_{proc,1}$ may be given by (Equation 1) $(N_1+d_{1,1})(2018+144)*\kappa*2^{-\mu}*T_c$. $N_1$ is a PDSCH processing time and is the number of symbols defined in advance for each subcarrier spacing based at least on a PDSCH capability 1 or a PDSCH capability 2, a DMRS position, and the number of DMRS symbols. $\mu$ may correspond to a subcarrier spacing for calculating the value of the largest $T_{proc,1}$ (maximum value) among $(\mu_{PDCCH}, \mu_{PDSCH}, \mu_{UL})$. $\mu_{PDCCH}$ corresponds to a subcarrier spacing of the PDCCH accompanying the DCI scheduling the PDSCH. $\mu_{PDSCH}$ corresponds to a subcarrier spacing of the scheduled PDSCH. $\mu_{UL}$ corresponds to a subcarrier spacing of an uplink channel in which the HARQ-ACK is transmitted. $\kappa$ is a constant 64 and is calculated from $T_s/T_c$. $T_s$ is calculated from $1/(\Delta f_{ref}*N_{f,ref})$. $T_c$ is a time unit and is calculated from $1/(\Delta f_{max}*\Delta f_{ref})$ is $15*10^3$ hertz. $N_{f,ref}=2048$. $\Delta f_{max}$ is $480*10^3$ hertz. $N_f$ is 4096. $d_{1,1}$ may be given based at least on the PDSCH capability, a PDSCH mapping type, the number of symbols included in the PDSCH, and the number of symbols in which a PDSCH overlaps the PDCCH scheduling the PDSCH.

In a case that a first uplink symbol in a PUCCH accompanying transmission of a HARQ-ACK is not an uplink symbol before a symbol $L_1$, the terminal apparatus 1 may provide an effective HARQ-ACK message for the PDSCH. Provision of an effective HARQ-ACK message may mean that the terminal apparatus 1 generates an ACK or a NACK for the PDSCH based on a result of decoding of the PDSCH. In other words, in a case that the first uplink symbol in the PUCCH for the transmission of a HARQ-ACK is a symbol before the symbol $L_1$, the terminal apparatus 1 may provide an effective HARQ-ACK message for the PDSCH. The symbol $L_1$ is defined as an uplink symbol accompanying a next Cyclic Prefix (CP) from start (elapse) of a time of $T_{proc, 1}$ after end of reception of the last symbol of a PDSCH accompanying a transport block. In other words, the position of the symbol $L_1$ may be identified (determined) based on the time of $T_{proc, 1}$. In other words, in a case that a time offset (the number of uplink symbols) between a PDSCH and a PUCCH accompanying transmission of a HARQ-ACK corresponding to the PDSCH is the same as or larger than the time of $T_{proc, 1}$ (the number of uplink symbols corresponding to the time of $T_{proc, 1}$), the terminal apparatus 1 may provide an effective HARQ-ACK message for the PDSCH. In addition, in a case that the time offset (the number of uplink symbols) between a PDSCH and a PUCCH accompanying transmission of a HARQ-ACK corresponding to the PDSCH is smaller than the time of $T_{proc, 1}$ (the number of uplink symbols corresponding to the time of $T_{proc, 1}$), the terminal apparatus 1 may not provide an effective HARQ-ACK message for the PDSCH. No provision of an effective HARQ-ACK message may mean that the terminal apparatus 1 is not able to decode the PDSCH due to a time relation or is not able to generate a HARQ-ACK for the PDSCH based on a result of decoding.

Hereinafter, the PDSCH processing procedure time in a case that the out-of-order HARQ-ACK transmission is performed will be described.

The terminal apparatus 1 that supports transmission of a HARQ-ACK corresponding to reception of a PDSCH for transmitting data of different services may support the out-of-order HARQ-ACK transmission. In a case that the out-of-order HARQ-ACK transmission is performed, the PDSCH processing procedure time $T_{proc, 1}$ for the transmission of a HARQ-ACK may differ from the value of the PDSCH processing procedure time calculated from (Equation 1). For example, the value of $T_{proc, 1}$ may be given by (Equation 2) $(N_1+d_{1, 1})$ $(2018+144)*\kappa*2^{-\mu}*T_c+T_{proc, 1'}$. Hereinafter, $T_{proc, 1'}$ will be described. The other parameters in (Equation 2) are similar to those in (Equation 1), and thus description thereof will be omitted.

In a case that the out-of-order HARQ-ACK transmission is performed, $T_{proc, 1'}$ may be given based on (Equation 1) or (Equation 2). In a case that the out-of-order HARQ-ACK transmission is not performed, $T_{proc, 1'}$ may be set to 0. In other words, the PDSCH processing procedure time corresponding to a first HARQ-ACK may be changed based on whether the out-of-order HARQ-ACK transmission is performed before the transmission of the first HARQ-ACK.

FIG. 8(C) is a diagram illustrating an example of the PDSCH processing procedure time and the transmission of a HARQ-ACK. In FIG. 8(C), the terminal apparatus 1 may transmit a HARQ-ACK (823) corresponding to a PDSCH by detecting (receiving) the PDSCH (820). The terminal apparatus 1 may transmit a HARQ-ACK (822) corresponding to a PDSCH by detecting the PDSCH (821). Here, the PDSCH (820) corresponds to a first PDSCH scheduled by the first DCI. The PDSCH (821) corresponds to a second PDSCH scheduled by the second DCI. The PDSCH (821) is a PDSCH that ends after a symbol with which the PDSCH (820) ends. Some of symbols of the PDSCH (821) may overlap the PDSCH (820) with respect to time. The HARQ-ACK (822) may be a HARQ-ACK that starts before the start (end) of the HARQ-ACK (823). A HARQ process number associated with the HARQ-ACK (822) may be different from a HARQ process number associated with the HARQ-ACK (821). In other words, at a time when the HARQ-ACK (823) is to be transmitted, the out-of-order HARQ-ACK (HARQ-ACK (822)) transmission is performed.

In FIG. 8(C), a symbol 824, a symbol 825, and a symbol 826 may be located at positions of symbols corresponding to a symbol $L_1$. The PDSCH processing procedure time for the HARQ-ACK (823) may be given based at least on (Equation 1) or (Equation 2). For example, in a case that the position of the symbol $L_1$ given based on the PDSCH processing procedure time is the symbol 824 or 825, the terminal apparatus 1 may provide an effective HARQ-ACK (823). In a case that the position of the symbol $L_1$ given based on the PDSCH procedure preparation time is the symbol 826, the terminal apparatus 1 may not provide the effective HARQ-ACK (823). In a case that the out-of-order HARQ-ACK (822) transmission is performed as the transmission of the HARQ-ACK (823), the PDSCH processing procedure time for the HARQ-ACK may be given based at least on (Equation 2). In a case that there is no out-of-order HARQ-ACK (822) transmission as the transmission of the HARQ-ACK (823), the PDSCH processing procedure time for the HARQ-ACK (823) may be given based at least on (Equation 1) or (Equation 2). In (Equation 2), in a case that the out-of-order HARQ-ACK (822) transmission occurs, the value of $T_{proc, 1'}$ may correspond to the value of the PDSCH processing procedure time for the HARQ-ACK (822). In (Equation (2)), in a case that the out-of-order HARQ-ACK (822) transmission does not occur, the value of $T_{proc, 1'}$ may be set to 0. In other words, the value of the PDSCH processing procedure time for the HARQ-ACK (823) may be a first value given based at least on (Equation 1). In a case that the HARQ-ACK (822) is transmitted, the value of the PDSCH processing procedure time for the HARQ-ACK (823) may be a value acquired by adding a second value to the first value. The second value may be given based at least on the value of the PDSCH processing procedure time for the HARQ-ACK (822). In a case that no transmission of HARQ-ACK (822) occurs, the second value may be 0.

The PDSCH processing procedure time for the HARQ-ACK (822) may be given based at least on (Equation 1) or (Equation 2). Here, in (Equation 2), for the transmission of the HARQ-ACK (822), no out-of-order HARQ-ACK transmission occurs, and thus, the value of $T_{proc, 1'}$ may be set to 0. The PDSCH capability applied to the HARQ-ACK (822) may differ from the PDSCH capability applied to the HARQ-ACK (823). In other words, $N_1$ applied to the HARQ-ACK (822) may be the same value as the value of $N_1$ applied to the HARQ-ACK (823) or may be a value smaller than the value of $N_1$ applied to the HARQ-ACK (823). The terminal apparatus 1 may stop (slot) processing (preparation) of the HARQ-ACK (823) at a time when the processing (preparation) of the HARQ-ACK (822) is to be started within the PDSCH processing procedure time for the HARQ-ACK (823). At this time, the PDSCH processing procedure time for the HARQ-ACK (822) may be a time acquired by further adding Y symbols to a value given based at least on (Equation 1) or (Equation 2). The value of Y may be a value that is defined based at least on the PDSCH capability applied to the HARQ-ACK (823) and/or the PDSCH processing time $N_1$ applied to the HARQ-ACK (823). In a case that the processing (preparation) of the HARQ-ACK (823) is not stopped (slot), the value of Y may be 0. At a time when the processing (preparation) of the HARQ-ACK (822) is to be started outside the PDSCH processing procedure time for the HARQ-ACK (823), the terminal apparatus 1 may not stop (slot) processing (preparation) of the HARQ-ACK (823). At this time, the PDSCH processing procedure time for the HARQ-ACK (822) may be a value given based at least on (Equation 1) or (Equation 2).

In other words, in FIG. 8(C), in a case in where the out-of-order HARQ-ACK (822) transmission occurs, the terminal apparatus 1 may determine whether a HARQ-ACK (823) is transmitted using the PDSCH processing procedure time $T_{proc,\,1}$ given based on (Equation 2). The terminal apparatus 1 may identify the position of the symbol $L_1$ based on the PDSCH processing procedure time given based on (Equation 2). In a case that the first uplink symbol in the PUCCH allocation for the HARQ-ACK (823) is a symbol before the symbol $L_1$, the terminal apparatus 1 may not transmit the HARQ-ACK (823). In a case that the first uplink symbol in the PUCCH allocation for the HARQ-ACK (823) is the symbol $L_1$ or a symbol after the symbol $L_1$, the terminal apparatus 1 may transmit the HARQ-ACK (823).

In addition, in FIG. 8(C), in a case that the out-of-order HARQ-ACK (822) transmission occurs, the terminal apparatus 1 may determine whether the HARQ-ACK (823) is transmitted using the PDSCH processing procedure time $T_{proc,\,1}$ given based on (Equation 1). At this time, the symbol $L_1$ may be defined as an uplink symbol accompanying a next Cyclic Prefix (CP) from the start (elapse) of the time of $T_{proc,\,1}$ after the end of transmission of the last symbol in the PUCCH accompanying the HARQ-ACK (822). In a case that the first uplink symbol in the PUCCH allocation for the HARQ-ACK (923) is a symbol before the symbol $L_1$, the terminal apparatus 1 may not transmit the HARQ-ACK (823). In a case that the first uplink symbol in the HARQ-ACK (823) allocation is the symbol $L_1$ or a symbol after the symbol $L_1$, the terminal apparatus 1 may transmit the HARQ-ACK (823).

In addition, in FIG. 8(C), in a case that the terminal apparatus 1 stops the processing of the HARQ-ACK (823) in accordance with an occurrence of the transmission of the HARQ-ACK (822), the terminal apparatus 1 may determine whether the HARQ-ACK (823) is transmitted using the PDSCH processing procedure time $T_{proc,\,1}$ given based on (Equation 1). At this time, a new symbol $L_1$ may be defined as an uplink symbol accompanying the next Cyclic Prefix (CP) from the start (elapse of the time of $T_{proc,\,1}$ after the end of the transmission of the last symbol in the PUCCH accompanying the HARQ-ACK (822). In addition, in a case that the terminal apparatus 1 does not stop the processing of the HARQ-ACK (823) in response to an occurrence of the transmission of the HARQ-ACK (822), the terminal apparatus 1 may determine whether the HARQ-ACK (823) is transmitted using the PDSCH processing procedure time $T_{proc,\,1}$ given based on (Equation 2). At this time, the symbol $L_1$ may be defined as an uplink symbol accompanying the next Cyclic Prefix (CP) after the start (elapse) of the time of $T_{proc}$, after the end of reception of the last symbol in the PDSCH (820). Next, in a case that the first uplink symbol in the PUCCH allocation accompanying the HARQ-ACK (823) is a symbol before the symbol $L_1$, the terminal apparatus 1 may not transmit the HARQ-ACK (823). In a case that the first uplink symbol in the PUCCH allocation accompanying the HARQ-ACK (823) is the symbol $L_1$ or a symbol after the symbol $L_1$, the terminal apparatus 1 may transmit the HARQ-ACK (823). The transmission of a HARQ-ACK may mean provision of an effective HARQ-ACK. No transmission of a HARQ-ACK may mean no provision of an effective HARQ-ACK. The stopping of the processing of the HARQ-ACK may mean stopping of processing (decoding) of a PDSCH to which the HARQ-ACK corresponds.

In accordance with detection of the first PDSCH scheduled by the first DCI, the terminal apparatus 1 transmits a corresponding first HARQ-ACK. The terminal apparatus 1 may determine whether a first HARQ-ACK is transmitted based at least on the value of the PDSCH processing procedure time of the first HARQ-ACK. The value of the PDSCH processing procedure time of the first HARQ-ACK may be a first value. In a case that the number of symbols between the first PDSCH and the first HARQ-ACK (the PUCCH accompanying the first HARQ-ACK) is equal to or greater than the number of symbols corresponding to the value of the PDSCH processing procedure time of the first HARQ-ACK, the terminal apparatus 1 may provide an effective first HARQ-ACK (message). In a case that the terminal apparatus 1 satisfies conditions in which the out-of-order HARQ-ACK transmission occurs, the value of the PDSCH processing procedure time of the first HARQ-ACK may be a value acquired by adding the second value to the first value. The conditions in which the out-of-order HARQ-ACK transmission occurs may include at least some or all of the following Condition (a) to Condition (h). An occurrence of the (out-of-order) HARQ-ACK transmission may mean that an (out-of-order) HARQ-ACK is transmitted. An occurrence of the (out-of-order) HARQ-ACK transmission may mean that an (out-of-order) HARQ-ACK is scheduled. An occurrence of the (out-of-order) HARQ-ACK transmission may mean that (out-of-order) HARQ-ACK transmission is performed.

Condition (a) is that a second HARQ-ACK is transmitted (scheduled).

Condition (b) is that a second HARQ-ACK to be transmitted corresponds to the second PDSCH scheduled by the second DCI.

Condition (c) is that the reception of the second PDSCH ends after a symbol with which the reception of the first PDSCH ends.

Condition (d) is that the transmission of the second HARQ-ACK is started before the end (start) of the transmission of the first HARQ-ACK.

Condition (e) is that a HARQ process number for the second HARQ-ACK is different from a HARQ process number for the first HARQ-ACK.

Condition (f) is that the value of the RNTI that scrambles the CRC added to the first DCI is in a first range, and the value of the RNTI that scrambles the CRC added to the second DCI is in a second range different from the first range.

The condition (h) is that a format used in the first DCI is different from the format used in the second DCI.

As described above, in a case that the out-of-order HARQ-ACK transmission occurs, two HARQ-ACK transmissions (a first HARQ-ACK transmission and a second HARQ-ACK transmission, a PUCCH transmission accompanying the first HARQ-ACK and a PUCCH transmission accompanying the second HARQ-ACK) may not overlap each other with respect to time. In a case that the out-oforder HARQ-ACK transmission occurs, and two HARQ-ACK transmissions (the first PUSCH transmission and the second PUSCH transmission) overlap each other with respect to time, the terminal apparatus 1 may drop the PUCCH transmission accompanying the first HARQ-ACK without being based on the PDSCH processing procedure time.

Hereinafter, a procedure for receiving a PUSCH will be described.

The terminal apparatus 1 may transmit a corresponding PUSCH in accordance with detection of a PDCCH including the DCI format 0_0, the DCI format 0_1, or the DCI format 0_2. In other words, the corresponding PUSCH may be scheduled (indicated) by the DCI format (DCI). The PUSCH may be scheduled by a RAR UL grant included in a RAR message. A start position (start symbol) of the scheduled PUSCH will be referred to as S. The start symbol S of the PUSCH may be the first symbol with which the PUSCH is transmitted (mapped) in a slot. The start symbol S corresponds to the beginning of the slot. For example, in a case that the value of S is 0, the terminal apparatus 1 may transmit the PUSCH from the first symbol in a certain slot. In addition, for example, in a case that the value of S is 2, the terminal apparatus 1 may transmit the PUSCH from the third symbol of a certain slot. The number of consecutive symbols of the scheduled PUSCH will be referred to as L. The number of consecutive symbols L is counted from the start symbol S. The determination of S and L allocated to the PUSCH will be described below.

As the type of PUSCH mapping, there are a PUSCH mapping type A and a PUSCH mapping type B. In the PUSCH mapping type A, the value of S is 0. L takes a value in the range of 4 to 14. Here, a sum of S and L takes a value in the range of 4 to 14. In the PUSCH mapping type B, S takes a value in the range of 0 to 13. L takes a value in the range of 1 to 14. Here, a sum of S and L takes a value in the range of 1 to 14.

The position of a DMRS symbol for the PUSCH depends on the type of PUSCH mapping. The position of the first DMRS symbol (first DM-RS symbol) for the PUSCH depends on the type of PUSCH mapping. In the PUSCH mapping type A, the position of the first DMRS symbol may be indicated by a parameter dmrs-TypeA-Position of a higher layer. dmrs-TypeA-Position is set to either 'pos2' or 'pos3'. For example, in a case that dmrs-TypeA-Position is set to 'pos2', the position of the first DMRS symbol for the PUSCH may be the third symbol in the slot. For example, in a case that dmrs-TypeA-Position is set to 'pos3', the position of the first DMRS symbol for the PUSCH may be the fourth symbol in the slot. In the PUSCH mapping type B, the position of the first DMRS symbol may be that of the first symbol of the allocated PUSCH.

Hereinafter, a method for identifying PUSCH time domain resource allocation will be described.

The base station apparatus 3 may schedule the terminal apparatus 1 to transmit the PUSCH using the DCI. The terminal apparatus 1 may transmit the PUSCH by detecting a DCI addressed to the terminal apparatus 1. The terminal apparatus 1 determines a resource allocation table to be applied to the PUSCH in a case of identifying PUSCH time domain resource allocation. The resource allocation table includes one or multiple PUSCH time domain resource allocation configurations. The terminal apparatus 1 may select one PUSCH time domain resource allocation configuration in the determined resource allocation table based on a value indicated in the 'Time domain resource assignment' field included in the DCI that schedules the PUSCH. In other words, the base station apparatus 3 determines PUSCH resource allocation for the terminal apparatus 1, generates a value of the 'Time domain resource assignment' field, and transmits a DCI including the 'Time domain resource assignment' field to the terminal apparatus 1. The terminal apparatus 1 identifies PUSCH time domain resource allocation based on the value set in the 'Time domain resource assignment' field.

FIG. 17 is a diagram defining a resource allocation table that is applied to PUSCH time domain resource allocation according an embodiment of the present invention. The terminal apparatus 1 may determine a resource allocation table to be applied to the PUSCH time domain resource allocation by referring to FIG. 17. The resource allocation table includes a configuration of one or multiple PUSCH time domain resource allocations. In the present embodiment, resource allocation tables are classified into (I) resource allocation tables defined in advance and (II) resource allocation tables configured from an RRC signal of a higher layer. The resource allocation table defined in advance is defined as the default PUSCH time domain resource allocation A and/or the default PUDSCH time domain resource allocation B. Hereinafter, the default PUSCH time domain resource allocation A will be referred to as a PUSCH default table A, and the default PUDSCH time domain resource allocation B will be referred to as a PUSCH default table B.

FIG. 18 is a diagram illustrating an example of the PUSCH default table A for a Normal Cyclic Prefix (NCP) according to an embodiment of the present invention. In FIG. 18, the number of rows of the PUSCH default table A is 16, and each of the rows indicates a configuration of the PUSCH time domain resource allocation. In FIG. 18, an indexed row defines a PUSCH mapping type, a slot offset $K_2$ between a PDCCH including a DCI and the PUSCH, a start symbol S of the PUSCH in a slot, and the number of consecutive allocated symbols L. The PUSCH default table B has a configuration similar to that of the PUSCH default table, and a PUSCH mapping type and values of $K_2$, S, and/or L may be different from those of the PUSCH default table.

The resource allocation table configured from an RRC signal of the higher layer is given by a signal pusch-TimeDomainAllocationList of the higher layer. An information element PUSCH-TimeDomainResourceAllocation indicates a configuration of the PUSCH time domain resource allocation. The PUSCH-TimeDomainResourceAllocation may be used to configure a time domain relationship between the PDCCH including the DCI and the PUSCH. The pusch-TimeDomainAllocationList includes one or multiple information elements PUSCH-TimeDomainResourceAllocation. In other words, pusch-TimeDomainAllocationList is a list including one or multiple elements (information elements). One information element PUSCH-TimeDomainResourceAllocation may also be referred to as one entry (or one row). The pusch-TimeDomainAllocationList may include up to 16 entries. Each entry may be defined by $K_2$, mappingType, and startSymbolAndLength. $K_2$ indicates a slot offset between a PDCCH including the DCI and the scheduled PUSCH. In a case that the PUSCH-TimeDomainResourceAllocation does not indicate $K_2$, the terminal apparatus 1 may assume that the value of $K_2$ is 1 in a case that the subcarrier spacing of the PUSCH is 15 kHz or 30 kHz, assume that the value of $K_2$ is 2 in a case that the subcarrier spacing of the PUSCH is 60 kHz, and assume that the value of $K_2$ is 3 in a case that the subcarrier spacing of the PUSCH is 120 kHz. The mappingType indicates either the PUSCH mapping type A or the PUSCH mapping type A. The startSymbolAndLength is an index that provides an effective combination of the start symbol S of the PUSCH and the number of consecutive allocated symbols L. The startSymbolAndLength may be referred to as a start and length indicator (SLIV). In other words, different from the default table that directly defines a start symbol S and consecutive symbols L, a start symbol S and the number of consecutive symbols L are given based on the SLIV. The base station apparatus 3 can set the value of the SLIV such that the time domain resource allocation of the PUSCH does not exceed a slot boundary. The value of SLIV is calculated based on the number of symbols included in a slot, a start symbol S, and the number of consecutive symbols L as in an equation represented in FIG. 16.

The signal pusch-TimeDomainAllocationList of the higher layer may be included in the cell-specific RRC parameter pusch-ConfigCommon and/or the terminal apparatus 1 (UE)-specific RRC parameter pusch-Config. The pusch-ConfigCommon is used to configured cell-specific parameters for the PUSCH for a certain BWP. The pusch-Config is used to configure the terminal apparatus 1 (UE)-specific parameters for the PUSCH for a certain BWP.

The terminal apparatus 1 may apply different resource allocation tables to the PUSCH time domain resource allocation in the case of transmission of the first PUSCH and the case of transmission of the second PUSCH. The base station apparatus 3 may apply different resource allocation tables to the PUSCH time domain resource allocation in the case of reception of the first PUSCH and the case of reception of the second PUSCH.

The first PUSCH and the second PUSCH may be PUSCHs that transmit data of different services. For example, the first PUSCH may be a PUSCH that transmits data of eMBB, and the second PUSCH may be a PUSCH that transmits data of URLLC. The first PUSCH may be a PUSCH that is scheduled by the third DCI. The second PUSCH may be a PUSCH that is scheduled by the fourth DCI. The third DCI and the fourth DCI may be DCIs that schedule data of different services. For example, the third DCI may be a DCI that schedules a PUSCH transmitting data of the eMBB, and the fourth DCI may be a DCI that schedules a PUSCH transmitting data of the URLLC.

The third DCI and the fourth DCI may be DCIs in which CRCs scrambled with different RNTIs are added. For example, the third DCI may be a DCI in which a CRC scrambled with a C-RNTI, which is in the range of the first value, is added, and the fourth DCI may be a DCI in which a CRC scrambled with a C-RNTI, which is in the range of a second value different from the first value, is added. For example, the third DCI may be a DCI in which a CRC scrambled with any type of RNTI, which is in the range of a third value, is added, and the fourth DCI may be a DCI in which a CRC scrambled with any type of RNTI, which is in the range of a fourth value different from the range of the third value, is added. For example, the third DCI may be a DCI in which a CRC scrambled with the C-RNTI, the MCS-C-RNTI, the CS-RNTI, the SI-RNTI, the RA-RNTI, the TC-RNTI, and/or the P-RNTI is added, and the fourth DCI may be a DCI in which a CRC scrambled with the UC-RNTI is added. Here, the UC-RNTI may be an RNTI using a value different from values that can be used by the C-RNTI, the MCS-C-RNTI, the CS-RNTI, the SI-RNTI, the RA-RNTI, the TC-RNTI, and the P-RNTI. The UC-RNTI may be an RNTI that is used for controlling the PDSCH or the PUSCH of data of a predetermined service in one or multiple slots.

The third DCI and the fourth DCI may be DCIs using different DCI formats. For example, the first DCI may be a DCI using the DCI format 0_1, and the second DCI may be a DCI using the DCI format 0_2.

The third DCI and the fourth DCI may be DCIs using DCI formats of different sizes. For example, the third DCI may be a DCI using a DCI format of a third size, and the fourth DCI may be a DCI using a DCI format of a fourth size different from the third size.

In each of the third DCI and the fourth DCI, a service to be applied to data of a corresponding PUSCH may be indicated in a predetermined field in the DCI format thereof. For example, transmission of eMBB data by a corresponding PUSCH may be specified in a field in a DCI format of the third DCI. For example, transmission of URLLC data by a corresponding PUSCH may be specified in a field in a DCI format of the fourth DCI.

The third DCI and the fourth DCI may be DCIs transmitted in different search spaces and/or different CORE-SETs.

The third DCI and the fourth DCI may be DCIs that schedule PUSCHs of different codebooks.

A resource allocation table configured by the RRC signal of a higher layer may be given by a signal (an information element or an RRC parameter) of the higher layer that is different from the signal pusch-TimeDomainAllocationList of the higher layer. For example, the resource allocation table may be given by a signal pusch-TimeDomainAllocationList2 of a higher layer. The base station apparatus 3 may notify of pusch-TimeDomainAllocationList and/or pusch-TimeDomainAllocationList2 in a signal of a higher layer. The terminal apparatus 1 may receive pusch-TimeDomainAllocationList and/or pusch-TimeDomainAllocationList2 in a signal of a higher layer.

Similar to the pusch-TimeDomainAllocationList, the pusch-TimeDomainAllocationList2 includes up to 16 entries, and any one entry may be used by a 4-bit field included in the DCI. In each entry included in the pusch-TimeDomainAllocationList2, $K_2$, mappingType, and/or startSymbolAndLength may be indicated. Values that can be used for $K_2$, mappingType, and/or startSymbolAndLength in each entry of the pusch-TimeDomainAllocationList2 may differ from the values that can be used for the pusch-TimeDomainAllocationList. For example, the value of $K_2$ that can be used for the pusch-TimeDomainAllocationList is in the range of 0 to 32, and the value of $K_2$ that can be used for the pusch-TimeDomainAllocationList2 may be in the range of 0 to 4. For example, mappinngType that can be used for the pusch-TimeDomainAllocationList may be the mapping type A and the mapping type B, and mappinngType that can be used for the pusch-TimeDomainAllocationList2 may be only the mapping type B. For example, mappinngType may not be indicated in the pusch-TimeDomainAllocationList2.

In a case that the pusch-TimeDomainAllocationList is included in the signal pusch-Config of a higher layer, and the PUSCH is scheduled by the third DCI, the terminal apparatus 1 may apply the pusch-TimeDomainAllocationList included in the pusch-Config to the resource allocation table of the PUSCH. In a case that the pusch-TimeDomainAllocationList2 is included in the signal pusch-Config of a higher layer, and the PUSCH is scheduled by the fourth DCI, the terminal apparatus 1 may apply the pusch-TimeDomainAllocationList2 included in the pusch-Config to the resource allocation table of the PUSCH.

In a case that the pusch-TimeDomainAllocationList is not included in the signals pusch-Config and pusch-ConfigCommon of a higher layer, and the PUSCH is scheduled by the third DCI, the terminal apparatus 1 may apply the PUSCH default table A to the resource allocation table of the PUSCH. In a case that the pusch-TimeDomainAllocationList2 is not included in the signals pusch-Config and pusch-ConfigCommon of a higher layer, and the PUSCH is scheduled by the fourth DCI, the terminal apparatus 1 may apply the PUSCH default table B to the resource allocation table of the PUSCH. In a case that the pusch-TimeDomainAllocationList and/or the pusch-TimeDomainAllocationList2 are not configured in a signal of a higher layer, the terminal apparatus 1 may use different default tables in the third DCI and the fourth DCI. In a case that the pusch-TimeDomainAllocationList and/or the pusch-TimeDomainAllocationList2 are not configured in a signal of a higher layer, the terminal apparatus 1 may use the same default table in the third DCI and the fourth DCI.

The terminal apparatus 1 detects a DCI that schedules the PUSCH. A slot in which the PUSCH is transmitted is given by (Equation 5) floor($n*2\mu^{PUSCH}/2\mu^{PDCCH}$) $K_2$. n is a slot in which a PDCCH that schedules the PUSCH is detected. $\mu_{PUSCH}$ is a subcarrier spacing configuration for the PUSCH. $\mu_{PDCCH}$ is a subcarrier spacing configuration for the PDCCH.

In FIG. 18, the value of $K_2$ is j, j+1, j+2, or j+3. The value of j is a value that is identified for the subcarrier spacing of the PUSCH. For example, in a case that the subcarrier spacing to which the PUSCH is applied is 15 kHz or 30 kHz, the value of j may be one slot. For example, in a case that the subcarrier spacing to which the PUSCH is applied is 60 kHz, the value of j may be two slots. For example, in a case that the subcarrier spacing to which the PUSCH is applied is 120 kHz, the value of j may be three slots.

As the value of $K_2$, different values may be used in the PUSCH default table A and the PUSCH default table B. For example, a value i different from j may be used in the PUSCH default table B Similar to the value of j, the value of i may be a value that sets the number of slots in correspondence with the subcarrier spacing to which the PUSCH is applied.

As described above, the terminal apparatus 1 may determine which resource allocation table will be applied to the PUSCH time domain resource allocation based on a table as illustrated in FIG. 17.

As Example D, the terminal apparatus 1 may determine a resource allocation table to be applied to the PUSCH scheduled by the RAR UL grant. In a case that the pusch-ConfigCommon includes pusch-TimeDomainAllocationList for the terminal apparatus 1, the terminal apparatus 1 may determine a resource allocation table configured from the RRC signal of a higher layer. The resource allocation table is given by pusch-TimeDomainAllocationList included in the pusch-ConfigCommon. In a case that the pusch-ConfigCommon does not include pusch-TimeDomainAllocationList for the terminal apparatus 1, the terminal apparatus 1 may determine the PUSCH default table A. In other words, the terminal apparatus 1 may apply the default table A indicating the configuration of the PUSCH time domain resource allocation to determination of the PUSCH time domain resource allocation.

As Example E, the terminal apparatus 1 may detect a DCI in an arbitrary common search space associated with CORESET #0. In the detected DCI, a CRC scrambled with any one of the C-RNTI, the MCS-C-RNTI, the TC-RNTI, or the CS-RNTI is added. The terminal apparatus 1 may determine a resource allocation table to be applied to a PUSCH that is scheduled by the DCI. In a case that the pusch-ConfigCommon includes pusch-TimeDomainAllocationList for the terminal apparatus 1, the terminal apparatus 1 may determine a resource allocation table to be applied to the PUSCH time domain resource allocation to be a resource allocation table given from the pusch-TimeDomainAllocationList provided by the pusch-ConfigCommon. In addition, in a case that the pusch-ConfigCommon does not include pusch-TimeDomainAllocationList, the terminal apparatus 1 may determine a resource allocation table to be applied to the PUSCH time domain resource allocation to be the PUSCH default table A.

As Example F, the terminal apparatus 1 may detect a DCI in (I) an arbitrary common search space associated with CORESET #0 or (II) UE-specific search space. In the detected DCI, a CRC scrambled with any one of the C-RNTI, the MCS-C-RNTI, the TC-RNTI, and the CS-RNTI is added. The terminal apparatus 1 may determine a resource allocation table to be applied to the PUSCH scheduled by the DCI. In a case that the pusch-Config includes pusch-TimeDomainAllocationList for the terminal apparatus 1, the terminal apparatus 1 may determine a resource allocation table to be applied to the PUSCH time domain resource allocation to be a resource allocation table given from pusch-TimeDomainAllocationList provided by the pusch-Config. In other words, in a case that the pusch-Config includes pusch-TimeDomainAllocationList, the terminal apparatus 1 may apply pusch-TimeDomainAllocationList provided by the pusch-Config to determination of the PUSCH time domain resource allocation regardless of whether pusch-ConfigCommon includes the pusch-TimeDomainAllocationList. In addition, in a case that the pusch-Config does not include the pusch-TimeDomainAllocationList, and the pusch-ConfigCommon includes the pusch-TimeDomainAllocationList, the terminal apparatus 1 may determine a resource allocation table to be applied to the PUSCH time domain resource allocation to be a resource allocation table given from the pusch-TimeDomainAllocationList provided by the pusch-ConfigCommon. In other words, the terminal apparatus 1 applies the pusch-TimeDomainAllocationList provided by the pusch-ConfigCommon to determination of the PUSCH time domain resource allocation. In addition, in a case that the pusch-Config does not include the pusch-TimeDomainAllocationList, and the pusch-ConfigCommon does not include the pusch-TimeDomainAllocationList, the terminal apparatus 1 may determine a resource allocation table to be applied to the PUSCH time domain resource allocation to be the PUSCH default table A.

FIG. 19 is an example of a table illustrating a method for determining a resource allocation table to be applied to a PUSCH according to an embodiment of the present invention. The terminal apparatus 1 may determine a resource allocation table as illustrated in FIG. 19 for the last row illustrated in FIG. 17 (in a case that a DCI in an arbitrary common search space or a UE-specific search space not associated with CORESET #0 is detected, and the RNTI is an RNTI of a predetermined type). The terminal apparatus 1 may determine a resource allocation table to be applied to the PUSCH scheduled by the DCI based at least on some of Element (J) to Element (L) as below.

Element (j): Weather the DCI is the third DCI (3rd DCI) or the fourth DCI (4th DCI) described above Element (K): Whether the pusch-ConfigCommon includes pusch-TimeDomainAllocationList2

Element (L): Whether the pusch-Config includes pusch-TimeDomainAllocationList2

Here, the same default table (for example, the default table A) may be used in the case of the third DCI and the case of the fourth DCI. The pusch-TimeDomainAllocation- List2 may be a parameter that is not included in the pusch-ConfigCommon and is included only in the pusch-Config.

In the table illustrated in FIG. 19, the terminal apparatus 1 and/or the base station apparatus 3 determine a resource allocation table to be applied to the PUSCH among the default table A, the default table B, the pusch-TimeDomainAllocationList included in the pusch-ConfigCommon, pusch-TimeDomainAllocationList included in the pusch-Config, the pusch-TimeDomainAllocationList2 included in the pusch-ConfigCommon, and the pusch-TimeDomainAllocationList2 included in the pusch-Config.

FIG. 20 is another example of a table illustrating a method for determining a resource allocation table to be applied to the PUSCH according to an embodiment of the present invention. In the table illustrated in FIG. 20, the terminal apparatus 1 and/or the base station apparatus 3 determine a resource allocation table to be applied to the PUSCH among the PUSCH default table A, the pusch-TimeDomainAllocationList included in the pusch-ConfigCommon, the pusch-TimeDomainAllocationList included in the pusch-Config, and the pusch-TimeDomainAllocationList2 included in the pusch-Config. In the example of the table illustrated in FIG. 20, in a case that the DCI is the fourth DCI, the pusch-TimeDomainAllocationList2 is not included in the pusch-Config, and the pusch-TimeDomainAllocationList is included in the pusch-ConfigCommon, a resource allocation table to be applied to the PUSCH is the pusch-TimeDomainAllocationList included in the pusch-ConfigCommon. However, in a case that the DCI is the fourth DCI, and the pusch-TimeDomainAllocationList2 is not included in the pusch-Config, a resource allocation table to be applied to the PUSCH may be the PUSCH default table A or the PUSCH default table B.

The terminal apparatus 1 may select one PUSCH time domain resource allocation configuration in the determined resource allocation table based on a value indicated in the 'Time domain resource assignment' field included in the DCI that schedules the PUSCH. For example, in a case that the resource allocation table to be applied to the PUSCH time domain resource allocation is the PUSCH default table A (or the PUSCH default table B), the value m indicated in the 'Time domain resource assignment' field may indicate a row index m+1 of the PUSCH default table A (or the PUSCH default table B). At this time, the PUSCH time domain resource allocation is a configuration of the time domain resource allocation indicated by the row index m+1. The terminal apparatus 1 assumes the configuration of the time domain resource allocation indicated by the row index m+1 and transmits the PUSCH. For example, in a case that the value m indicated in the 'Time domain resource assignment field' is 0, the terminal apparatus 1 identifies resource allocation of the PUSCH, which is scheduled by the DCI, in the time direction using the configuration of the PUSCH time domain resource allocation of a row index 1 of the PUSCH default table A (or the PUSCH default table B).

In addition, in a case that the resource allocation table to be applied to the PUSCH time domain resource allocation is a resource allocation table given from the pusch-TimeDomainAllocationList, the value m indicated in the 'Time domain resource assignment' field corresponds to the (m+1)-th element (entry, row) in the list pusch-TimeDomainAllocationList. For example, in a case that the value m indicated in the 'Time domain resource assignment' field is 0, the terminal apparatus 1 may refer to the first element (entry) in the list pusch-TimeDomainAllocationList. For example, in a case that the value m indicated in the 'Time domain resource assignment' field is 1, the terminal apparatus 1 may refer to the second element (entry) in the list pusch-TimeDomainAllocationList.

In addition, in a case that the resource allocation table to be applied to the PDSCH time domain resource allocation is a resource allocation table given from the pusch-TimeDomainAllocationList2, the value m indicated in the 'Time domain resource assignment' field corresponds to the (m+1)-th element (entry, row) in the list pusch-TimeDomainAllocationList2. For example, in a case that the value m indicated in the 'Time domain resource assignment' field is 0, the terminal apparatus 1 may refer to the first element (entry) in the list pusch-TimeDomainAllocationList2. For example, in a case that the value m indicated in the 'Time domain resource assignment' field is 1, the terminal apparatus 1 may refer to the second element (entry) in the list pusch-TimeDomainAllocationList2.

Hereinafter, the number of bits (size) of the 'Time domain resource assignment' field included in the DCI will be described.

The terminal apparatus 1 may transmit a corresponding PUSCH in accordance with detection of the PDCCH including the DCI format 0_0, the DCI format 0_1, or the DCI format 0_2. The number of bits of the 'Time domain resource assignment' field included in the DCI format 0_0 may be a fixed number of bits. For example, the fixed number of the bits may be four. In other words, the size of the 'Time domain resource assignment' field included in the DCI format 0_0 is four bits. The size of the 'Time domain resource assignment' field included in the DCI format 0_1 or the DCI format 0_2 may be a variable number of bits. For example, the number of bits of the 'Time domain resource assignment' field included in the DCI format 0_1 or the DCI format 0_2 may be any one of 0, 1, 2, 3, and 4. The number of bits of the 'Time domain resource assignment' field included in the DCI format 1_2 may be a value greater than four.

The determination of the number of bits of the 'Time domain resource assignment' field included in the DCI format 0_1 or the DCI format 0_2 will be described.

The number of bits of the 'Time domain resource assignment' field may be given as ceiling (log 2(I)). In a case that the pusch-TimeDomainAllocationList (or the pusch-TimeDomainAllocationList2) is configured (provided) for the terminal apparatus 1, the value of I may be the number of entries included in the pusch-TimeDomainAllocationList (or the pusch-TimeDomainAllocationList2). In a case that the pusch-TimeDomainAllocationList (or the pusch-TimeDomainAllocationList2) is not configured (provided) for the terminal apparatus 1, the value of I may be the number of rows of the PUSCH default table A (or the PUSCH default table B). In other words, in a case that the pusch-TimeDomainAllocationList (or the pusch-TimeDomainAllocationList2) is configured for the terminal apparatus 1, the number of bits of the 'Time domain resource assignment' field may be given based on the number of entries included in the pusch-TimeDomainAllocationList (or the pusch-TimeDomainAllocationList2). In a case that the pusch-TimeDomainAllocationList (or the pusch-TimeDomainAllocationList2) is not configured for the terminal apparatus 1, the number of bits of the 'Time domain resource assignment' field may be given based on the number of rows of the default table (the PUSCH default table A or the PUSCH default table B). More specifically, in a case that the pusch-Config includes the pusch-TimeDomainAllocationList (or the pusch-TimeDomainAllocationList2), the value of I may be the number of entries included in the pusch-TimeDomainAllocationList (or the pusch-TimeDomainAllocationList2) provided by the pusch-Config. In addition, in a case that the pusch-Config does not include the pusch-TimeDomainAllocationList (or the pusch-TimeDomainAllocationList2), and the pusch-ConfigCommon includes the pusch-TimeDomainAllocationList (or the pusch-TimeDomainAllocationList2), the value of I may be the number of entries included in the pusch-TimeDomainAllocationList (or the pusch-TimeDomainAllocationList2) provided by the pusch-ConfigCommon. In addition, in a case that the pusch-Config does not include the pusch-TimeDomainAllocationList (or the pusch-TimeDomainAllocationList2), and the pusch-ConfigCommon does not include the pusch-TimeDomainAllocationList (or the pusch-TimeDomainAllocationList2), the value of I may be the number of rows included in the PUSCH default table A (or the PUSCH default table B).

The number of entries included in the pusch-TimeDomainAllocationList may differ from the number of entries included in the pusch-TimeDomainAllocationList2. A maximum number of entries included in the pusch-TimeDomainAllocationList may be a first value. For example, the first value is 16. A maximum number of entries included in the pusch-TimeDomainAllocationList2 may be a second value. For example, the first value is a value greater than 16.

Detail of FIG. 9 is described as follows. FIG. 9(A) is a diagram illustrating an example of transmission of a PUSCH (the first PUSCH) scheduled by a PDCCH accompanying the third DCI. FIG. 9(B) is a diagram illustrating an example of transmission of PUSCHs (the first PUSCH and the second PUSCH) scheduled by PDCCHs accompanying the third DCI and the fourth DCI.

As described above, the terminal apparatus 1 may transmit a corresponding PUSCH in accordance with detection of a PDCCH including the DCI. In other words, the corresponding PUSCH may be scheduled (indicated) by the DCI format (DCI). In a case that the terminal apparatus 1 is scheduled to start transmission of the first PUSCH starting with a symbol j in accordance with the PDCCH ending with a symbol i for arbitrary two HARQ process numbers in a certain cell (a given certain scheduling cell), the terminal apparatus 1 is not expected to be scheduled to start transmission of a PUSCH that has been started before the end of the first PUSCH in accordance with a PDCCH ending after the symbol i. In other words, in a case that it is scheduled to start transmission of the first PUSCH starting with the symbol j to a certain terminal apparatus 1 using the PDCCH ending with the symbol i for arbitrary two HARQ process numbers in a certain cell, the base station apparatus 3 may not be scheduled to transmit a PUSCH that has been started before the end of the first PUSCH to the terminal apparatus 1 using a PDCCH ending after the symbol i. For arbitrary two HARQ process numbers in a given cell, the terminal apparatus 1 may not be expected to transmit a PUSCH that overlaps another PUSCH with respect to time. In other words, the base station apparatus 3 may not be scheduled to transmit another PUSCH overlapping a certain PUSCH addressed to the terminal apparatus 1 with respect to time to the terminal apparatus 1 for arbitrary two HARQ process numbers in a given cell. Here, the mentioned PDCCH may correspond to a PDCCH accompanying the third DCI. The mentioned PUSCH may correspond to a first PUSCH scheduled by the third DCI.

The terminal apparatus 1 may perform out-of-order PUSCH transmission. More specifically, the terminal apparatus 1 may be scheduled to start transmission of the first PUSCH starting with the symbol j using the PDCCH ending with the symbol i. Here, the PDCCH may correspond to the PDCCH accompanying the third DCI. The first PUSCH may correspond to the first PUSCH scheduled by the third DCI. Subsequently, the terminal apparatus 1 may receive a PDCCH accompanying the fourth DCI that ends after the symbol i. The PUSCH scheduled by the fourth DCI (the second PUSCH) may be started before the end of the first PUSCH. In other words, in a case that the terminal apparatus 1 is scheduled to start transmission of the first PUSCH starting with the symbol j using the PDCCH accompanying the third DCI ending with the symbol i for arbitrary two HARQ process numbers in a certain cell (a given scheduling cell), the terminal apparatus 1 may be expected to be scheduled to transmit a certain PUSCH that has been started before the end of the first PUSCH using the PDCCH accompanying the fourth DCI that ends after the symbol i. In other words, in a case that it is scheduled to start transmission of the first PUSCH starting with the symbol j using the PDCCH accompanying the third DCI ending with the symbol i to a certain terminal apparatus 1 for arbitrary two HARQ process numbers in a certain cell, the base station apparatus 3 may be schedule to transmit a PUSCH that has been started before the end of the first PUSCH to the terminal apparatus 1 using the PDCCH accompanying the fourth DCI that ends after the symbol i.

In FIG. 9(A), by detecting a DCI (900), the terminal apparatus 1 may transmit a PUSCH (903) scheduled by the detected DCI. Here, the DCI (900) corresponds to the third DCI. The DCI (901) is a DCI that ends after a symbol with which the DCI (900) ends. Some of symbols of the DCI (901) may be overlap the DCI (900) with respect to time. The PUSCH (902) may be a PUSCH that is started before the end of the PUSCH (903). The PUSCH (904) may be a PUSCH that is started after the end of the PUSCH (903). The PUSCH (902), the PUSCH (903), and the PUSCH (904) correspond to the first PUSCH scheduled by the third DCI. In FIG. 9(A), the PUSCH (903) may be referred to as a first PUSCH. The PUSCH (903) may correspond to a PUSCH accompanying a first HARQ process number. The PUSCH (902) may correspond to a PUSCH accompanying a HARQ process number corresponding to a value different from the first HARQ process number. The PUSCH (904) may correspond to a PUSCH accompanying a HARQ process number corresponding to a value different from the first HARQ process number. In other words, the terminal apparatus 1 may not be expected to be scheduled to receive the DCI (901) and transmit a corresponding PUSCH (902). The terminal apparatus 1 may be expected to be scheduled to receive the DCI (901) and transmit a corresponding PUSCH (904). In other words, in a case that it is schedule to start transmission of the PUSCH (903) to the terminal apparatus 1 using the DCI (900), the base station apparatus 3 may not be scheduled to transmit the PUSCH (902) to the terminal apparatus 1 using the DCI (901). In other words, in a case that it is scheduled to start transmission of the PUSCH (903) to the terminal apparatus 1 using the DCI (900), the base station apparatus 3 may be scheduled to transmit the PUSCH (904) to the terminal apparatus 1 using the DCI (901). In other words, the DCI to schedule the transmission of the PUSCH (902) may be a DCI that ends with a symbol that is the same as a symbol with which the PDCCH accompanying the DCI (900) ends or a DCI that ends before a symbol with which the PDCCH accompanying the DCI (900) ends.

FIG. 9(B) is a diagram illustrating an example of the out-of-order PUSCH transmission. In FIG. 9(B), by detecting a DCI (910), the terminal apparatus 1 may transmit the PUSCH (913) scheduled by the detected DCI. Here, the DCI (910) corresponds to the third DCI. The DCI (911) is a DCI that ends after a symbol with which the DCI (910) ends. Some of symbols of the DCI (911) may overlap the DCI (910) with respect to time. A PUSCH (912) may be a PUSCH that is started before the end (start) of the PUSCH (913). A PUSCH (914) may be a PUSCH that is started after the end of the PUSCH (913). The PUSCH (913) corresponds to the first PUSCH scheduled by the third DCI. The PUSCH (912) and the PUSCH (914) correspond to the second PUSCH scheduled by the fourth DCI. In FIG. 9(B), the PUSCH (913) may be referred to as a first PUSCH. The PUSCH (913) may correspond to a PUSCH accompanying the first HARQ process number. The PUSCH (912) may correspond to a PUSCH accompanying a HARQ process number corresponding to a value different from the first HARQ process number. The PUSCH (914) may correspond to a PUSCH accompanying a HARQ process number corresponding to a value different from the first HARQ process number. In other words, the terminal apparatus 1 may be expected to be scheduled to receive the DCI (911) and transmit a corresponding PUSCH (912). The terminal apparatus 1 may be expected to be scheduled to receive the DCI (911) and transmit the corresponding PUSCH (914). In other words, in a case that it is scheduled to start transmission of the PUSCH (913) to the terminal apparatus 1 using the DCI (910), the base station apparatus 3 may be scheduled to transmit the PUSCH (912) to the terminal apparatus 1 using the DCI (911). In other words, in a case that it is scheduled to start transmission of the PUSCH (913) to the terminal apparatus 1 using the DCI (910), the base station apparatus 3 may be scheduled to transmit the PUSCH (914) to the terminal apparatus 1 using the DCI (911). Transmission of the PUSCH (912) that is started before the end (or the start) of the PUSCH (913) scheduled by the DCI (911) that ends after a symbol with which the DCI (910) ends may be referred to as out-of-order PUSCH transmission.

Hereinafter, a PUSCH preparation procedure time will be described.

First, a PUSCH preparation procedure time $T_{proc, 2}$ (PUSCH preparation time) for a PUSCH that is scheduled by the DCI (scheduling DCI) will be described. The value of $T_{proc, 2}$ may be given as (Equation 3) $\max((N_2+d_{2, 1})(2018+144)*\kappa*2^{-\mu}*T_c, d_{2, 2})$. The function max(A, B) outputs a maximum value out of values of A and B. $N_2$ is a PUSCH preparation time and is the number of symbols defined in advance. In the PUSCH capability 1 (PUSCH timing capability 1), the numbers of $N_2$ respectively corresponding to subcarrier spacings 15 kHz, 30 kHz, 60 kHz, and 120 kHz may be 10, 12, 23, and 36. In the PUSCH capability 2 (PUSCH timing capability 2), the numbers of $N_2$ respectively corresponding to subcarrier spacings 15 kHz, 30 kHz, and 60 kHz, and 120 kHz may be 5, 5, 5, and 11. $\mu$ may correspond to a subcarrier spacing for calculating a larger value (maximum value) of $T_{proc, 2}$ out of ($\mu_{DL}, \mu_{UL}$). The $\mu_{DL}$ corresponds to the subcarrier spacing of the PDCCH accompanying the DCI scheduling the PUSCH. The $\mu_{UL}$ corresponds to the subcarrier spacing of an uplink channel in which the PUSCH is transmitted. In a case that the first symbol of the PUSCH allocation is configured (transmitted) only using the DMRS, $d_{2,1}$ may be 0. In a case that the first symbol of the PUSCH allocation is configured (transmitted) using the DMRS and data of a transport block, $d_{2,1}$ may be 1. $\kappa$ is a constant of 64 and is calculated from $T_s/T_c$. $T_s$ is calculated from $1/(\Delta f_{ref}*N_{f, ref})$. $T_c$ is a time unit and is calculated from $1/(\Delta f_{max}*N_f)$. $\Delta f_{ref}$ is $15*10^3$ hertz. $N_{f, ref}$ is 2048. $\Delta f_{max}$ is $480*10^3$ hertz. $N_f$ is 4096. In a case that the DCI (scheduling DCI) for scheduling the PUSCH triggers BWP switching, $d_{2, 2}$ may be set to a value defined in advance. In a case that the DCI scheduling the PUSCH does not trigger the BWP switching, $d_{2, 2}$ may be set to 0.

The terminal apparatus 1 may transmit the PUSCH for the transport block in a case that the first uplink symbol in the PUSCH allocation is not a symbol before the symbol $L_2$. In other words, in a case that the first uplink symbol in the PUSCH allocation is the same symbol as the symbol $L_2$ or a symbol after the symbol $L_2$, the terminal apparatus 1 may transmit the PUSCH for the transport block. In other words, in a case that the first uplink symbol in the PUSCH allocation is a symbol before the symbol $L_2$, the terminal apparatus 1 may not transmit the PUSCH for the transport block. In other words, in a case that the first uplink symbol in the PUSCH allocation is a symbol before the symbol $L_2$, the terminal apparatus 1 may ignore (drop) the scheduling DCI. The symbol $L_2$ is defined as an uplink symbol accompanying a next Cyclic Prefix (CP) from the start (elapse) of the time of $T_{proc, 2}$ after the end of reception of the last symbol of the PDCCH accompanying the DCI that schedules the PUSCH. In other words, the position of the symbol $L_2$ may be identified (determined) based on the time of $T_{proc, 2}$. In other words, in a case that a time offset between the PDCCH accompanying the DCI and a PUSCH scheduled by the DCI (the number of uplink symbols) is equal to or greater than the time of $T_{proc, 2}$ (the number of uplink symbols corresponding to the time of $T_{proc, 2}$), the terminal apparatus 1 may transmit the PUSCH. In addition, in a case that the time offset between the PDCCH accompanying the DCI and the PUSCH scheduled by the DCI is smaller than the time of $T_{proc, 2}$ (the number of uplink symbols corresponding to the time of $T_{proc, 2}$), the terminal apparatus 1 may not transmit the PUSCH or may drop the DCI. The base station apparatus 3 may not attempt to receive the PUSCH. In other words, the time of $T_{proc, 2}$ (the number of uplink symbols corresponding to the time of $T_{proc, 2}$) may be used to determine whether the PUSCH is transmitted.

Hereinafter, the PUSCH preparation procedure time in a case that the out-of-order PUSCH transmission is performed will be described.

The terminal apparatus 1 supporting PUSCH transmission for transmitting data of different services may support the out-of-order PUSCH transmission. In a case that the out-of-order PUSCH transmission is performed, the PUSCH preparation procedure time (PUSCH preparation time) $T_{proc, 2}$ for PUSCH transmission may be different from the value of the PUSCH preparation procedure time calculated from (Equation 3). For example, the value of $T_{proc, 2}$ may be given as (Equation 4) $\max((N_2+d_{2,1})(2018+144)*\kappa*2^{-\mu}*T_c+T_{proc, 2'}, d_{2, 2})$. Hereinafter, $T_{proc, 2'}$ will be described. Other parameters in (Equation 4) are similar to those in (Equation 3), and thus description thereof will be omitted.

In a case that the out-of-order PUSCH transmission is performed, $T_{proc, 2'}$ may be given based on (Equation 3) or (Equation 4). In a case that the out-of-order PUSCH transmission is not performed, $T_{proc, 2'}$ may be set to 0. In other words, the PUSCH preparation procedure time corresponding to the first PUSCH may be changed based on whether the out-of-order PUSCH transmission is performed before transmission of the first PUSCH.

FIG. 9(C) is a diagram illustrating an example of the PUSCH preparation procedure time and the PUSCH transmission. In FIG. 9(C), by detecting a DCI (920), the terminal apparatus 1 may transmit a PUSCH (923) scheduled by the detected DCI. By detecting a DCI (921), the terminal apparatus 1 may transmit a PUSCH (922) scheduled by the detected DCI. Here, the DCI (920) corresponds to the third DCI. The DCI (921) corresponds to the fourth DCI. The DCI (921) is a DCI that ends after the symbol with which the DCI (920) ends. Some of symbols of the DCI (921) may overlap the DCI (920) with respect to time. The PUSCH (922) may be a PUSCH that is started before the end (start) of the PUSCH (923). A HARQ process number associated with the PUSCH (922) may be different from the HARQ process number associated with the PUSCH (921). In other words, at a time when the PUSCH (923) is to be transmitted, out-of-order PUSCH (PUSCH (922)) transmission is performed.

In FIG. 9(C), a symbol 924, a symbol 925, and a symbol 926 may be located at positions of symbols corresponding to the symbol $L_2$. The PUSCH procedure preparation time for the PUSCH (923) may be given based at least on (Equation 3) or (Equation 4). For example, in a case that the position of the symbol $L_2$ given based on the PUSCH procedure preparation time is that of the symbol 924 or 925, the terminal apparatus 1 may transmit the PUSCH (923). In a case that the position of the symbol $L_2$ given based on the PUSCH procedure preparation time is that of the symbol 926, the terminal apparatus 1 may not transmit the PUSCH (923) or may drop the DCI (920) scheduling the PUSCH (923). In a case that the out-of-order PUSCH (922) transmission is performed as the transmission of the PUSCH (923), the PUSCH procedure preparation time for the PUSCH may be given based at least on (Equation 4). In a case that there is no out-of-order PUSCH (922) transmission for the transmission of the PUSCH (923), the PUSCH procedure preparation time for the PUSCH (923) may be given based at least on (Equation 3) or (Equation 4). In (Equation 4), in a case that the out-of-order PUSCH (922) transmission occurs, the value of $TT_{proc,\,2'}$ may correspond to the value of the PUSCH procedure preparation time for the PUSCH (922). In (Equation 4), in a case that the out-of-order PUSCH (922) transmission does not occur, the value of $TT_{proc,\,2'}$ may be set to 0. In other words, the value of the PUSCH procedure preparation time for the PUSCH (923) may be a first value given based at least on (Equation 3). In a case that the PUSCH (922) is transmitted, the value of the PUSCH procedure preparation time for the PUSCH (923) may be a value acquired by adding a second value to the first value. The second value may be given based at least on the value of the PUSCH procedure preparation time for the PUSCH (922). In a case that no transmission of the PUSCH (922) occurs, the second value may be 0. In a case that the number of symbols between the DCI (920) and the PUSCH (923) is equal to or greater than the number of symbols corresponding to the value of the PUSCH procedure preparation time for the PUSCH (923), the terminal apparatus 1 may transmit the PUSCH (923). In a case that the number of symbols between the DCI (920) and the PUSCH (923) is smaller than the number of symbols corresponding to the value of the PUSCH procedure preparation time for the PUSCH (923), the terminal apparatus 1 may not transmit the PUSCH (923).

The PUSCH procedure preparation time for the PUSCH (922) may be given based at least on (Equation 3) or (Equation 4). Here, in Equation 4, no out-of-order PUSCH transmission occurs for the transmission of the PUSCH (922), and thus the value of $T_{proc,\,2'}$ may be set to 0. The PUSCH capability applied to the PUSCH (922) may be different from the PUSCH capability applied to the PUSCH (923). In other words, $N_2$ applied to the PUSCH (922) may have a value similar to the value of $N_2$ applied to the PUSCH (923) or a value smaller than the value of $N_2$ applied to the PUSCH (923). In addition, at a time when the processing (preparation) of the PUSCH (922) is to be started within the PUSCH procedure preparation time for the PUSCH (923), the terminal apparatus 1 may stop (slot) the processing (preparation) of the PUSCH (923). At this time, the PUSCH procedure preparation time for the PUSCH (922) may have a value acquired by further adding X symbols to a value given based at least on (Equation 3) or (Equation 4). The value of X may be a value defined based at least on the PUSCH capability applied to the PUSCH (923) and/or the PUSCH preparation time $N_2$ applied to the PUSCH (923). In a case that the processing (preparation) of the PUSCH (923) is not stopped (slot), the value of X may be 0. In addition, at a time when the processing (preparation) of the PUSCH (922) is to be started outside the PUSCH procedure preparation time for the PUSCH (923), the terminal apparatus 1 may not stop (slot) the processing (preparation) of the PUSCH (923). At this time, the PUSCH procedure preparation time for the PUSCH (922) may have a value given based at least on (Equation 3) or (Equation 4).

In other words, in FIG. 9(C), the terminal apparatus 1 may determine whether the PUSCH (923) is transmitted using the PUSCH procedure preparation time $T_{proc,\,2}$ given based on (Equation 4) in a case that the out-of-order PUSCH (922) transmission occurs. The terminal apparatus 1 may identify the position of the symbol $L_2$ based on the PUSCH procedure preparation time given based on (Equation 4). In a case that the first uplink symbol in the PUSCH (923) allocation is a symbol before the symbol $L_2$, the terminal apparatus 1 may not transmit the PUSCH (923). In a case that the first uplink symbol in the PUSCH (923) allocation is the symbol $L_2$ or a symbol after the symbol $L_2$, the terminal apparatus 1 may transmit the PUSCH (923).

In addition, in FIG. 9(C), in a case that the out-of-order PUSCH (922) transmission occurs, the terminal apparatus 1 may determine whether the PUSCH (923) is transmitted using the PUSCH procedure preparation time $T_{proc,\,2}$ given based on (Equation 3). At this time, the symbol $L_2$ may be defined as an uplink symbol accompanying the next Cyclic Prefix (CP) from the start (elapse) of the time of $T_{proc,\,2}$ after the end of transmission of the last symbol of the PUSCH (922). In a case that the first uplink symbol in the PUSCH (923) allocation is a symbol before the symbol $L_2$, the terminal apparatus 1 may not transmit the PUSCH (923). In a case that the first uplink symbol in the PUSCH (923) allocation is the symbol $L_2$ or a symbol after the symbol $L_2$, the terminal apparatus 1 may transmit the PUSCH (923).

In addition, in FIG. 9(C), in a case that the terminal apparatus 1 stops processing of the PUSCH (923) in accordance with an occurrence of the transmission of the PUSCH (922), the terminal apparatus 1 may determine whether the PUSCH (923) is transmitted using the PUSCH procedure preparation time $T_{proc,\,2}$ given based on (Equation 3). At this time, the new symbol $L_2$ may be defined as an uplink symbol accompanying the next Cyclic Prefix (CP) from the start (elapse) of the time of $T_{proc,\,2}$ after the end of transmission of the last symbol of the PUSCH (922). In addition, in a case that the terminal apparatus 1 does not stop the processing of the PUSCH (923) in response to an occurrence of the PUSCH (922) transmission, the terminal apparatus 1 may determine whether the PUSCH (923) is transmitted using the PUSCH procedure preparation time $T_{proc,\,2}$ given based on (Equation 4). At this time, the symbol $L_2$ may be defined as an uplink symbol accompanying the next Cyclic Prefix (CP) from the start (elapse) of $T_{proc,\,2}$ after the end of reception of the last symbol of the PDCCH accompanying the DCI (920). Next, in a case that the first uplink symbol in the PUSCH (923) allocation is a symbol before the symbol $L_2$, the terminal apparatus 1 may not transmit the PUSCH (923). In a case that the first uplink symbol in the PUSCH (923) allocation is the symbol $L_2$ or a symbol after the symbol $L_2$, the terminal apparatus 1 may transmit the PUSCH (923).

The terminal apparatus 1 attempts to transmit a corresponding first PUSCH in accordance with detection of the third DCI. The terminal apparatus 1 may determine whether the first PUSCH is transmitted based at least on the value of the PUSCH procedure preparation time of the first PUSCH. The value of the PUSCH procedure preparation time of the first PUSCH may be a first value. In a case that the number of symbols between the third DCI and the first PUSCH is equal to or greater than the number of symbols corresponding to the value of the PUSCH procedure preparation time of the first PUSCH, the terminal apparatus 1 may determine the transmission of the first PUSCH. In a case that the terminal apparatus 1 satisfies a condition in which the out-of-order PUSCH transmission occurs, the value of the PUSCH procedure preparation time of the first PUSCH may be a value acquired by adding a second value to the first value. At least some or all of the following Condition (A) to Condition (H) may be included in the condition in which the out-of-order PUSCH transmission occurs. An occurrence of (out-of-order) PUSCH transmission may mean transmission of the (out-of-order) PUSCH. An occurrence of (out-of-order) PUSCH transmission may mean that the (out-of-order) PUSCH is scheduled. An occurrence of (out-of-order) PUSCH transmission may mean that the out-of-order) PUSCH transmission is performed.

Condition (A) is that a second PUSCH is transmitted. Condition (B) is that the second PUSCH to be transmitted is scheduled by the fourth DCI. The condition (C) is that the reception of the fourth DCI ends after a symbol with which the reception of the third DCI ends. Condition (D) is that the transmission of the second PUSCH is started before the end of transmission of the first PUSCH. Condition (E) is that a HARQ process number for the second PUSCH is different from a HARQ process number for the first PUSCH. Condition (F) is that the value of the RNTI that scrambles an CRC added to the third DCI is in a first range, and the value of the RNTI that scrambles a CRC added to the fourth DCI is in a second range different from the first range. Condition (H) is that a format used in the third DCI is different from the format used in the fourth DCI.

As described above, in a case that the out-of-order PUSCH transmission occurs, two PUSCH transmissions (the first PUSCH transmission and the second PUSCH transmission) may not overlap each other with respect to time. In a case that the out-of-order PUSCH transmission occurs, and two PUSCH transmissions (the first PUSCH transmission and the second PUSCH transmission) overlap each other with respect to time, the terminal apparatus 1 may drop the transmission of the first PUSCH without being based on the PUSCH procedure preparation time.

Configurations of apparatuses according to the present embodiment will be described below.

Figure 21:
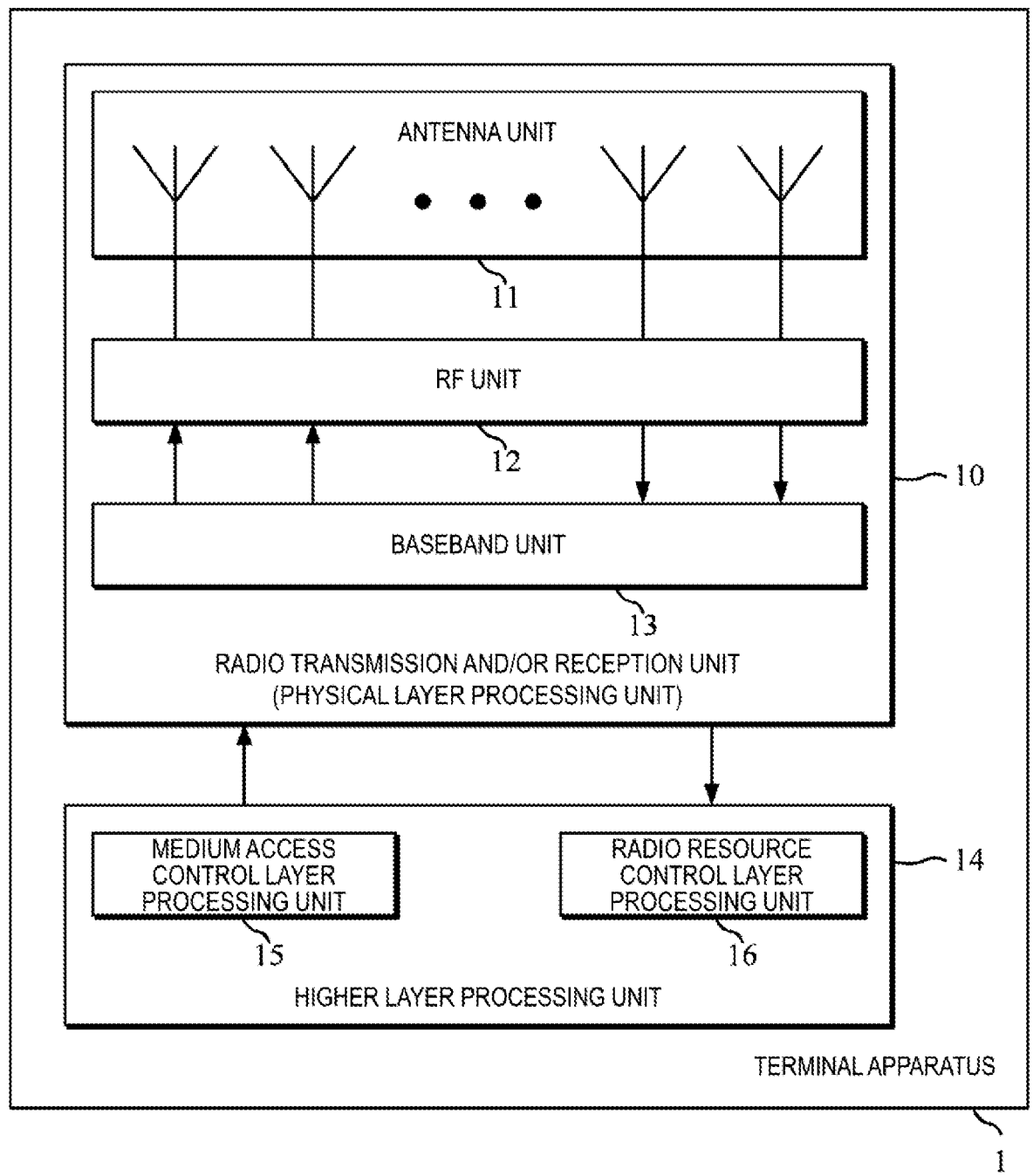
FIG. 21 is a schematic block diagram illustrating the configuration of a terminal apparatus according to an embodiment of the present invention.

FIG. 21 is a schematic block diagram illustrating the configuration of the terminal apparatus 1 according to to an embodiment of the present invention. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmission unit, a reception unit, a monitoring unit, or a physical layer processing unit. The higher layer processing unit 14 is also referred to as a measurement unit 14, a selection unit 14, a determination unit 14, or a control unit 14.

The higher layer processing unit 14 outputs uplink data (may be referred to as a transport block) generated by user operation or the like to the radio transmission and/or reception unit 10. The higher layer processing unit 14 performs some or all types of the processing of the Medium Access Control (MAC) layer, the Packet Data Convergence Protocol (PDCP) layer, the Radio Link Control (RLC) layer, and the Radio Resource Control (RRC) layer. The higher layer processing unit 14 may have a function of determining a time parameter for transmitting a physical uplink shared channel based on a signal of a higher layer and/or downlink control information received from the base station apparatus 3. The higher layer processing unit 14 may have a function of determining and stopping transmission of a corresponding HARQ-ACK or transmission of the PUSCH based on the PDSCH processing procedure time or the PUSCH procedure preparation time.

The medium access control layer processing unit 15 included in the higher layer processing unit 14 performs the processing of the medium access control layer (MAC layer). The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs the processing of the RRC layer (radio resource control layer). The radio resource control layer processing unit 16 manages various types of configuration information/parameters of the terminal apparatus 1. The radio resource control layer processing unit 16 sets various types of configuration information/parameters based on a higher layer signaling received from the base station apparatus 3. Namely, the radio resource control layer processing unit 16 sets the various configuration information/parameters in accordance with the information for indicating the various configuration information/parameters received from the base station apparatus 3. The radio resource control layer processing unit 16 controls (identifies) resource allocation based on downlink control information received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data and transmit the generated transmit signal to the base station apparatus 3 and the like. The radio transmission and/or reception unit 10 outputs a signal of a higher layer (an RRC message), a DCI, and the like received from the base station apparatus 3 to the higher layer processing unit 14. The radio transmission and/or reception unit 10 generates and transmits an uplink signal (including the physical uplink control channel and/or the physical uplink shared channel) based on the indication from the higher layer processing unit 14. The radio transmission and/or reception unit 10 may have a function of receiving the physical downlink control channel and/or the physical downlink shared channel. The radio transmission and/or reception unit 10 may have a function of transmitting a physical uplink control channel and/or a physical uplink shared channel. The radio transmission and/or reception unit 10 may have a function of receiving downlink control information in the physical downlink control channel. The radio transmission and/or reception unit 10 may have a function of outputting the downlink control information received in the physical downlink control channel to the higher layer processing unit 14.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts an analog signal input from the RF unit 12 into a digital signal. The baseband unit 13 removes a portion corresponding to a Cyclic Prefix (CP) from the converted digital signal, performs Fast Fourier Transform (FFT) for the signal from which the CP has been removed, and extracts a signal in the frequency domain.

The baseband unit 13 generates an OFDM symbol by performing Inverse Fast Fourier Transform (IFFT) of the data, adds the CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. Furthermore, the RF unit 12 amplifies power. The RF unit 12 may include a function of determining transmit power of the uplink signal and/or the uplink channel transmitted in a serving cell. The RF unit 12 is also referred to as a transmit power control unit.

Figure 22:
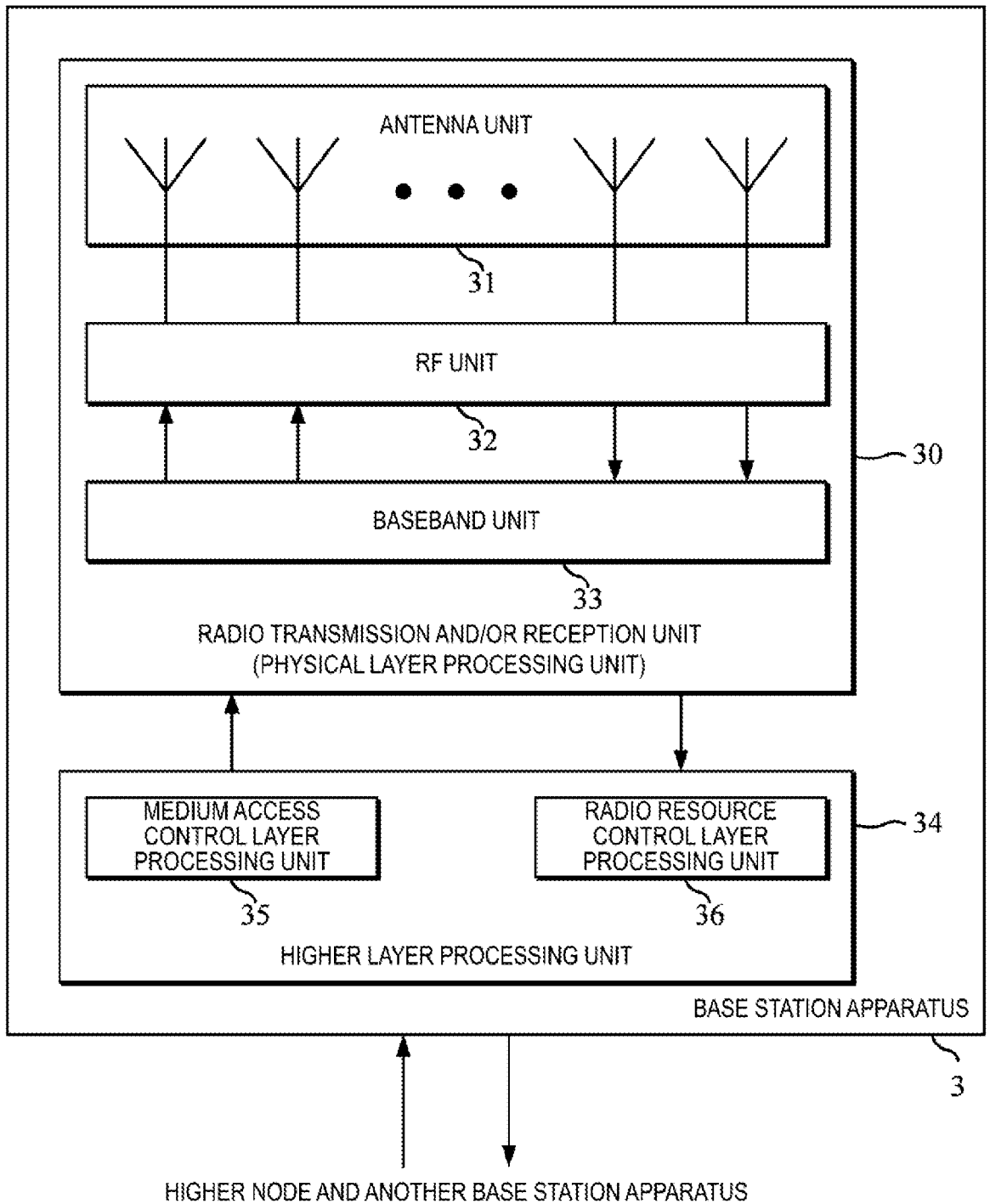
FIG. 22 is a schematic block diagram illustrating the configuration of a base station apparatus 3 according to an embodiment of the present invention.

FIG. 22 is a schematic block diagram illustrating the configuration of a base station apparatus 3 according to an embodiment of the present invention. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmission unit, a reception unit, a monitoring unit, or a physical layer processing unit. A control unit controlling operations of the units based on various conditions may be separately provided. The higher layer processing unit 34 is also referred to as a determination unit 34 or a control unit 34.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer. The higher layer processing unit 34 may have a function of generating downlink control information based on a time parameter for transmitting the physical uplink shared channel based on a signal of a higher layer transmitted to the terminal apparatus 1. The higher layer processing unit 34 may have a function of outputting the generated downlink control information and the like to the radio transmission and/or reception unit 30.

The medium access control layer processing unit 35 included in the higher layer processing unit 34 performs the processing of the MAC layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs the processing of the RRC layer. The radio resource control layer processing unit 36 generates downlink control information (an uplink grant and a downlink grant) including resource allocation information in the terminal apparatus 1. The radio resource control layer processing unit 36 generates downlink control information, downlink data (transport block, a random access response) allocated in a physical downlink shared channel, system information, an RRC message, a MAC Control Element (CE), and the like or acquires them from a higher node and outputs the generated or acquired data to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/reports information indicating various types of configuration information/parameters. The radio resource control layer processing unit 36 may transmit/report information used for identifying configurations of one or multiple reference signals in a certain cell.

In a case that an RRC message, a MAC CE, and/or a PDCCH are transmitted from the base station apparatus 3 to the terminal apparatus 1 and the terminal apparatus 1 performs the processing based on the reception thereof, the base station apparatus 3 performs the processing (control of the terminal apparatus 1 and the system) assuming that the terminal apparatus is performing such processing. In other words, the base station apparatus 3 transmits, to the terminal apparatus 1, an RRC message, a MAC CE, and/or a PDCCH causing the terminal apparatus to perform the processing based on such reception.

The radio transmission and/or reception unit 30 transmits a signal (an RRC message) of a higher layer, a DCI, and the like to the terminal apparatus 1. In addition, the radio transmission and/or reception unit 30 receives the uplink signal transmitted from the terminal apparatus 1 based on an indication from the higher layer processing unit 34. The radio transmission and/or reception unit 30 may have a function of transmitting the physical downlink control channel and/or the physical downlink shared channel. The radio transmission and/or reception unit 30 may have a function of receiving the physical uplink control channel and/or the physical uplink shared channel. The radio transmission and/or reception unit 30 may have a function of transmitting downlink control information in the physical downlink control channel. The radio transmission and/or reception unit 30 may have a function of transmitting the downlink control information output by the higher layer processing unit 34 in the physical downlink control channel. Some of other functions of the radio transmission and/or reception unit 30 are similar to those of the radio transmission and/or reception unit 10, and thus, description thereof is omitted. Note that in a case that the base station apparatus 3 is connected to one or more transmission and/or reception points 4, some or all of the functions of the radio transmission and/or reception unit 30 may be included in each transmission and/or reception point 4.

Further, the higher layer processing unit 34 transmits (transfers) or receives control messages or user data between the base station apparatuses 3 or between a higher network apparatus (MME, S-GW (Serving-GW)) and the base station apparatus 3. Although, in FIG. 22, other constituent elements of the base station apparatus 3, a transmission path of data (control information) between the constituent elements are omitted, it is apparent that the base station apparatus 3 is provided with multiple blocks, as constituent elements, having other functions necessary to operate as the base station apparatus 3. For example, a Radio Resource Management layer processing unit or an application layer processing unit exist in the higher layer processing unit 34.

Note that "units" in the drawing refer to elements to realize the functions and the procedures of the terminal apparatus 1 and the base station apparatus 3, which are also represented by the terms such as a section, a circuit, a constituting apparatus, a device, a unit, and the like.

Each of the units having the reference signs 10 to 16 included in the terminal apparatus 1 may be configured as a circuit. Each of the units having the reference signs 30 to 36 included in the base station apparatus 3 may be configured as a circuit.

(1) According to a first aspect of the present invention, there is provided a terminal apparatus 1 including: a reception unit 10 configured to receive a third downlink control information (DCI); and a determination unit 14 configured to determine transmission of a first physical uplink shared channel (PUSCH), in which the first PUSCH is scheduled by the third DCI, a value of a first PUSCH procedure preparation time for the first PUSCH is a first value in a case that a first condition is not satisfied, the value of the first PUSCH procedure preparation time is a value acquired by adding a second value to the first value in a case that the first condition is satisfied, and the determination unit determines transmission of the first PUSCH in a case that the number of symbols between the third DCI and the first PUSCH is equal to or greater than the number of symbols corresponding to the value of the first PUSCH procedure preparation time.

(2) According to a second aspect of the present invention, there is provided a base station apparatus 3 including: a transmission unit 30 configured to transmit a third downlink control information (DCI); and a determination unit 34 configured to determine reception of a first physical uplink shared channel (PUSCH), in which the first PUSCH is scheduled by the third DCI, a value of a first PUSCH procedure preparation time for the first PUSCH is a first value in a case that a first condition is not satisfied, the value of the first PUSCH procedure preparation time is a value acquired by adding a second value to the first value in a case that the first condition is satisfied, and the determination unit determines reception of the first PUSCH in a case that the number of symbols between the third DCI and the first PUSCH is equal to or greater than the number of symbols corresponding to the value of the first PUSCH procedure preparation time.

(3) In the first aspect or the second aspect of the present invention, transmission of a second PUSCH is at least included in the first condition, the second PUSCH is scheduled by a fourth DCI, reception of the fourth DCI ends after a symbol with which reception of the third DCI ends, and the transmission of the second PUSCH is started before the transmission of the first PUSCH ends.

(4) In the first aspect or the second aspect of the present invention, the second value may be given based at least on a value of a PUSCH procedure preparation time for the transmission of the second PUSCH.

(5) In the first aspect or the second aspect of the present invention, the second value is given based at least on some or all of a higher layer parameter, a subcarrier spacing of the fourth DCI, a subcarrier spacing of the second PUSCH, the number of resource blocks allocated to the second PUSCH, the number of symbols, a size of a transport block, and an MCS.

(6) In the first aspect or the second aspect of the present invention, a value of a radio network temporary identifier (RNTI) for scrambling a cyclic redundancy check (CRC) added to the third DCI is in a first range, and a value of a RNTI for scrambling a CRC added to the fourth DCI is in a second range different from the first range.

(7) In the first aspect or the second aspect of the present invention, a format used for the third DCI is a first format, and a format used for the fourth DCI is a second format different from the first format.

(8) In the first aspect or the second aspect of the present invention, the first PUSCH corresponds to a first HARQ process number, and the second PUSCH corresponds to a second HARQ process number different from the first HARQ process number.

This allows the terminal apparatus 1 to efficiently communicate with the base station apparatus 3. For example, for transmission of data of different services (eMBB, URLLC, and/or mMTC, and the like), the terminal apparatus 1 can determine the transmission of a corresponding HARQ-ACK and/or PUSCH. In addition, the base station apparatus 3 can efficiently communicate with the terminal apparatus 1. In a case that the HARQ-ACK and/or the PUSCH is not transmitted by the terminal apparatus 1, the base station apparatus 3 may transmit (re-transmit) a corresponding PDSCH and/or transmit a DCI for scheduling transmission (retransmission) of the PUSCH to the terminal apparatus 1.

A program running on an apparatus according to the present invention may serve as a program that controls a Central Processing Unit (CPU) and the like to cause a computer to function in such a manner as to realize the functions of the embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that, in the embodiments according to the present invention, the example where the present invention is applied to the communication system including the base station apparatus and the terminal apparatus has been described, but the present invention can also be applied to a system performing communication between terminals, such as Device to Device (D2D).

Note that the present invention is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, as for the present invention, various modifications are possible within the scope of claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A terminal apparatus, comprising:
a reception circuitry configured to receive first downlink control information (DCI); and
a determination circuitry configured to determine transmission of a first physical uplink shared channel (PUSCH), wherein:
the first PUSCH is scheduled by the first DCI,
a value of a first PUSCH procedure preparation time for the first PUSCH is a first value in a case that a first condition is not satisfied,
the value of the first PUSCH procedure preparation time is a value acquired by adding a second value to the first value in a case that the first condition is satisfied,
the determination circuitry is further configured to determine the transmission of the first PUSCH in a case that a number of symbols between the first DCI and the first PUSCH is equal to or greater than a number of symbols corresponding to the value of the first PUSCH procedure preparation time,
transmission of at least a second PUSCH is included in the first condition,
the second PUSCH is scheduled by second DCI,
reception of the second DCI ends after a symbol in which the reception of the first DCI ends,
the transmission of the second PUSCH is started before the transmission of the first PUSCH ends,
the second value is based on at least a value of a second PUSCH procedure preparation time for the transmission of the second PUSCH, and
the first PUSCH and the second PUSCH correspond to different codebooks.

2. The terminal apparatus according to claim 1, wherein:
a value of a radio network temporary identifier (RNTI) for scrambling a cyclic redundancy check (CRC) added to the first DCI is in a first range, and
a value of an RNTI for scrambling a CRC added to the second DCI is in a second range different from the first range.

3. The terminal apparatus according to claim 1, wherein:
a format used for the first DCI is a first format, and
a format used for the second DCI is a second format different from the first format.

4. The terminal apparatus according to claim 1, wherein:
the first PUSCH corresponds to a first hybrid automatic repeat request (HARQ) process number, and
the second PUSCH corresponds to a second HARQ process number different from the first HARQ process number.

5. A base station apparatus, comprising:
a transmission circuitry configured to transmit first downlink control information (DCI); and
a determination circuitry configured to determine reception of a first physical uplink shared channel (PUSCH), wherein:
the first PUSCH is scheduled by the first DCI,
a value of a first PUSCH procedure preparation time for the first PUSCH is a first value in a case that a first condition is not satisfied,
the value of the first PUSCH procedure preparation time is a value acquired by adding a second value to the first value in a case that the first condition is satisfied,
the determination circuitry is further configured to determine the reception of the first PUSCH in a case that a number of symbols between the first DCI and the first PUSCH is equal to or greater than a number of symbols corresponding to the value of the first PUSCH procedure preparation time,
reception of at least a second PUSCH is included in the first condition,
the second PUSCH is scheduled by second DCI,
transmission of the second DCI ends after a symbol in which the transmission of the first DCI ends,
the reception of the second PUSCH is started before the reception of the first PUSCH ends,
the second value is based on at least a value of a second PUSCH procedure preparation time for the reception of the second PUSCH, and
the first PUSCH and the second PUSCH correspond to different codebooks.

6. The base station apparatus according to claim 5, wherein:
a value of a radio network temporary identifier (RNTI) for scrambling a cyclic redundancy check (CRC) added to the first DCI is in a first range, and
a value of an RNTI for scrambling a CRC added to the second DCI is in a second range different from the first range.

7. The base station apparatus according to claim 5, wherein:
   a format used for the first DCI is a first format, and
   a format used for the second DCI is a second format different from the first format.

8. The base station apparatus according to claim 5, wherein:
   the first PUSCH corresponds to a first hybrid automatic repeat request (HARQ) process number, and
   the second PUSCH corresponds to a second HARQ process number different from the first HARQ process number.

9. A communication method for a terminal apparatus in a radio communication system, the communication method comprising:
   receiving first downlink control information (DCI); and
   transmitting a first physical uplink shared channel (PUSCH), wherein:
   the first PUSCH is scheduled by the first DCI,
   a value of a first PUSCH procedure preparation time for the first PUSCH is a first value in a case that a first condition is not satisfied,
   the value of the first PUSCH procedure preparation time is a value acquired by adding a second value to the first value in a case that the first condition is satisfied,
   the transmission of the first PUSCH is determined in a case that a number of symbols between the first DCI and the first PUSCH is equal to or greater than a number of symbols corresponding to the value of the first PUSCH procedure preparation time,
   transmission of at least a second PUSCH is included in the first condition,
   the second PUSCH is scheduled by second DCI,
   reception of the second DCI ends after a symbol in which the reception of the first DCI ends,
   the transmission of the second PUSCH is started before the transmission of the first PUSCH ends,
   the second value is based on at least a value of a second PUSCH procedure preparation time for the transmission of the second PUSCH, and
   the first PUSCH and the second PUSCH correspond to different codebooks.

* * * * *